United States Patent
Zhang et al.

(10) Patent No.: US 11,122,482 B2
(45) Date of Patent: Sep. 14, 2021

(54) NODE HANDOVER METHOD, APPARATUS, AND SYSTEM IN A SOFTWARE DEFINED PROTOCOL NETWORK

(71) Applicant: Huawei Technologies Co., Ltd., Shenzhen (CN)

(72) Inventors: Jinfang Zhang, Shanghai (CN); Wei Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 378 days.

(21) Appl. No.: 15/883,932

(22) Filed: Jan. 30, 2018

(65) Prior Publication Data

US 2018/0160351 A1    Jun. 7, 2018

Related U.S. Application Data

(63) Continuation of application No. PCT/CN2015/085809, filed on Jul. 31, 2015.

(51) Int. Cl.
*H04W 36/12* (2009.01)
*H04W 36/30* (2009.01)
(Continued)

(52) U.S. Cl.
CPC ....... *H04W 36/12* (2013.01); *H04W 36/0055* (2013.01); *H04W 36/0083* (2013.01);
(Continued)

(58) Field of Classification Search
CPC ............. H04W 36/12; H04W 35/0055; H04W 36/0083; H04W 36/30; H04W 36/38; H04W 40/36; H04W 40/12
See application file for complete search history.

(56) References Cited

U.S. PATENT DOCUMENTS 8,548,477 B2 * 10/2013 Hapsari ................... H04W 4/20
455/440
2011/0211583 A1    9/2011 Seetharaman et al.
(Continued)

FOREIGN PATENT DOCUMENTS

CN    101730150 A    6/2010
CN    103857004 A    6/2014
(Continued)

OTHER PUBLICATIONS

Gurusanthosh et al., "SDMA: A Semi-Distributed Mobility Anchoring in LTE Networks," 2013 International Conference on Selected Topics in Mobile and Wireless Networking (MoWNet), pp. 133-139, Institute of Electrical and Electronics Engineers, New York, New York (2013).

*Primary Examiner* — Christopher M Crutchfield
*Assistant Examiner* — Tito Q Pham
(74) *Attorney, Agent, or Firm* — Leydig, Voit & Mayer, Ltd.

(57) ABSTRACT

A node handover method, apparatus, and system are provided. The method includes: receiving a protocol configuration request message sent by a target access node, where the protocol configuration request message includes a quality of service parameter of UE; determining, according to the quality of service parameter, a function module corresponding to a service of the UE; configuring, according to the function module corresponding to a service of the UE and a network topology, a function module for a target node; determining, according to the function module configured for the target node and the network topology, a first forwarding entry group required for data stream transmission between a source node and any node of the target node; and determining a second forwarding entry group required for
(Continued)

data stream transmission between a gateway and any node of the target node.

15 Claims, 35 Drawing Sheets

(51) Int. Cl.
    *H04W 36/00*     (2009.01)
    *H04W 40/36*     (2009.01)
    *H04W 36/38*     (2009.01)
    *H04W 40/12*     (2009.01)

(52) U.S. Cl.
    CPC ........... *H04W 36/30* (2013.01); *H04W 36/38* (2013.01); *H04W 40/36* (2013.01); *H04W 40/12* (2013.01)

(56) References Cited

U.S. PATENT DOCUMENTS

| | | | |
|---|---|---|---|
| 2015/0055623 A1* | 2/2015 | Li | H04W 40/04 370/331 |
| 2015/0271710 A1 | 9/2015 | Zhang et al. | |
| 2016/0150448 A1* | 5/2016 | Perras | H04W 48/17 455/450 |
| 2016/0374095 A1* | 12/2016 | Jeon | H04L 41/04 |
| 2017/0346607 A1* | 11/2017 | Chen | H04W 72/14 |
| 2018/0115927 A1* | 4/2018 | Vesterinen | H04W 36/0072 |

FOREIGN PATENT DOCUMENTS

| | | | |
|---|---|---|---|
| WO | 2014166402 A1 | 10/2014 | |
| WO | 2014197778 A1 | 12/2014 | |
| WO | 2014209007 A1 | 12/2014 | |

\* cited by examiner

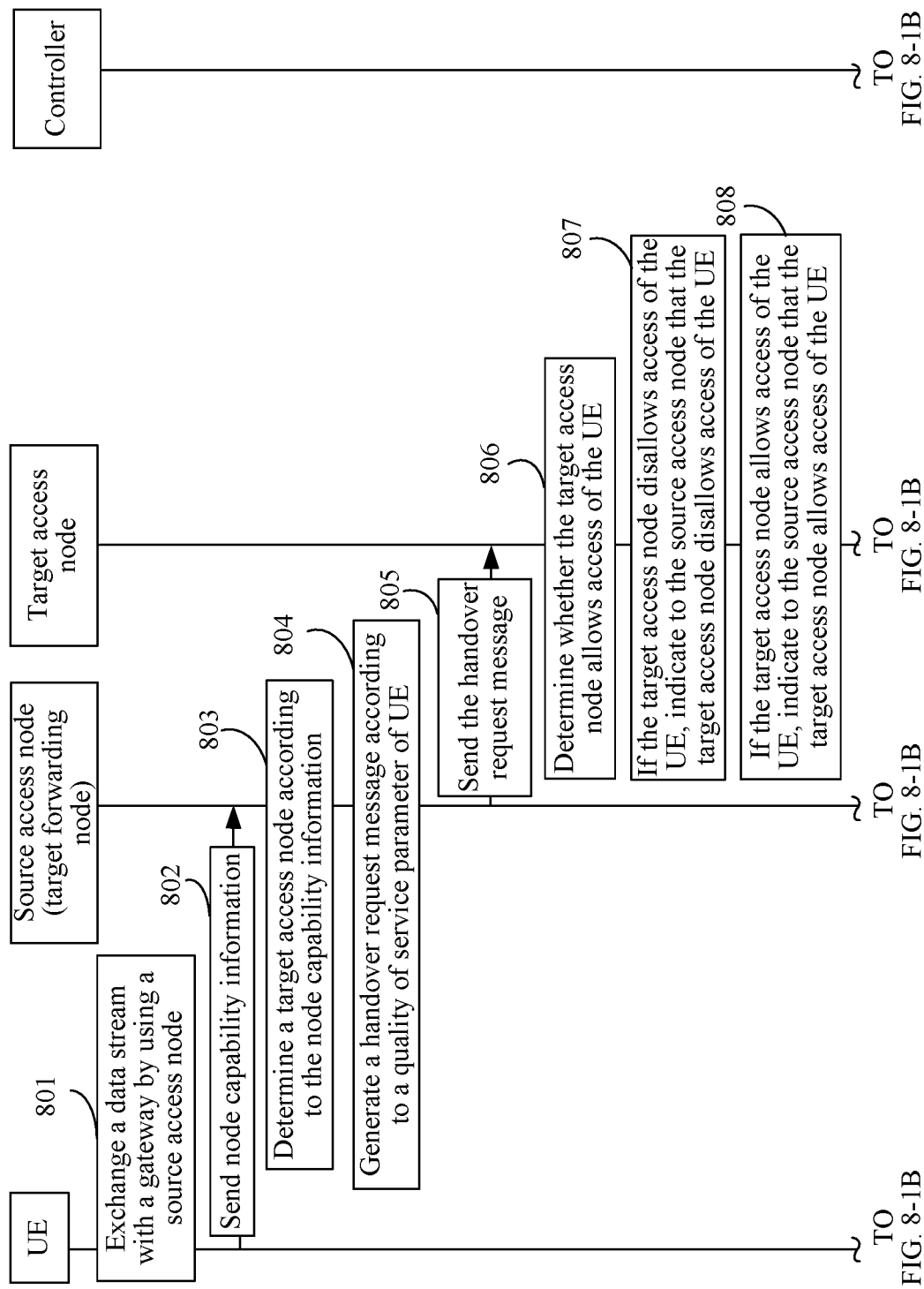

NODE HANDOVER METHOD, APPARATUS,
AND SYSTEM IN A SOFTWARE DEFINED
PROTOCOL NETWORK

CROSS-REFERENCE TO RELATED
APPLICATIONS

This application is a continuation of International Application No. PCT/CN2015/085809, filed on Jul. 31, 2015, the disclosure of which is hereby incorporated by reference in its entirety.

TECHNICAL FIELD

Embodiments of the present invention relate to the communications field, and in particular, to a node handover method, apparatus, and system.

BACKGROUND

A Software Defined Protocol stack (SDP for short) network system is applied with the update and development of radio access technologies.

The SDP network system includes a controller, a gateway, multiple nodes, and user equipment (UE for short). When the UE needs to exchange data streams with the gateway, the UE may generate a service request and send the service request to the controller. The service request may include a quality of service (QOS for short) parameter. The controller may determine, according to the quality of service parameter in the service request, a function module corresponding to a service of the UE, configure, according to the function module corresponding to a service of the UE and a network topology, a function module for a node currently accessed by the UE, and separately configure, for the node currently accessed by the UE and the gateway according to the function module configured for the node currently accessed by the UE and the network topology, a forwarding entry required for transmitting a data stream by the node currently accessed by the UE to the gateway, so that the gateway sends, according to a forwarding entry, a data stream to the node currently accessed by the UE, and the node currently accessed by the UE sends a data stream to the gateway according to a forwarding entry. The node currently accessed by the UE serves the UE, implementing data stream exchange between the UE and the gateway.

When the UE needs to be handed over from the currently accessed node to another node, and the another node serves the UE, an SDP network system provided in a related technology cannot support handover between nodes. The SDP network system has undiversified functions.

SUMMARY

To resolve a problem that an SDP network system has undiversified functions, the present invention provides a node handover method, apparatus, and system. The technical solutions are as follows.

According to a first aspect, a node handover method is provided, and the method includes:

receiving a protocol configuration request message sent by a target access node, where the protocol configuration request message includes a quality of service parameter of user equipment (UE), the protocol configuration request message is generated by the target access node according to a handover request message sent by a source access node, the source access node is a node accessed by the UE before node handover, and the target access node is a node accessed by the UE after node handover;

determining, according to the quality of service parameter, a function module corresponding to a service of the UE;

configuring, according to the function module corresponding to a service of the UE and a network topology, a function module for a target node, where the target node includes the target access node, and the target node is configured to bear the function module corresponding to a service of the UE after node handover;

determining, according to the function module configured for the target node and the network topology, a first forwarding entry group required for data stream transmission between a source node and the target node, where the source node includes the source access node, and the source node is configured to bear the function module corresponding to a service of the UE before node handover; and determining, according to the function module configured for the target node and the network topology, a second forwarding entry group required for data stream transmission between a gateway and any node of the target node.

With reference to the first aspect, in a first possible implementation, the target node further includes a target forwarding node, and the configuring, according to the function module corresponding to a service of the UE and a network topology, a function module for a target node includes:

determining the target forwarding node according to the function module corresponding to a service of the UE and the network topology, where the target forwarding node is a node between the target access node and the gateway, and is able to bear a part of the function module corresponding to a service of the UE after node handover; and determining a function module of the target forwarding node and a function module of the target access node according to the function module corresponding to a service of the UE and the network topology, where the function module of the target forwarding node and the function module of the target access node form the function module corresponding to a service of the UE.

With reference to the first aspect, in a second possible implementation, the source node further includes a source forwarding node, and the first forwarding entry group includes:

a forwarding entry required for sending a data stream by the source access node to the source forwarding node and a forwarding entry required for transmitting a data stream by the source forwarding node to the target node.

With reference to the first possible implementation, in a third possible implementation, the source node further includes a source forwarding node, and the first forwarding entry group includes:

a forwarding entry required for sending a data stream by the source access node to the source forwarding node and a forwarding entry required for transmitting a data stream by the source forwarding node to the target forwarding node.

With reference to the first aspect, in a fourth possible implementation, the determining, according to the function module configured for the target node and the network topology, a second forwarding entry group required for data stream transmission between the gateway and any node of the target node includes:

determining a forwarding entry of the node of the target node according to the function module configured for the target node and the network topology;

determining whether a source node nearest to the gateway before handover and a target node nearest to the gateway after handover are a same node; and if the source node nearest to the gateway before handover and the target node nearest to the gateway after handover are not a same node, determining a forwarding entry of the gateway.

According to a second aspect, a node handover method is provided, and the method includes:

receiving a first forwarding entry group sent by a controller, where the first forwarding entry group is determined by the controller according to a function module configured for a target node and a network topology, and the target node is a node that bears the function module corresponding to a service of user equipment (UE) after node handover;

sending data temporarily stored in a source node to the target node according to the first forwarding entry group, where the source node is a node that bears the function module corresponding to a service of the UE before node handover;

receiving a downlink data stream end mark;

releasing, according to the downlink data stream end mark, the function module corresponding to a service of the UE that is borne by the source node; and deleting the first forwarding entry group and a third forwarding entry group required for data stream transmission between a gateway and any node of the source node.

With reference to the second aspect, in a first possible implementation, the source node is a source access node, the source access node is a node accessed by the UE before node handover, and before the receiving a first forwarding entry group sent by a controller, the method further includes:

sending a handover request message to a target access node, where the target access node is a node accessed by the UE after node handover, and the handover request message includes a quality of service parameter, so that the target access node determines, according to the handover request message, whether the UE is able to access the target access node, and when the UE is able to access the target access node, sends a protocol configuration request message to the controller.

According to a third aspect, a node handover apparatus is provided, and the node handover apparatus includes:

a receiving module, configured to receive a protocol configuration request message sent by a target access node, where the protocol configuration request message includes a quality of service parameter of user equipment (UE), the protocol configuration request message is generated by the target access node according to a handover request message sent by a source access node, the source access node is a node accessed by the UE before node handover, and the target access node is a node accessed by the UE after node handover;

a first determining module, configured to determine, according to the quality of service parameter, a function module corresponding to a service of the UE;

a configuration module, configured to configure, according to the function module corresponding to a service of the UE and a network topology, a function module for a target node, where the target node includes the target access node, and the target node is configured to bear the function module corresponding to a service of the UE after node handover;

a second determining module, configured to determine, according to the function module configured for the target node and the network topology, a first forwarding entry group required for data stream transmission between a source node and the target node, where the source node includes the source access node, and the source node is configured to bear the function module corresponding to a service of the UE before node handover; and a third determining module, configured to determine, according to the function module configured for the target node and the network topology, a second forwarding entry group required for data stream transmission between a gateway and any node of the target node.

With reference to the third aspect, in a first possible implementation, the target node further includes a target forwarding node, and the configuration module is configured to:

determine the target forwarding node according to the function module corresponding to a service of the UE and the network topology, where the target forwarding node is a node between the target access node and the gateway, and is able to bear a part of the function module corresponding to a service of the UE after node handover; and determine a function module of the target forwarding node and a function module of the target access node according to the function module corresponding to a service of the UE and the network topology, where the function module of the target forwarding node and the function module of the target access node form the function module corresponding to a service of the UE.

With reference to the third aspect, in a second possible implementation, the source node further includes a source forwarding node, and the first forwarding entry group includes:

a forwarding entry required for sending a data stream by the source access node to the source forwarding node and a forwarding entry required for transmitting a data stream by the source forwarding node to the target node.

With reference to the first possible implementation, in a third possible implementation, the source node further includes a source forwarding node, and the first forwarding entry group includes:

a forwarding entry required for sending a data stream by the source access node to the source forwarding node and a forwarding entry required for transmitting a data stream by the source forwarding node to the target forwarding node.

With reference to the third aspect, in a fourth possible implementation, the third determining module is configured to:

determine a forwarding entry of the node of the target node according to the function module configured for the target node and the network topology;

determine whether a source node nearest to the gateway before handover and a target node nearest to the gateway after handover are a same node; and if the source node nearest to the gateway before handover and the target node nearest to the gateway after handover are not a same node, determine a forwarding entry of the gateway.

According to a fourth aspect, a node handover apparatus is provided, and the node handover apparatus includes:

a first receiving module, configured to receive a first forwarding entry group sent by a controller, where the first forwarding entry group is determined by the controller according to a function module configured for a target node and a network topology, and the target node is a node that bears the function module corresponding to a service of user equipment (UE) after node handover;

a first sending module, configured to send data temporarily stored in a source node to the target node according to the first forwarding entry group, where the source node is a node that bears the function module corresponding to a service of the UE before node handover;

a second receiving module, configured to receive a downlink data stream end mark;

a release module, configured to release, according to the downlink data stream end mark, the function module corresponding to a service of the UE that is borne by the source node; and a deletion module, configured to delete the first forwarding entry group and a third forwarding entry group required for data stream transmission between a gateway and any node of the source node.

With reference to the fourth aspect, in a first possible implementation, the source node is a source access node, the source access node is a node accessed by the UE before node handover, and the node handover apparatus further includes:

a second sending module, configured to send a handover request message to a target access node, where the target access node is a node accessed by the UE after node handover, and the handover request message includes a quality of service parameter, so that the target access node determines, according to the handover request message, whether the UE is able to access the target access node, and when the UE is able to access the target access node, sends a protocol configuration request message to the controller.

According to a fifth aspect, a node handover system is provided, and the node handover system includes a controller and a source node, where the controller includes the node handover apparatus according to the third aspect; and the source node includes the node handover apparatus according to the fourth aspect.

According to a sixth aspect, a node handover apparatus is provided, and the node handover apparatus includes at least one processor, at least one network interface, a memory, and at least one communications bus, where the processor is configured to execute a program stored in the memory, and the program includes:

receiving a protocol configuration request message sent by a target access node, where the protocol configuration request message includes a quality of service parameter of user equipment (UE), the protocol configuration request message is generated by the target access node according to a handover request message sent by a source access node, the source access node is a node accessed by the UE before node handover, and the target access node is a node accessed by the UE after node handover;

determining, according to the quality of service parameter, a function module corresponding to a service of the UE;

configuring, according to the function module corresponding to a service of the UE and a network topology, a function module for a target node, where the target node includes the target access node, and the target node is configured to bear the function module corresponding to a service of the UE after node handover;

determining, according to the function module configured for the target node and the network topology, a first forwarding entry group required for data stream transmission between a source node and the target node, where the source node includes the source access node, and the source node is configured to bear the function module corresponding to a service of the UE before node handover; and determining, according to the function module configured for the target node and the network topology, a second forwarding entry group required for data stream transmission between a gateway and any node of the target node.

With reference to the sixth aspect, in a first possible implementation, the target node further includes a target forwarding node, and the program further includes:

determining the target forwarding node according to the function module corresponding to a service of the UE and the network topology, where the target forwarding node is a node between the target access node and the gateway, and is able to bear a part of the function module corresponding to a service of the UE after node handover; and determining a function module of the target forwarding node and a function module of the target access node according to the function module corresponding to a service of the UE and the network topology, where the function module of the target forwarding node and the function module of the target access node form the function module corresponding to a service of the UE.

With reference to the sixth aspect, in a second possible implementation, the source node further includes a source forwarding node, and the first forwarding entry group includes:

a forwarding entry required for sending a data stream by the source access node to the source forwarding node and a forwarding entry required for transmitting a data stream by the source forwarding node to the target node.

With reference to the first possible implementation, in a third possible implementation, the source node further includes a source forwarding node, and the first forwarding entry group includes:

a forwarding entry required for sending a data stream by the source access node to the source forwarding node and a forwarding entry required for transmitting a data stream by the source forwarding node to the target forwarding node.

With reference to the sixth aspect, in a fourth possible implementation, the program further includes:

determining a forwarding entry of the node of the target node according to the function module configured for the target node and the network topology;

determining whether a source node nearest to the gateway before handover and a target node nearest to the gateway after handover are a same node; and if the source node nearest to the gateway before handover and the target node nearest to the gateway after handover are not a same node, determining a forwarding entry of the gateway.

According to a seventh aspect, a node handover apparatus is provided, and the node handover apparatus includes at least one processor, at least one network interface, a memory, and at least one communications bus, where the processor is configured to execute a program stored in the memory, and the program includes:

receiving a first forwarding entry group sent by a controller, where the first forwarding entry group is determined by the controller according to a function module configured for a target node and a network topology, and the target node is a node that bears the function module corresponding to a service of user equipment (UE) after node handover;

sending data temporarily stored in a source node to the target node according to the first forwarding entry group, where the source node is a node that bears the function module corresponding to a service of the UE before node handover;

receiving a downlink data stream end mark;

releasing, according to the downlink data stream end mark, the function module corresponding to a service of the UE that is borne by the source node; and deleting the first forwarding entry group and a third forwarding entry group required for data stream transmission between a gateway and any node of the source node.

With reference to the seventh aspect, in a first possible implementation, the source node is a source access node, the source access node is a node accessed by the UE before node handover, and the program further includes:

sending a handover request message to a target access node, where the target access node is a node accessed by the UE after node handover, and the handover request message includes a quality of service parameter, so that the target access node determines, according to the handover request message, whether the UE is able to access the target access node, and when the UE is able to access the target access node, sends a protocol configuration request message to the controller.

According to an eighth aspect, a node handover system is provided, and the node handover system includes a controller and a source node, where the controller includes the node handover apparatus according to the sixth aspect; and the source node includes the node handover apparatus according to the seventh aspect.

The present invention provides a node handover method, apparatus, and system.

After receiving a protocol configuration request message sent by a target access node, a controller determines, according to a quality of service parameter, a function module corresponding to a service of UE, configures, according to the function module corresponding to a service of the UE and a network topology, a function module for a target node, and determines a first forwarding entry group and a second forwarding entry group, so that a source node can send data temporarily stored in the source node to the target node according to the first forwarding entry group, and the target node performs data stream transmission with a gateway according to the second forwarding entry group. In this way, the target access node serves the UE, handover between nodes in an SDP network system is implemented, and functions of the SDP network system are enriched.

It should be understood that the foregoing general description and the following detailed description are merely examples for illustrative purposes but cannot limit the present invention.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1-2 is a schematic structural diagram of another SDP network system according to an embodiment of the present invention;

FIG. 2 is a method flowchart of a node handover method according to an embodiment of the present invention;

FIG. 4-2 is a flowchart of a data stream exchange method according to an embodiment of the present invention;

FIG. 4-3 is a schematic diagram of node handover according to an embodiment of the present invention;

FIG. 5-1A, FIG. 5-1B, and FIG. 5-1C are a method flowchart of yet another node handover method according to an embodiment of the present invention;

FIG. 5-2 is a flowchart of another data stream exchange method according to an embodiment of the present invention;

FIG. 5-3 is another schematic diagram of node handover according to an embodiment of the present invention;

FIG. 6-1A, FIG. 6-1B, and FIG. 6-1C are a method flowchart of a node handover method according to another embodiment of the present invention;

FIG. 6-2 is a flowchart of still another data stream exchange method according to an embodiment of the present invention;

FIG. 6-3 is still another schematic diagram of node handover according to an embodiment of the present invention;

FIG. 7-1A, FIG. 7-1B, and FIG. 7-1C are a method flowchart of another node handover method according to another embodiment of the present invention;

FIG. 7-2 is a flowchart of yet another data stream exchange method according to an embodiment of the present invention;

FIG. 7-3 is yet another schematic diagram of node handover according to an embodiment of the present invention;

FIG. 8-1A and FIG. 8-1B are a method flowchart of still another node handover method according to another embodiment of the present invention;

FIG. 8-2 is a flowchart of a data stream exchange method according to another embodiment of the present invention;

FIG. 8-3 is a schematic diagram of node handover according to another embodiment of the present invention;

FIG. 9-1A and FIG. 9-1B are a method flowchart of yet another node handover method according to another embodiment of the present invention;

FIG. 9-2 is a flowchart of another data stream exchange method according to another embodiment of the present invention;

FIG. 9-3 is another schematic diagram of node handover according to another embodiment of the present invention;

FIG. 11-1 is a schematic structural diagram of another node handover apparatus according to an embodiment of the present invention;

FIG. 11-2 is a schematic structural diagram of still another node handover apparatus according to an embodiment of the present invention;

The foregoing accompanying drawings show the embodiments specified in the present invention. More detailed descriptions are provided below. These accompanying drawings and descriptions are not intended to limit the scope of the idea of the present invention in any manner, but to explain the concept of the present invention to a person in the art by referring to specific embodiments.

DESCRIPTION OF EMBODIMENTS

To make the objectives, technical solutions, and advantages of the present invention clearer, the following further describes the embodiments of the present invention in detail with reference to the accompanying drawings.

Figure 1:
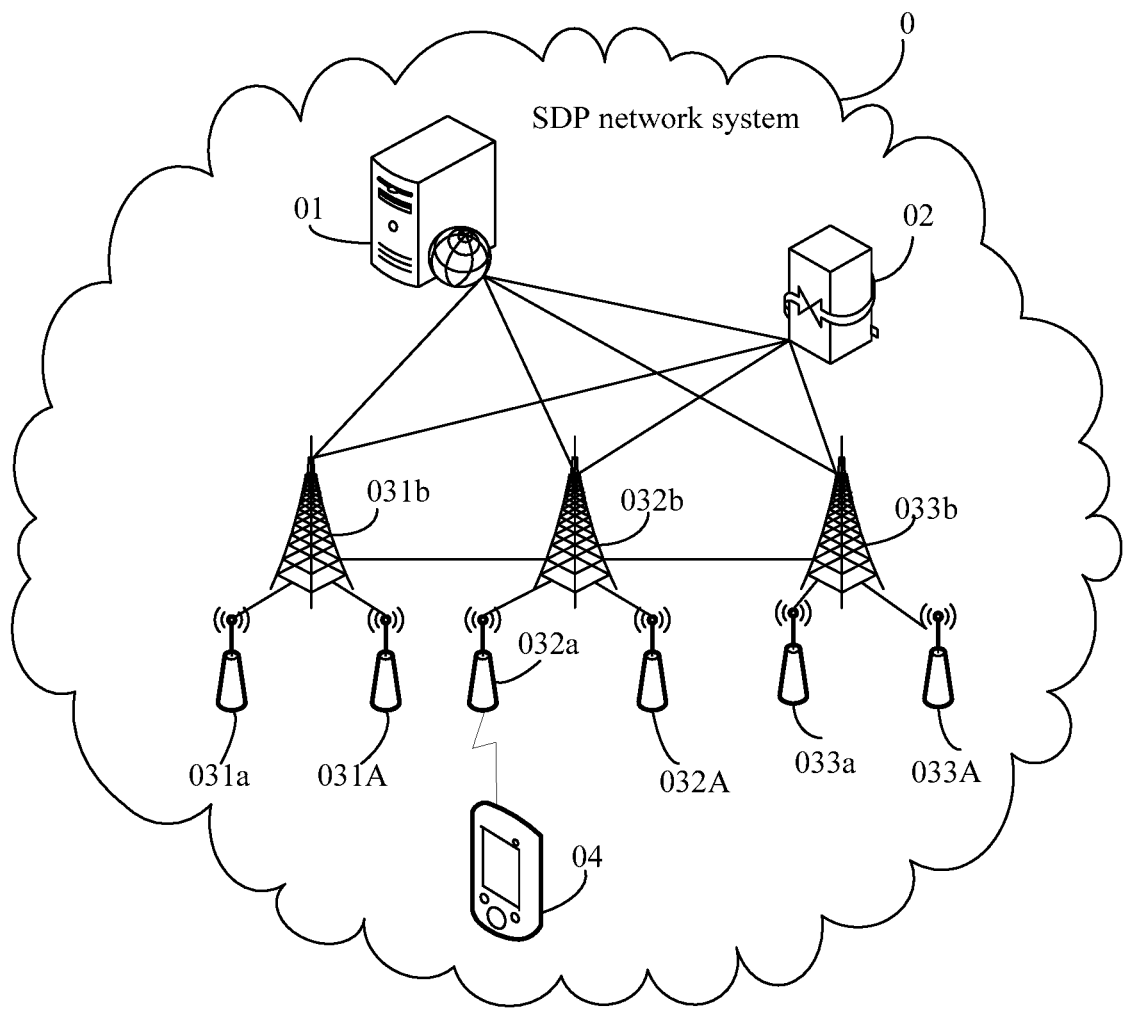
FIG. 1-1 is a schematic structural diagram of an SDP network system according to an embodiment of the present invention.

As shown in FIG. 1-1, an embodiment of the present invention provides an SDP network system 0. The SDP network system 0 may include a controller 01, a gateway 02, multiple nodes, and UE-04. The multiple nodes may include multiple nodes directly connected to the gateway 02 (such as a node 031$b$, a node 032$b$, and a node 033$b$) and multiple nodes indirectly connected to the gateway 02 (such as a node 031$a$, a node 031A, a node 032$a$, a node 032A, a node 033$a$, and a node 033A). A node currently accessed by the UE is the node 032$a$. The controller 01 and the gateway 02 are connected to each node. Each node in the SDP network system 0 can be connected to the gateway 02. The gateway 02 is connected to the Internet. When the UE-04 needs to exchange a data stream with the gateway 02, the UE-04 may generate a service request and send the service request to the controller 01. For example, the service request may include quality of service information.

The controller 01 may determine, according to a quality of service parameter in the service request, a function module corresponding to a service of the UE-04, determine, according to the function module corresponding to a service of the UE-04 and a network topology, the forwarding node 032$b$ corresponding to the node 032$a$ currently accessed by the UE-04, and configure function modules for the node 032$a$ currently accessed by the UE-04 and the forwarding node 032$b$. Forwarding entries required for data stream transmission between the node 032$a$ currently accessed by the UE-04, the forwarding node 032$b$, and the gateway 02 are separately configured for the node 032$a$ currently accessed by the UE-04, the forwarding node 032$b$, and the gateway 02 according to the network topology and the function modules configured for the node 032$a$ currently accessed by the UE-04 and the forwarding node 032$b$, so that the gateway 02 sends a data stream to the forwarding node 032$b$ according to a forwarding entry, and the forwarding node 032$b$ sends, according to a forwarding entry, the data stream to the node 032$a$ currently accessed by the UE-04. The node 032$a$ currently accessed by the UE-04 sends a data stream to the forwarding node 032$b$ according to a forwarding entry, and the forwarding node 032$b$ sends the data stream to the gateway 02 according to a forwarding entry. In this case, the node 032$a$ currently accessed by the UE-04 and the forwarding node 032$b$ bear the function module corresponding to a service of the UE-04. The node 032$a$ currently accessed by the UE-04 and the forwarding node 032$b$ serve the UE-04, implementing data stream exchange between the UE-04 and the gateway 02.

Figures 1, 2:
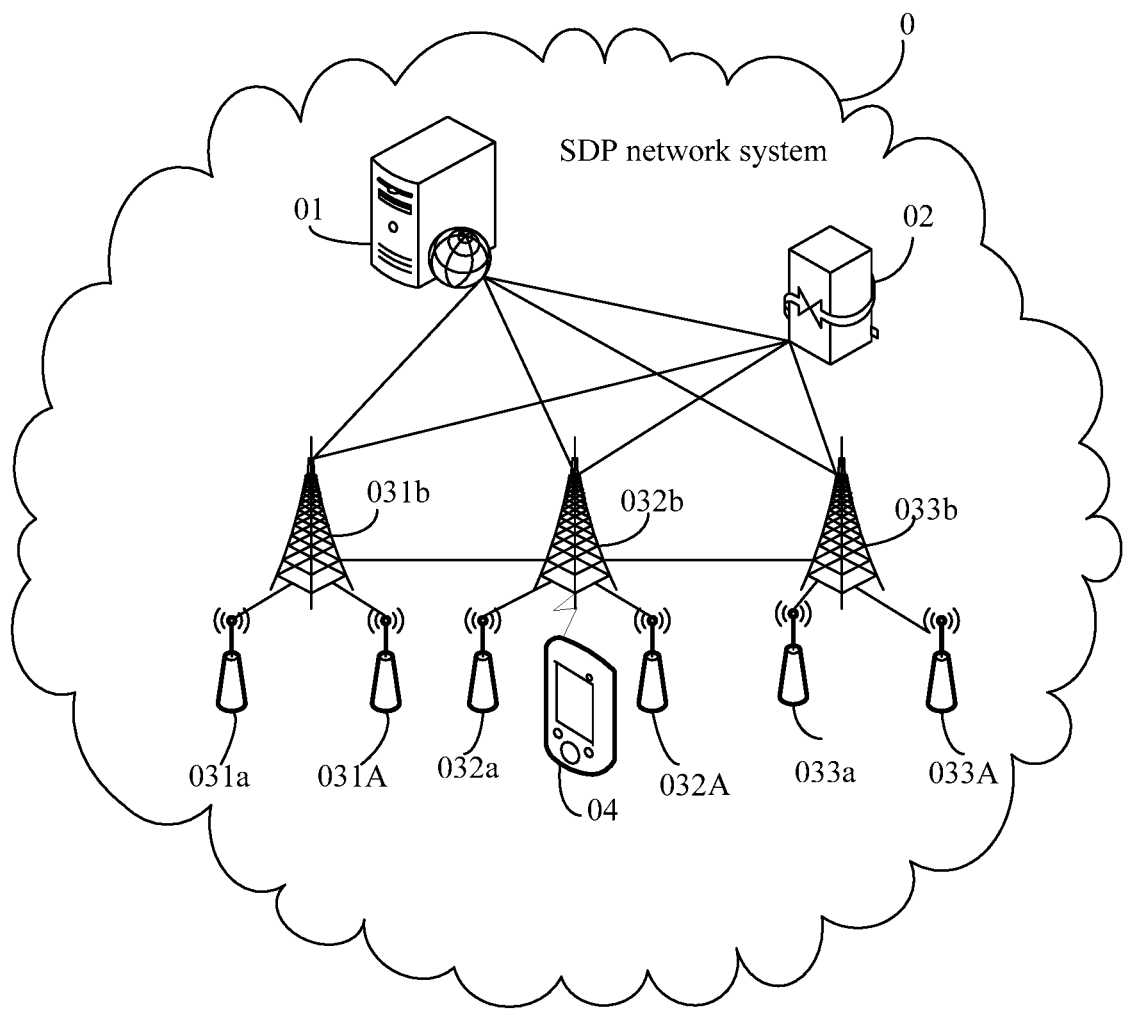
Figure 2:
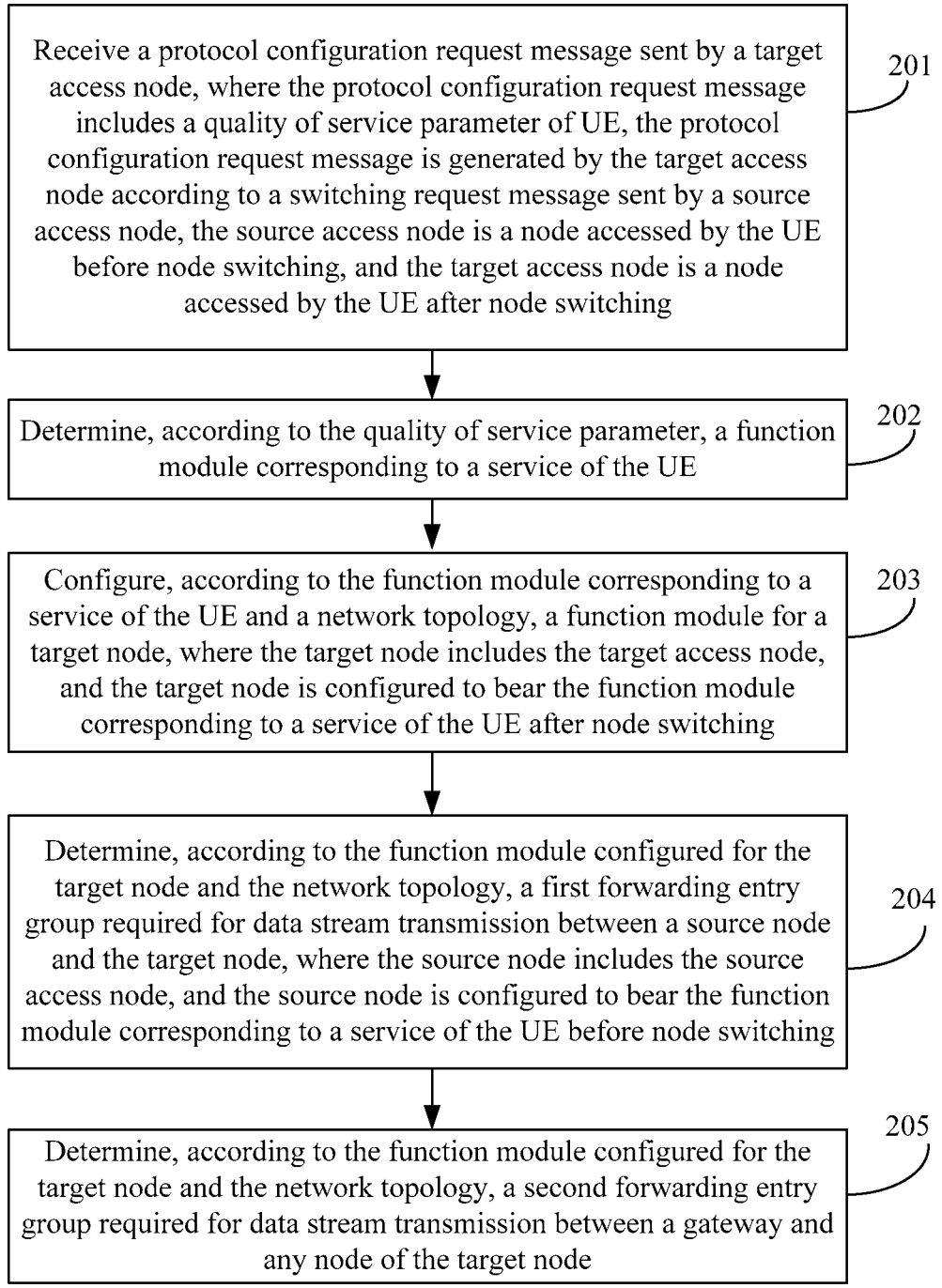

As shown in FIG. 1-2, an embodiment of the present invention provides an SDP network system 0. The SDP network system 0 may include a controller 01, a gateway 02, multiple nodes, and UE-04. The multiple nodes may include multiple nodes directly connected to the gateway 02 (such as a node 031$b$, a node 032$b$, and a node 033$b$) and multiple nodes indirectly connected to the gateway 02 (such as a node 031$a$, a node 031A, a node 032$a$, a node 032A, a node 033$a$, and a node 033A). The controller 01 and the gateway 02 are connected to each node. Each node in the SDP network system 0 can be connected to the gateway 02. The gateway 02 is connected to the Internet. When the UE-04 needs to exchange a data stream with the gateway 02, the UE-04 may generate a service request and send the service request to the controller 01. The service request may include a quality of service parameter.

The controller 01 may determine, according to the quality of service parameter in the service request, a function module corresponding to a service of the UE-04, configure, according to the function module corresponding to a service of the UE-04 and a network topology, a function module for the node 032$b$ currently accessed by the UE-04 among the multiple nodes, and separately configure, for the node 032$b$ currently accessed by the UE-04 and the gateway 02 according to the function module configured for the node 032$b$ currently accessed by the UE-04 and the network topology, forwarding entries required for data stream transmission between the node 032$b$ currently accessed by the UE-04 and the gateway 02, so that the gateway 02 sends, according to a forwarding entry, a data stream to the node 032$b$ currently accessed by the UE-04, or the node 032$b$ currently accessed by the UE-04 sends a data stream to the gateway 02 according to a forwarding entry. In this case, the node 032$b$ currently accessed by the UE-04 bears the function module corresponding to a service of the UE-04. The node 032$b$ currently accessed by the UE-04 serves the UE-04, implementing data stream exchange between the UE-04 and the gateway 02.

As shown in FIG. 2, an embodiment of the present invention provides a node handover method. The node handover method may be applied to the controller 01 in the SDP network system 0 shown in FIG. 1-1 or FIG. 1-2. The node handover method may include the following steps:

Step 201. Receive a protocol configuration request message sent by a target access node, where the protocol configuration request message includes a quality of service parameter of UE, the protocol configuration request message is generated by the target access node according to a handover request message sent by a source access node, the source access node is a node accessed by the UE before node handover, and the target access node is a node accessed by the UE after node handover.

Step 202. Determine, according to the quality of service parameter, a function module corresponding to a service of the UE.

Step 203. Configure, according to the function module corresponding to a service of the UE and a network topology, a function module for a target node, where the target node includes the target access node, and the target node is configured to bear the function module corresponding to a service of the UE after node handover.

Step 204. Determine, according to the function module configured for the target node and the network topology, a first forwarding entry group required for data stream transmission between a source node and the target node, where the source node includes the source access node, and the source node is configured to bear the function module corresponding to a service of the UE before node handover.

Step 205. Determine, according to the function module configured for the target node and the network topology, a second forwarding entry group required for data stream transmission between a gateway and any node of the target node.

In conclusion, according to the node handover method provided in this embodiment of the present invention, after receiving a protocol configuration request message sent by a target access node, a controller determines, according to a quality of service parameter, a function module corresponding to a service of UE, configures, according to the function module corresponding to a service of the UE and a network topology, a function module for a target node, and determines a first forwarding entry group and a second forwarding entry group, so that a source node can send data temporarily stored in the source node to the target node according to the first forwarding entry group, and the target node performs data stream transmission with a gateway according to the second forwarding entry group. In this way, the target access node serves the UE, handover between nodes in an SDP network system is implemented, and functions of the SDP network system are enriched.

Optionally, the target node may further include a target forwarding node. Step 203 may include:

determining the target forwarding node according to the function module corresponding to a service of the UE and the network topology, where the target forwarding node is a node between the target access node and the gateway, and is able to bear a part of the function module corresponding to a service of the UE after node handover; and determining a function module of the target forwarding node and a function module of the target access node according to the function module corresponding to a service of the UE and the network topology, where the function module of the target forwarding node and the function module of the target access node form the function module corresponding to a service of the UE.

For example, the source node further includes a source forwarding node, and the first forwarding entry group includes:

a forwarding entry required for sending a data stream by the source access node to the source forwarding node and a forwarding entry required for transmitting a data stream by the source forwarding node to the target node.

Optionally, the source node further includes a source forwarding node, and the first forwarding entry group includes:

a forwarding entry required for sending a data stream by the source access node to the source forwarding node and a forwarding entry required for transmitting a data stream by the source forwarding node to the target forwarding node.

Optionally, step 205 may include:

determining a forwarding entry of the node of the target node according to the function module configured for the target node and the network topology;

determining whether a source node nearest to the gateway before handover and a target node nearest to the gateway after handover are a same node; and if the source node nearest to the gateway before handover and the target node nearest to the gateway after handover are not a same node, determining a forwarding entry of the gateway.

In conclusion, according to the node handover method provided in this embodiment of the present invention, after receiving a protocol configuration request message sent by a target access node, a controller determines, according to a quality of service parameter, a function module corresponding to a service of UE, configures, according to the function module corresponding to a service of the UE and a network topology, a function module for a target node, and determines a first forwarding entry group and a second forwarding entry group, so that a source node can send data temporarily stored in the source node to the target node according to the first forwarding entry group, and the target node performs data stream transmission with a gateway according to the second forwarding entry group. In this way, the target access node serves the UE, handover between nodes in an SDP network system is implemented, and functions of the SDP network system are enriched.

Figure 3:
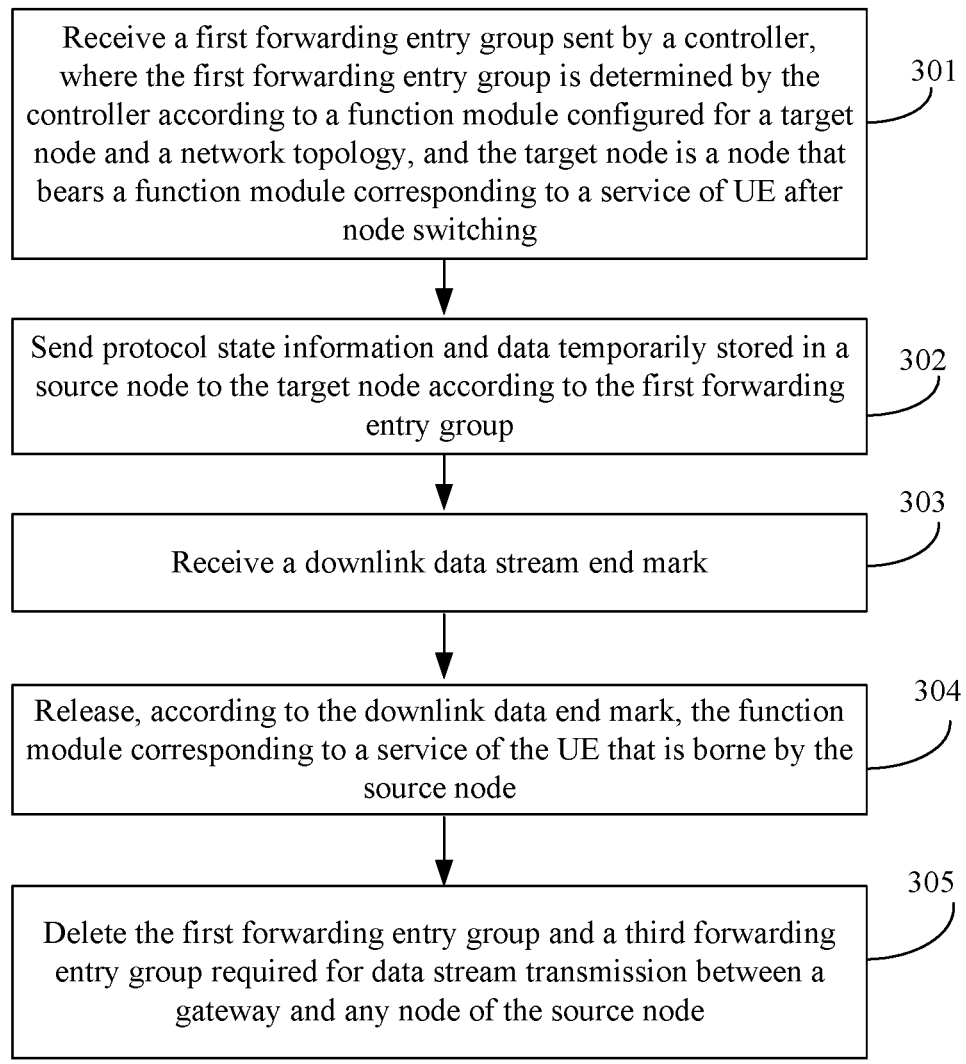
FIG. 3 is a method flowchart of another node handover method according to an embodiment of the present invention.

As shown in FIG. 3, an embodiment of the present invention provides another node handover method that may be applied to a source node. The source node is located in the SDP network system 0 shown in FIG. 1-1 or FIG. 1-2. The source node may be a node of multiple nodes that bears a function module corresponding to a service of UE-04 before node handover. The node handover method may include:

Step 301. Receive a first forwarding entry group sent by a controller, where the first forwarding entry group is determined by the controller according to a function module configured for a target node and a network topology, and the target node is a node that bears the function module corresponding to a service of UE after node handover.

Step 302. Send data temporarily stored in a source node to the target node according to the first forwarding entry group.

Step 303. Receive a downlink data stream end mark.

Step 304. Release, according to the downlink data stream end mark, the function module corresponding to a service of the UE that is borne by the source node.

Step 305. Delete the first forwarding entry group and a third forwarding entry group required for data stream transmission between a gateway and any node of the source node.

In conclusion, according to the node handover method provided in this embodiment of the present invention, a source node receives a first forwarding entry group sent by a controller, where the first forwarding entry group is determined by the controller according to a function module configured for a target node and a network topology, so that the source node can send data temporarily stored in the source node to the target node according to the first forwarding entry group, and further, a target access node of the target node sends the data temporarily stored in the source node to UE. In this way, the target access node serves the UE, handover between nodes in an SDP network system is implemented, and functions of the SDP network system are enriched.

Optionally, the source node may be a source access node. The source access node is a node accessed by the UE before node handover. Before step 301, the node handover method may further include:

sending a handover request message to a target access node, where the target access node is a node accessed by the UE after node handover, and the handover request message includes a quality of service parameter, so that the target access node determines, according to the handover request message, whether the UE is able to access the target access node, and when the UE is able to access the target access node, sends a protocol configuration request message to the controller.

In conclusion, according to the node handover method provided in this embodiment of the present invention, a source node receives a first forwarding entry group sent by a controller, where the first forwarding entry group is determined by the controller according to a function module configured for a target node and a network topology, so that the source node can send data temporarily stored in the source node to the target node according to the first forwarding entry group, and further, a target access node of the target node sends the data temporarily stored in the source node to UE. In this way, the target access node serves the UE, handover between nodes in an SDP network system is implemented, and functions of the SDP network system are enriched.

As shown in FIG. 4-1A, FIG. 4-1B, and FIG. 4-1C, an embodiment of the present invention provides still another node handover method, applied to the SDP network system 0 shown in FIG. 1-1. For example, the node handover method may include the following steps.

Step 401. UE performs data stream exchange with a gateway by using a source access node and a source forwarding node. Step 402 is performed.

Figures 1A, 4:
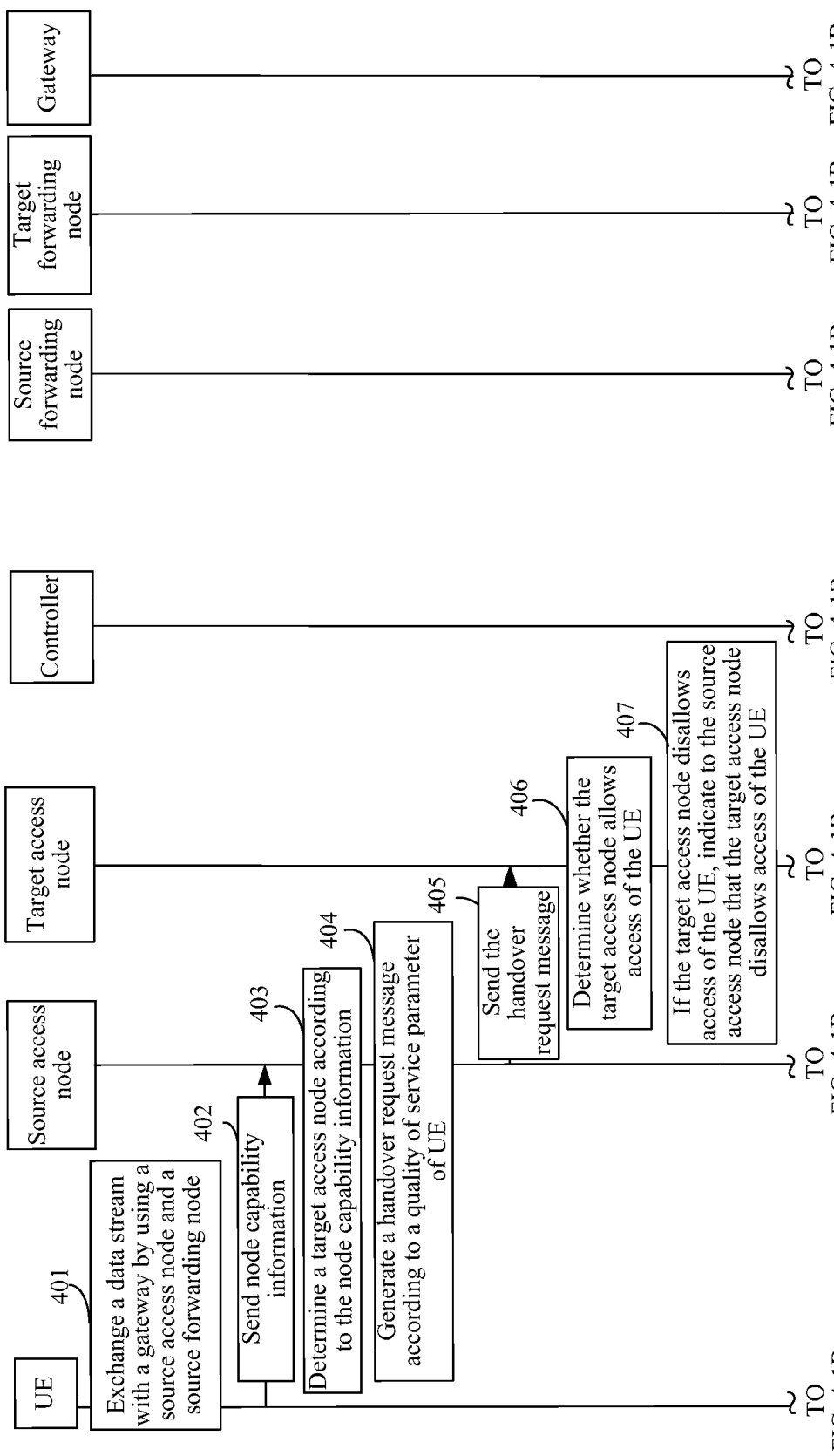
FIG. 4-1A, FIG. 4-1B, and FIG. 4-1C are a method flowchart of still another node handover method according to an embodiment of the present invention.

Optionally, as shown in FIG. 4-2, step 401 may include the following steps.

Step 4011. The UE sends a service request to a controller.

When the UE needs to execute a service, the UE can generate the service request according to identifier information of the UE and a quality of service parameter of the service, and send the service request to the controller.

Step 4012. The controller determines, according to the service request, a function module corresponding to a service of the UE.

For example, the controller may determine, according to the identifier information of the UE and the quality of service parameter that are in the service request, the function module corresponding to a service of the UE. It should be noted that multiple protocol layers may be set for each device in the SDP network system, and multiple function modules may be configured at each protocol layer. Optionally, the controller may determine, according to the identifier information of the UE and the quality of service parameter, an access technology supported by the UE and select, according to the access technology and the quality of service parameter, the corresponding function module processing a service of the UE. For example, when the controller receives the service request sent by the UE, the controller may determine, according to the service request, that a protocol layer at which a processing module corresponding to the UE is located is a physical layer (PHY for short), a Media Access Control (MAC for short) layer, a radio link control (RLC for short) layer, and a packet data convergence protocol (PDCP for short) layer, and determine, at the PHY layer, the MAC layer, the RLC layer, and the PDCP layer according to the service request, function modules corresponding to a service of the UE.

It should be noted that in this embodiment of the present invention, the node handover method is described by using an example in which the protocol layer at which the processing module corresponding to the UE is located includes the PHY layer, the MAC layer, the RLC layer, and the PDCP layer. In actual application, the processing module corresponding to the UE may alternatively be located at another protocol layer. This is not limited in this embodiment of the present invention.

Step 4013. The controller determines the source access node and the source forwarding node according to the function module corresponding to a service of the UE and a network topology.

It should be noted that the network topology of the SDP network system may be maintained in the controller. A connection relationship between all devices in the SDP network system and a function attribute of each device in the SDP network system may be recorded in the network topology. For example, the controller may determine, according to the function module corresponding to a service of the UE and the network topology, the source access node and the source forwarding node that are configured to bear the function module corresponding to a service of the UE.

As shown in FIG. 1-1, it is assumed that the function module corresponding to a service of the UE determined in step 4012 is a PHY layer function module 1, a MAC layer function module 2, an RLC layer function module 3, and a PDCP layer function module 4, and it is determined, according to the network topology, that a node currently accessed by the UE is a node 032a. The controller determines, according to a function attribute of the node 032a currently accessed by the UE recorded in the network topology and the function module corresponding to a service of the UE, that the node 032a currently accessed by the UE can bear the PHY layer function module 1, the MAC layer function module 2, and the RLC layer function module 3, but the node 032a currently accessed by the UE cannot bear the PDCP layer function module 4. In this case, it can be learned according to the network topology that a node 032b that can perform data stream exchange with the node 032a currently accessed by the UE can bear the PDCP layer function module 4. Therefore, the node 032b can be determined as a forwarding node corresponding to the node 032a currently accessed by the UE. In addition, the node 032a currently accessed by the UE and the forwarding node 032b corresponding to the node 032a currently accessed by the UE are determined as source nodes. In this case, the node 032a currently accessed by the UE is referred to as the source access node, and the forwarding node 032b corresponding to the node 032a currently accessed by the UE is referred to as the source forwarding node.

Step 4014. The controller configures function modules for the source access node and the source forwarding node.

For example, as shown in FIG. 1-1, the controller may configure the PHY layer function module 1, the MAC layer function module 2, and the RLC layer function module 3 for the source access node 032a, and configure the PDCP layer function module 4 for the source forwarding node 032b. On the one hand, the controller may generate a source access node configuration command according to the PHY layer function module 1, the MAC layer function module 2, and the RLC layer function module 3, and generate a source forwarding node configuration command according to the PDCP layer function module 4. In addition, the controller sends the source access node configuration command to the source access node 032a, and sends the source forwarding node configuration command to the source forwarding node 032b, so that the source access node 032a activates the corresponding function modules according to the source access node configuration command, and the source forwarding node 032b activates the corresponding function module according to the source forwarding node configuration command. On the other hand, the controller may generate source access node configuration information according to the PHY layer function module 1, the MAC layer function module 2, and the RLC layer function module 3, and generate source forwarding node configuration information according to the PDCP layer function module 4. In addition, the controller sends the source access node configuration information to the source access node 032a, and sends the source forwarding node configuration information to the source forwarding node 032b, so that the source access node 032a configures the corresponding function modules according to the source access node configuration information, and the source forwarding node 032b configures the corresponding function module according to the source forwarding node configuration information.

Step 4015. The controller configures, for the source access node, the source forwarding node, and the gateway, a third forwarding entry group required for data stream transmission between the source access node, the source forwarding node, and the gateway.

After determining the source nodes, the controller may determine, according to the network topology, forwarding entries of the third forwarding entry group required for data stream transmission between the source access node, the source forwarding node, and the gateway, and send configuration information of the forwarding entries of the third forwarding entry group to the source access node, the source forwarding node, and the gateway, so that the source access node, the source forwarding node, and the gateway configure the corresponding forwarding entries according to the received configuration information. Specifically, the third forwarding entry group may include a forwarding entry required for sending a data stream by the source access node to the source forwarding node, a forwarding entry required for sending a data stream by the source forwarding node to the source access node, a forwarding entry required for sending a data stream by the source forwarding node to the gateway, and a forwarding entry required for sending a data stream by the gateway to the source forwarding node. Then, configuration information of the forwarding entry required for sending a data stream by the source access node to the source forwarding node is sent to the source access node. Configuration information of the forwarding entry required for sending a data stream by the source forwarding node to the source access node is sent to the source forwarding node. Configuration information of the forwarding entry required for sending a data stream by the source forwarding node to the gateway is sent to the source forwarding node. Configuration information of the forwarding entry required for sending a data stream by the gateway to the source forwarding node is sent to the gateway.

Step 4016. The controller configures, for the UE, the function module corresponding to a service of the UE.

It is assumed that the PHY layer function module 1, the MAC layer function module 2, the RLC layer function module 3, and the PDCP layer function module 4 are determined as the function modules corresponding to a service of the UE. On the one hand, the controller may generate a UE configuration command according to the PHY layer function module 1, the MAC layer function module 2, the RLC layer function module 3, and the PDCP layer function module 4, and send the UE configuration command to the UE, so that the UE activates the corresponding function modules according to the UE configuration command. On the other hand, the controller may generate UE configuration information according to the PHY layer function module 1, the MAC layer function module 2, the RLC layer function module 3, and the PDCP layer function module 4, and send the UE configuration information to the UE, so that the UE configures the corresponding function module according to the UE configuration information.

Step 4017. The UE performs data stream exchange with the gateway by using the source access node and the source forwarding node.

For example, as shown in FIG. 1-1, the source nodes determined in step 4013 include the source access node 032a and the source forwarding node 032b. Therefore, in step 4017, the UE can perform data stream exchange with a gateway 02 by using the source access node 032a and the source forwarding node 032b.

Step 402. The UE sends node capability information to the source access node. Step 403 is performed.

For example, the UE may regularly obtain capability information of each node within a detection range of the UE. The capability information of the node may be signal quality strength of the node, obtained by the UE. It should be noted that the capability information of the node may alternatively be other information. This is not limited in this embodiment of the present invention. The UE may establish a connection to the source access node by using an air interface. After the UE obtains the capability information of each node within the detection range of the UE, the UE may send the capability information of each node within the detection range of the UE to the source access node by using the air interface.

Step 403. The source access node determines a target access node according to the node capability information. Step 404 is performed.

After receiving the capability information of each node within the detection range of the UE that is sent by the UE, the source access node may obtain, by means of filtering according to a preset filtering manner from the multiple nodes within the detection range of the UE, a node satisfying a filtering condition as the target access node. For example, a preset capability threshold may be stored in the source access node. The source access node may compare the preset capability threshold with a capability value indicated by the capability information of each node within the detection range of the UE, so as to obtain, by means of filtering from the multiple nodes within the detection range of the UE, nodes whose capability values indicated by the capability information are greater than the preset capability threshold, and determine, among the nodes whose capability values indicated by the capability information of the nodes are greater than the preset capability threshold, a node with a greatest capability value indicated by capability information as the target access node. It should be noted that if the capability values indicated by the capability information of all nodes within the detection range of the UE are less than the preset capability threshold, the source access node skips the action. In actual application, the source access node may alternatively determine the target access node in another manner. This is not limited in this embodiment of the present invention. As shown in FIG. 4-3, when UE-04 moves from a location near a source access node 032a to a location near a node 033a, the source access node 032a determines the node 033a as the target access node.

Step 404. The source access node generates a handover request message according to a quality of service parameter of the UE. Step 405 is performed.

The quality of service parameter of the UE may be stored in the source access node. The source access node may generate the handover request message according to the quality of service parameter of the UE. The handover request message is used to indicate that the UE needs to access the target access node. Optionally, the source access node may alternatively obtain the quality of service parameter of the UE from the UE.

Step 405. The source access node sends the handover request message to the target access node. Step 406 is performed.

The source access node determines the target access node in step 403, and the source access node generates the handover request message in step 405. Therefore, in step 405, the source access node may send the handover request message to the target access node according to an identifier of the target access node. For example, the handover request message may be sent to the target access node in a form of signaling.

Step 406. The target access node determines whether the target access node allows access of the UE. If the target access node disallows access of the UE, step 407 is performed. If the target access node allows access of the UE, step 408 is performed.

After receiving the handover request message sent by the source access node, the target access node may determine, according to the quality of service parameter of the UE in the handover request message, whether the target access node allows access of the UE. If the target access node disallows access of the UE, step 407 is performed. If the target access node allows access of the UE, step 408 is performed. Optionally, for a specific step of determining, by the target access node according to the quality of service parameter of the UE in the handover request message, whether the target access node allows access of the UE, reference may be made to a specific step of determining, by a node according to a quality of service parameter, whether the node allows access of UE in the conventional art, and details are not described herein in this embodiment of the present invention.

Step 407. The target access node indicates to the source access node that the target access node disallows access of the UE.

If the target access node disallows access of the UE, the target access node may generate a message used to indicate that the target access node disallows access of the UE, and send, to the source access node, the message used to indicate that the target access node disallows access of the UE, so that after receiving the message used to indicate that the target access node disallows access of the UE, the source access node determines that the target access node disallows access of the UE.

Step 408. The target access node indicates to the source access node that the target access node allows access of the UE. Step 409 is performed.

The target access node may generate a handover feedback message used to indicate that the target access node allows access of the UE, and send the handover feedback message to the source access node.

Step 409. The source access node generates a handover command. Step 410 is performed.

After receiving the handover feedback message sent by the target access node, the source access node may generate the handover command used to instruct the UE to perform node handover. For example, the handover command may include the identifier of the target access node. It should be noted that the handover command may further include other information. This is not limited in this embodiment of the present invention.

Step 410. The source access node sends the handover command to the UE. Step 411 is performed.

For example, the source access node may send, to the UE by using the air interface, the handover command generated by the source access node.

Step 411. The UE establishes a connection to the target access node according to the handover command. Step 412 is performed.

After receiving the handover command used to instruct the UE to perform node handover, the UE may disconnect from the source access node and establish the connection to the target access node according to the handover command. For example, the UE may further re-establish a protocol layer for the UE. For a specific step of re-establishing, by the UE, the protocol layer for the UE, reference may be made to a specific step of establishing, by UE, a protocol layer in the conventional art, and details are not described herein in this embodiment of the present invention.

Step 412. The target access node generates a protocol configuration request message according to the handover request message. Step 413 is performed.

If the target access node allows access of the UE, the target access node may generate the protocol configuration request message according to the handover request message sent by the source access node. Both the handover request message and the protocol configuration request message may include the quality of service parameter of the UE. The protocol configuration request message is used to instruct to configure a function module for the target access node.

Step 413. The target access node sends the protocol configuration request message to a controller. Step 414 is performed.

Optionally, the target access node may send the generated protocol configuration request message to the controller. For example, the protocol configuration request message may be sent to the controller in a form of signaling.

Step 414. The controller determines, according to the protocol configuration request message, a function module corresponding to a service of the UE. Step 415 is performed.

The controller may determine, according to the quality of service parameter of the UE in the protocol configuration request message, the function module corresponding to a service of the UE. Optionally, multiple protocol layers may be set for each device in the SDP network system, and multiple function modules may be configured at each protocol layer. Multiple protocol layers may be set for the UE, and multiple function modules may be configured at each protocol layer of the UE, where functions of the function modules are different. For example, the controller may select, according to the quality of service parameter of the UE, the corresponding function module processing a service of the UE. The function module corresponding to a service of the UE may be a PHY layer function module 1, a MAC layer function module 2, an RLC layer function module 3, and a PDCP layer function module 4.

Step 415. The controller determines a target forwarding node according to the function module corresponding to a service of the UE and a network topology. Step 416 is performed.

The network topology of the SDP network system may be stored and maintained in the controller, that is, a connection relationship among multiple devices in the SDP network system and a function attribute of each device in the SDP network system. The controller may determine, according to the function module corresponding to a service of the UE determined in step 414 and the network topology of the SDP network system, the target forwarding node corresponding to the target access node, so that the target access node can send a data stream in the target access node to the gateway. That is, the controller determines, according to the function module corresponding to a service of the UE and the network topology, the target access node and the target forwarding node that bear the function module corresponding to a service of the UE after node handover. As shown in FIG. 4-3, when the UE-04 moves from a location near the source access node 032a to a location near the node 033a, the source access node 032a determines the node 033a as the target access node. In this case, a controller 01 may determine, according to the function module corresponding to a service of the UE and the network topology, that the node 033b is the target forwarding node corresponding to the target access node 033a.

Step 416. The controller configures function modules for the target access node and the target forwarding node. Step 417 is performed.

After determining the target access node and the target forwarding node, the controller may configure the function modules for the target access node and the target forwarding node according to the function module corresponding to a service of the UE and the network topology.

For example, it is assumed that the function module corresponding to a service of the UE includes the PHY layer function module 1, the MAC layer function module 2, the RLC layer function module 3, and the PDCP layer function module 4. As shown in FIG. 4-3, the controller may configure the PHY layer function module 1, the MAC layer function module 2, and the RLC layer function module 3 for the target access node 033*a*, and configure the PDCP layer function module 4 for the target forwarding node 033*b*. On the one hand, the controller may generate a target access node configuration command according to the PHY layer function module 1, the MAC layer function module 2, and the RLC layer function module 3, and generate a target forwarding node configuration command according to the PDCP layer function module 4. In addition, the controller sends the target access node configuration command to the target access node 033*a*, and sends the target forwarding node configuration command to the target forwarding node 033*b*, so that the target access node 033*a* activates the corresponding function modules according to the target access node configuration command, and the target forwarding node 033*b* activates the corresponding function module according to the target forwarding node configuration command. On the other hand, the controller may generate target access node configuration information according to the PHY layer function module 1, the MAC layer function module 2, and the RLC layer function module 3, and generate target forwarding node configuration information according to the PDCP layer function module 4. In addition, the controller sends the target access node configuration information to the target access node 033*a*, and sends the target forwarding node configuration information to the target forwarding node 033*b*, so that the target access node 033*a* configures the corresponding function modules according to the target access node configuration information, and the target forwarding node 033*b* configures the corresponding function module according to the target forwarding node configuration information.

Step 417. The controller configures a first forwarding entry group for the source access node and the source forwarding node. Step 418 is performed.

The controller may determine, according to the function modules configured for the target access node and the target forwarding node and the network topology, a forwarding entry required for sending a data stream by the source access node to the source forwarding node and a forwarding entry required for data stream transmission between the source forwarding node and the target forwarding node. For example, the first forwarding entry group may include a forwarding entry required for sending a data stream by the source forwarding node to the target forwarding node and the forwarding entry required for sending a data stream by the source access node to the source forwarding node. Then, the controller may send, to the source forwarding node, configuration information of the forwarding entry required for sending a data stream by the source forwarding node to the target forwarding node, and send, to the source access node, configuration information of the forwarding entry required for sending a data stream by the source access node to the source forwarding node, so that the source access node and the source forwarding node configure the corresponding forwarding entries according to the received configuration information of the forwarding entries.

It should be noted that in step 4015, the controller configures the forwarding entry of the third forwarding entry group for the source access node, so that the source access node sends, to the source forwarding node according to the forwarding entry of the third forwarding entry group, data sent by the UE. However, the forwarding entry of the first forwarding entry group configured for the source access node in step 417 is used to forward data temporarily stored in the source access node, that is, data sent by the source forwarding node to the source access node. The data sent by the source forwarding node to the source access node is different from data sent by the UE to the source access node. Therefore, the forwarding entry of the third forwarding entry group configured for the source access node in step 4015 cannot be directly used to forward the data temporarily stored in the source access node, and the forwarding entry of the first forwarding entry group needs to be configured for the source access node.

Step 418. The source access node sends, to the source forwarding node according to the first forwarding entry group, data temporarily stored in the source access node. Step 419 is performed.

The source access node may send, to the source forwarding node according to the forwarding entry that is of the first forwarding entry group and that is in the source access node, the data temporarily stored in the source access node. The gateway may send a data stream to the UE by using the source forwarding node and the source access node. For example, after the gateway sends the data stream to the source forwarding node, the source forwarding node may perform encryption processing on the data stream sent by the gateway and send the encrypted data stream to the source access node. The source access node may process the data stream encrypted by the source forwarding node and send the data stream to the UE, and may temporarily store the data stream encrypted by the source forwarding node.

Step 419. The source forwarding node sends protocol state information in the source forwarding node to the target forwarding node. Step 420 is performed.

Before node handover, the gateway may send a data stream to the source access node by using the source forwarding node, and further, the source access node sends the data stream to the UE. For example, after the gateway sends the data stream to the source forwarding node, the source forwarding node may perform, according to protocol state information that is in the source forwarding node and that is corresponding to a forwarding node function, encryption processing on the data stream sent by the gateway, and send the encrypted data stream to the source access node. Optionally, the source forwarding node may send, to the target forwarding node in a form of signaling, the protocol state information that is in the source forwarding node and that is corresponding to the forwarding node function, so that the target forwarding node processes the data stream between the UE and the gateway according to the protocol state information that is in the source forwarding node and that is corresponding to the forwarding node function.

Step 420. The source forwarding node sends, to the target forwarding node according to the first forwarding entry group, the data temporarily stored in the source access node. Step 421 is performed.

For example, after the source access node sends the data temporarily stored in the source access node to the source forwarding node, the source forwarding node may decrypt the data in the source access node and send, according to the forwarding entry of the first forwarding entry group in the source forwarding node, the decrypted data temporarily stored in the source access node to the target forwarding node.

Step 421. The controller configures a second forwarding entry group for the target access node, the target forwarding node, and the gateway. Step 422 is performed.

The second forwarding entry group may include a forwarding entry required for transmitting a data stream by the target access node to the target forwarding node and a forwarding entry required for transmitting a data stream by the target forwarding node to the gateway. The controller may determine, according to the function modules configured for the target access node and the target forwarding node and the network topology, the forwarding entry required for transmitting a data stream by the target access node to the target forwarding node and the forwarding entry required for transmitting a data stream by the target forwarding node to the gateway. In addition, the controller sends configuration information of the forwarding entry required for transmitting a data stream by the target access node to the target forwarding node to both the target access node and the target forwarding node, and sends configuration information of the forwarding entry required for transmitting a data stream by the target forwarding node to the gateway to both the target forwarding node and the gateway, so that the target access node, the target forwarding node, and the gateway configure corresponding forwarding entry according to the received configuration information of the forwarding entry. In this way, the second forwarding entry group is configured for the target access node, the target forwarding node, and the gateway.

It should be noted that after the controller configures the forwarding entry of the second forwarding entry group for the target forwarding node, the target forwarding node may encrypt, according to the protocol state information that is in the source forwarding node, that is corresponding to the forwarding node function, and that is sent by the source forwarding node in step 419, the data that is temporarily stored in the source access node and that is sent by the source forwarding node in step 420. In addition, the target forwarding node sends, according to the forwarding entry of the second forwarding entry group, the encrypted data temporarily stored in the source access node to the target access node. The target access node temporarily stores the data temporarily stored in the source access node. It should be noted that after receiving the data that is temporarily stored in the source access node and that is sent by the target forwarding node, the target access node may alternatively send the data temporarily stored in the source access node to the UE.

Step 422. The gateway sends a downlink data stream end mark to the source forwarding node. Step 423 is performed.

Before node handover, the gateway is connected to the Internet, and therefore, the gateway may receive a downlink data stream sent by the Internet and send the downlink data stream to the source forwarding node. The source forwarding node sends the downlink data stream to the source access node. Finally, the source access node sends the downlink data stream to the UE. After the source access node and the source forwarding node receive the configuration information of the forwarding entry of the first forwarding entry group and configure the corresponding forwarding entry according to the received configuration information of the forwarding entry, the source access node may send, to the source forwarding node according to the forwarding entry of the first forwarding entry group, the data temporarily stored in the source access node, so that the source forwarding node sends, to the target forwarding node according to the forwarding entry of the first forwarding entry group, the data temporarily stored in the source access node. After receiving the configuration information of the forwarding entry of the second forwarding entry group, the gateway may generate the downlink data stream end mark and send the downlink data stream end mark to the source forwarding node.

After receiving the downlink data stream end mark sent by the gateway, the source forwarding node may send the downlink data stream end mark to the source access node. After sending the data temporarily stored in the source access node to the source forwarding node, the source access node may release protocol state information in the source access node according to the downlink data stream end mark, and may further delete, according to the downlink data stream end mark, the forwarding entry of the first forwarding entry group and the forwarding entry of the third forwarding entry group that are in the source access node. The source access node may further send the downlink data stream end mark to the source forwarding node. After receiving the downlink data stream end mark sent by the source access node, the source forwarding node may release the protocol state information in the source forwarding node according to the downlink data stream end mark. The source forwarding node may further delete, according to the downlink data stream end mark, the forwarding entry of the first forwarding entry group and the forwarding entry of the third forwarding entry group that are in the source forwarding node.

Step 423. The UE performs data stream exchange with the gateway by using the target access node and the target forwarding node.

For example, after the UE establishes a connection to the target access node, the forwarding entry of the second forwarding entry group required for data stream transmission between a target node and the gateway are configured for the target access node, the target forwarding node, and the gateway, the data temporarily stored in the source access node is sent to the target access node, and the protocol state information in the source forwarding node is sent to the target forwarding node, the UE can perform data stream exchange with the gateway by using the target access node and the target forwarding node, and perform handover from the source access node and the source forwarding node to the target access node and the target forwarding node.

Further, a downlink data stream received by the UE may include multiple downlink data packets. After step 423, the UE may detect whether the received downlink data stream is complete. If the UE detects that the downlink data stream received by the UE is incomplete, the UE may generate downlink data packet retransmission indication information according to a downlink data packet that is not received by the UE, and send the downlink retransmission indication information to the target access node. The target access node and the target forwarding node retransmit, to the UE according to the downlink data packet retransmission indication information, the downlink data packet that is not received by the UE.

The controller in this embodiment of the present invention can configure function modules for nodes and can configure forwarding entry for nodes and the gateway. In actual application, the controller may include an SDP controller and an SDN controller. The SDP controller is configured to configure the function modules for the nodes. The software defined networking (SDN for short) controller is configured to configure the forwarding entry for the nodes and the gateway. It should be noted that on the one hand, in this embodiment of the present invention, the node handover method is described by using an example in which the source access node determines the target access node. In actual application, alternatively, the controller may determine the target access node and the target forwarding node. This is not limited in this embodiment of the present invention. On the other hand, in this embodiment of the present invention, the node handover method is described by using an example in which the source access node is corresponding to one source forwarding node, and the target access node is corresponding to one target forwarding node. In actual application, a quantity of the source forwarding nodes may be another value, and a quantity of the target forwarding nodes may be another value. This is not limited in this embodiment of the present invention.

It should be noted that the order of the node handover method steps in this embodiment of the present invention may be appropriately adjusted, and the steps may also be correspondingly added or deleted according to a situation. All variant methods readily figured out by a person skilled in the art within the technical scope disclosed in the present invention shall fall within the protection scope of the present invention, and therefore are not described.

In conclusion, according to the node handover method provided in this embodiment of the present invention, after receiving a protocol configuration request message sent by a target access node, a controller determines, according to a quality of service parameter, a function module corresponding to a service of UE, configures, according to the function module corresponding to a service of the UE and a network topology, a function module for a target node, and determines a first forwarding entry group and a second forwarding entry group, so that a source node can send data temporarily stored in the source node to the target node according to the first forwarding entry group, and the target node performs data stream transmission with a gateway according to the second forwarding entry group. In this way, the target access node serves the UE, handover between nodes in an SDP network system is implemented, and functions of the SDP network system are enriched.

As shown in FIG. 5-1A, FIG. 5-1B, and FIG. 5-1C, an embodiment of the present invention provides yet another node handover method, applied to the SDP network system 0 shown in FIG. 1-2. For example, the node handover method may include the following steps.

Step 501. UE performs data stream exchange with a gateway by using a source access node. Step 502 is performed.

Figures 1A, 5:
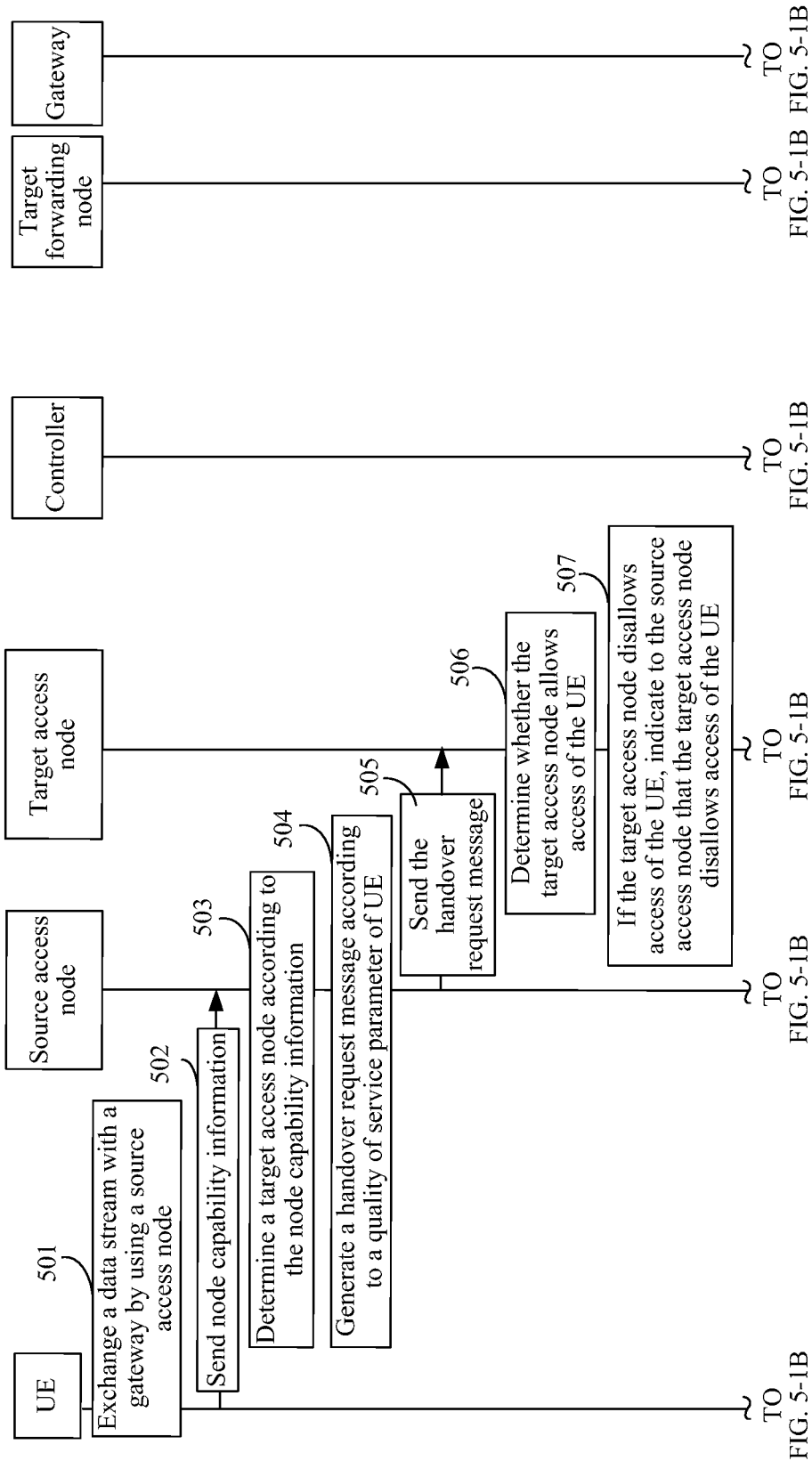
Figures 1B, 5:
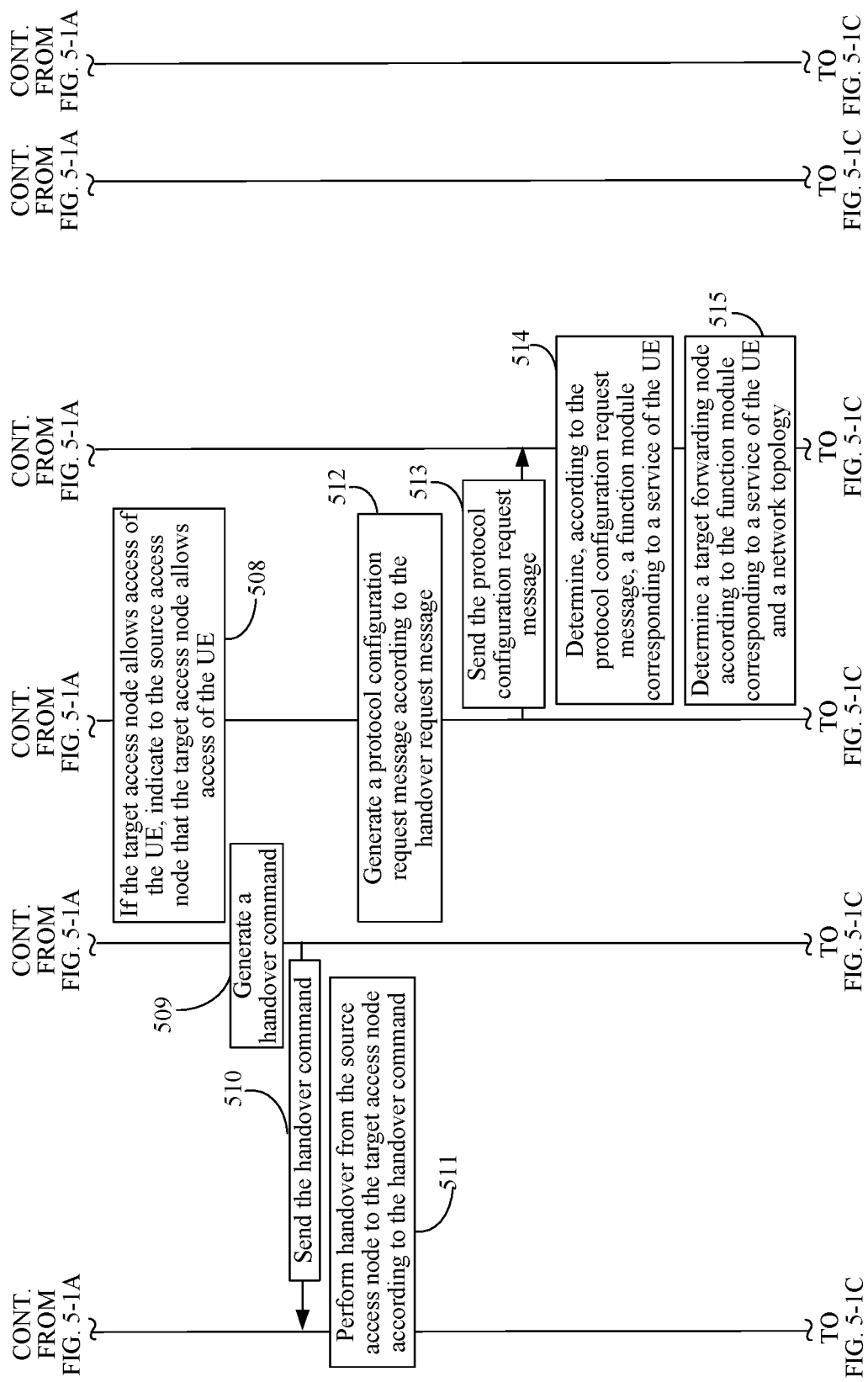
Figures 1C, 5:
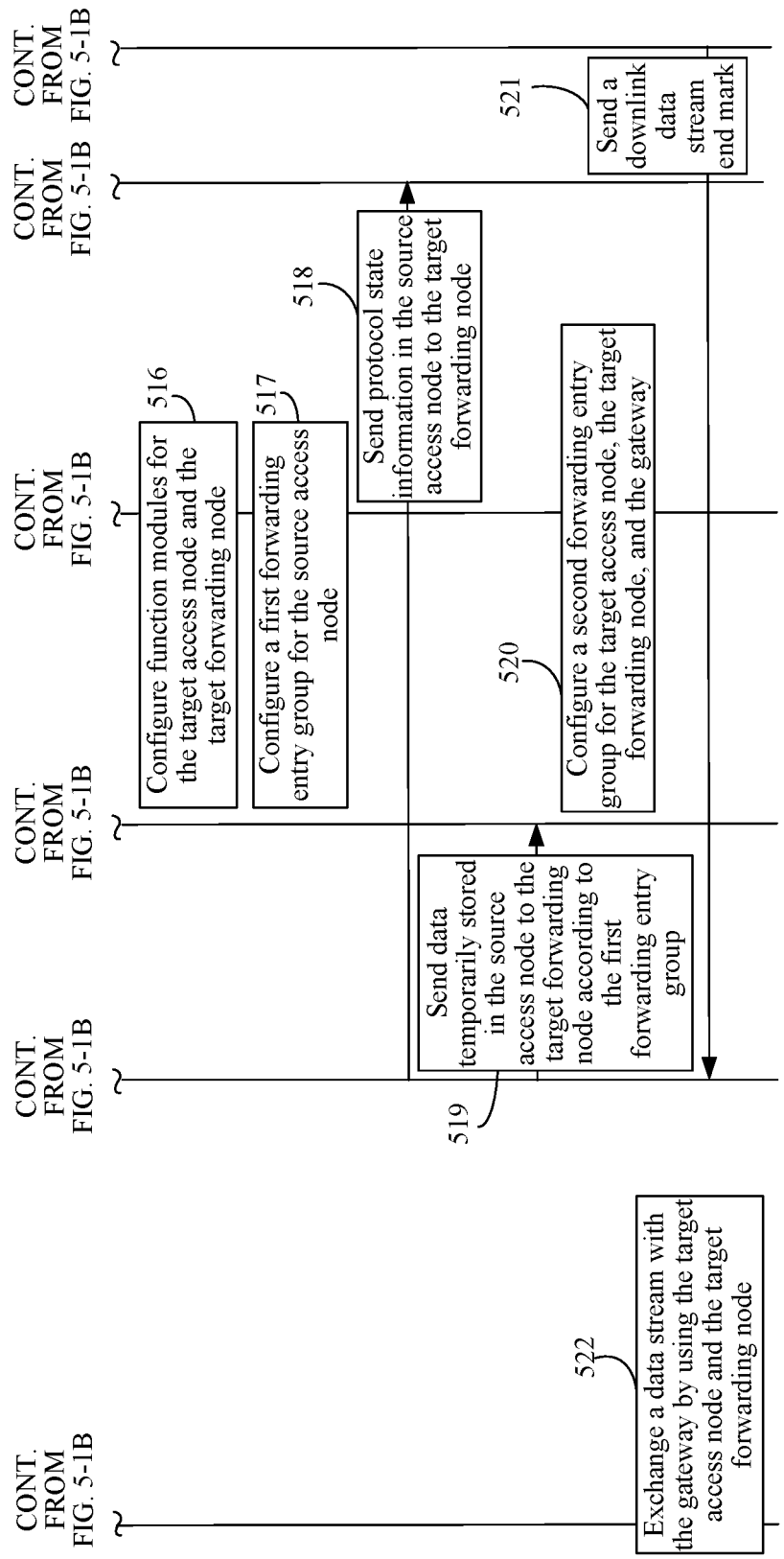
Figures 2, 5:
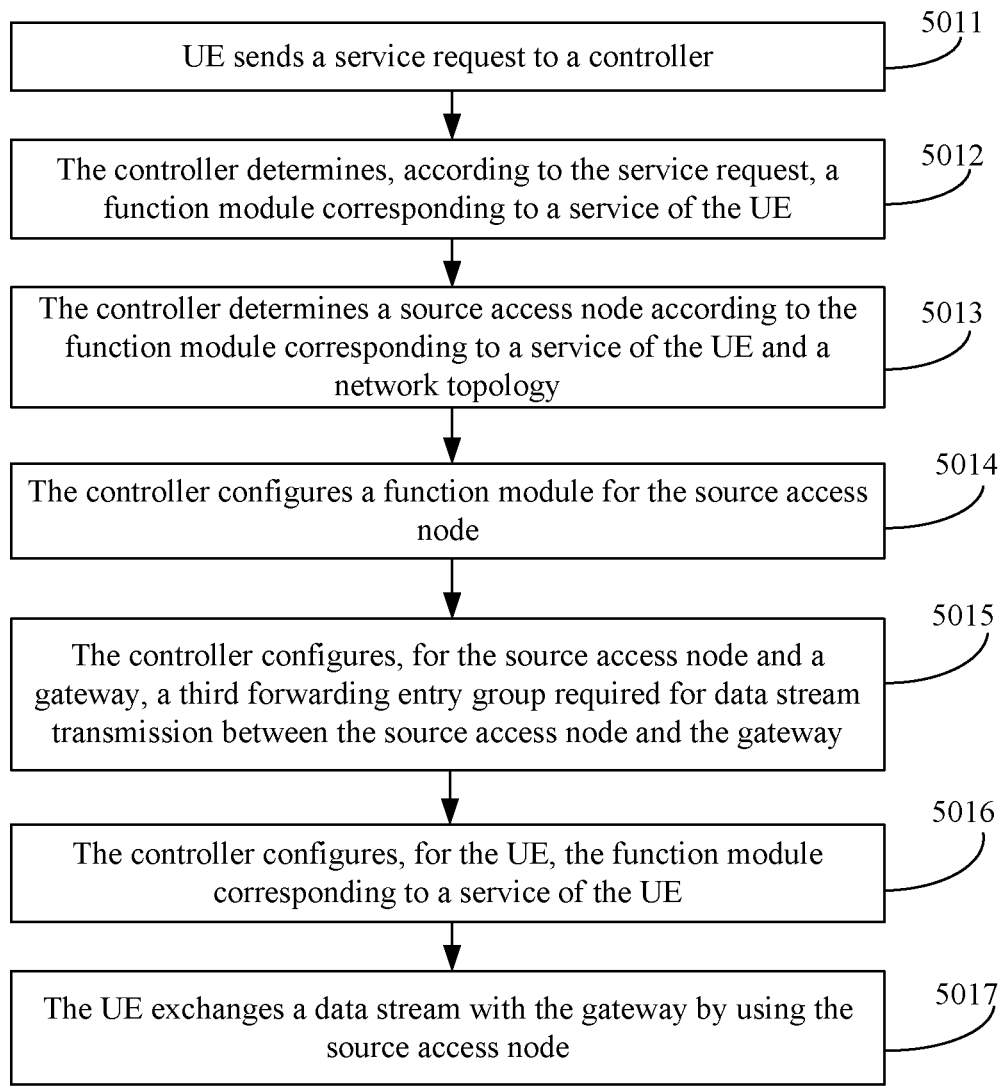
Figures 3, 5:
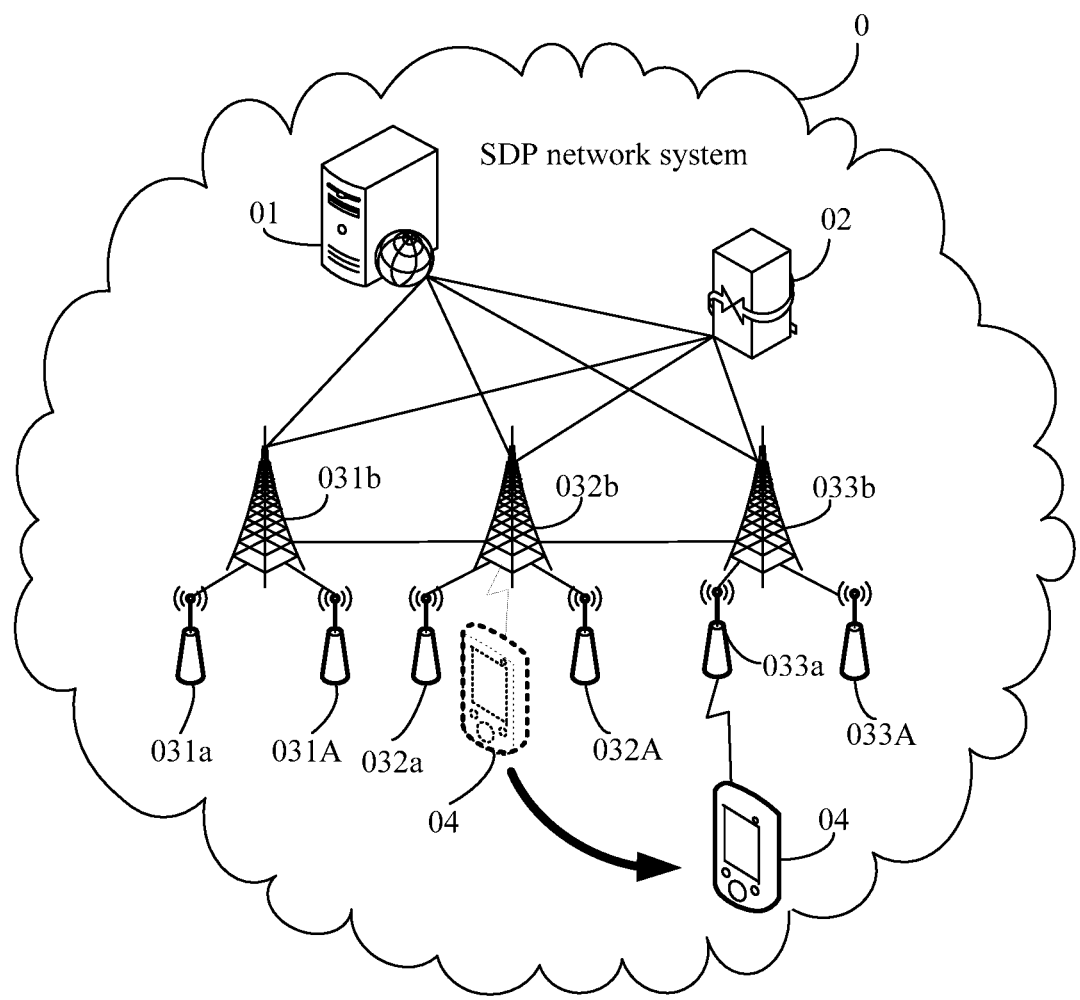

Optionally, as shown in FIG. 5-2, step 501 may include the following steps.

Step S011. The UE sends a service request to a controller.

When the UE needs to execute a service, the UE can generate the service request according to identifier information of the UE and a quality of service parameter of the service, and send the service request to the controller.

Step S012. The controller determines, according to the service request, a function module corresponding to a service of the UE.

For example, the controller may determine, according to the identifier information of the UE and the quality of service parameter that are in the service request, the function module corresponding to a service of the UE. It should be noted that multiple protocol layers may be set for each device in the SDP network system, and multiple function modules may be configured at each protocol layer. Optionally, the controller may determine, according to the identifier information of the UE and the quality of service parameter, an access technology supported by the UE and select, according to the access technology and the quality of service parameter, the corresponding function module processing a service of the UE. For example, after the controller receives the service request sent by the UE, the controller may determine, according to the service request, that a protocol layer at which a processing module corresponding to the UE is located includes a PHY layer, a MAC layer, an RLC layer, and a PDCP layer, and determine, at the PHY layer, the MAC layer, the RLC layer, and the PDCP layer according to the service request, function modules corresponding to a service of the UE.

It should be noted that in this embodiment of the present invention, the node handover method is described by using an example in which the protocol layer at which the processing module corresponding to the UE is located includes the PHY layer, the MAC layer, the RLC layer, and the PDCP layer. In actual application, the processing module corresponding to the UE may alternatively be located at another protocol layer. This is not limited in this embodiment of the present invention.

Step S013. The controller determines the source access node according to the function module corresponding to a service of the UE and a network topology.

It should be noted that the network topology of the SDP network system may be maintained in the controller. A connection relationship between all devices in the SDP network system and a function attribute of each device in the SDP network system may be recorded in the network topology. For example, the controller may determine, according to the function module corresponding to a service of the UE and the network topology, the source access node configured to bear the function module corresponding to a service of the UE.

As shown in FIG. 1-2, it is assumed that the function module corresponding to a service of the UE determined in step S012 includes a PHY layer function module 1, a MAC layer function module 2, an RLC layer function module 3, and a PDCP layer function module 4, and a node currently accessed by the UE is determined as a node 032b according to the network topology. The controller determines, according to a function attribute of the node 032b currently accessed by the UE recorded in the network topology and the function module corresponding to a service of the UE, that the node 032b currently accessed by the UE can bear the PHY layer function module 1, the MAC layer function module 2, the RLC layer function module 3, and the PDCP layer function module 4.

Step S014. The controller configures the function module for the source access node.

For example, as shown in FIG. 1-2, the controller may configure the PHY layer function module 1, the MAC layer function module 2, the RLC layer function module 3, and the PDCP layer function module 4 for the source access node 032b. On the one hand, the controller may generate a source access node configuration command according to the PHY layer function module 1, the MAC layer function module 2, the RLC layer function module 3, and the PDCP layer function module 4. In addition, the controller sends the source access node configuration command to the source access node 032b, so that the source access node 032b activates the corresponding function modules according to the source access node configuration command. On the other hand, the controller may generate source access node configuration information according to the PHY layer function module 1, the MAC layer function module 2, the RLC layer function module 3, and the PDCP layer function module 4, and send the source access node configuration information to the source access node 032b, so that the source access node 032*b* configures the corresponding function modules according to the source access node configuration information.

Step S015. The controller configures, for the source access node and the gateway, a third forwarding entry group required for data stream transmission between the source access node and the gateway.

After determining a source node, the controller may determine, according to the network topology, a forwarding entry of the third forwarding entry group required for transmitting a data stream by the source access node to the gateway, and send configuration information of the forwarding entry of the third forwarding entry group to both the source access node and the gateway, so that the source access node and the gateway configure the corresponding forwarding entry according to the received configuration information. In this way, the third forwarding entry group required for data stream transmission between the source access node and the gateway is configured for the source access node and the gateway. Specifically, the third forwarding entry group may include a forwarding entry required for sending a data stream by the source access node to the gateway and a forwarding entry required for sending a data stream by the gateway to the source access node. Then, configuration information of the forwarding entry required for sending a data stream by the source access node to the gateway is sent to the source access node. Configuration information of the forwarding entry required for sending a data stream by the gateway to the source access node is sent to the gateway.

Step S016. The controller configures, for the UE, the function module corresponding to a service of the UE.

It is assumed that the PHY layer function module 1, the MAC layer function module 2, the RLC layer function module 3, and the PDCP layer function module 4 are determined as the function modules corresponding to a service of the UE. On the one hand, the controller may generate a UE configuration command according to the PHY layer function module 1, the MAC layer function module 2, the RLC layer function module 3, and the PDCP layer function module 4, and send the UE configuration command to the UE, so that the UE activates the corresponding function modules according to the UE configuration command. On the other hand, the controller may generate UE configuration information according to the PHY layer function module 1, the MAC layer function module 2, the RLC layer function module 3, and the PDCP layer function module 4, and send the UE configuration information to the UE, so that the UE configures the corresponding function modules according to the UE configuration information.

Step S017. The UE performs data stream exchange with the gateway by using the source access node.

For example, as shown in FIG. 1-2, the source node determined in step S013 includes the source access node 032*b*. Therefore, in step S017, the UE can perform data stream exchange with a gateway 02 by using the source access node 032*b*.

Step 502. The UE sends node capability information to the source access node. Step 503 is performed.

For example, the UE may regularly obtain capability information of each node within a detection range of the UE. The capability information of the node obtained by the UE may be signal quality strength of the node, obtained by the UE. It should be noted that the capability information of the node may alternatively be other information. This is not limited in this embodiment of the present invention. The UE may establish a connection to the source access node by using an air interface. After the UE obtains the capability information of each node within the detection range of the UE, the UE may send the capability information of each node within the detection range of the UE to the source access node by using the air interface.

Step 503. The source access node determines a target access node according to the node capability information. Step 504 is performed.

After receiving the capability information of each node within the detection range of the UE that is sent by the UE, the source access node may obtain, by means of filtering according to a preset filtering manner from the multiple nodes within the detection range of the UE, a node satisfying a filtering condition as the target access node. For example, a preset capability threshold may be stored in the source access node. The source access node may compare the preset capability threshold with a capability value indicated by the capability information of each node within the detection range of the UE, so as to obtain, by means of filtering from the multiple nodes within the detection range of the UE, nodes whose capability values indicated by the capability information are greater than the preset capability threshold, and determine, among the nodes whose capability values indicated by the capability information of the nodes are greater than the preset capability threshold, a node with a greatest capability value indicated by capability information as the target access node. It should be noted that if the capability values indicated by the capability information of all nodes within the detection range of the UE are less than the preset capability threshold, the source access node skips the action. In actual application, the source access node may alternatively determine the target access node in another manner. This is not limited in this embodiment of the present invention. As shown in FIG. 5-3, when UE-04 moves from a location near the source access node 032*b* to a location near a node 033*a*, the source access node 032*b* determines the node 033*a* as the target access node.

Step 504. The source access node generates a handover request message according to a quality of service parameter of the UE. Step 505 is performed.

The quality of service parameter of the UE may be stored in the source access node. The source access node may generate the handover request message according to the quality of service parameter of the UE. The handover request message is used to indicate that the UE needs to access the target access node. Optionally, the source access node may alternatively obtain the quality of service parameter of the UE from the UE.

Step 505. The source access node sends the handover request message to the target access node. Step 506 is performed.

The source access node determines the target access node in step 503, and the source access node generates the handover request message in step 505. Therefore, in step 505, the source access node may send the handover request message to the target access node according to an identifier of the target access node. For example, the handover request message may be sent to the target access node in a form of signaling.

Step 506. The target access node determines whether the target access node allows access of the UE. If the target access node disallows access of the UE, step 507 is performed. If the target access node allows access of the UE, step 508 is performed.

After receiving the handover request message sent by the source access node, the target access node may determine, according to the quality of service parameter of the UE in the handover request message, whether the target access node allows access of the UE. If the target access node disallows access of the UE, step 507 is performed. If the target access node allows access of the UE, step 508 is performed. Optionally, for a specific step of determining, by the target access node according to the quality of service parameter of the UE in the handover request message, whether the target access node allows access of the UE, reference may be made to a specific step of determining, by a node according to a quality of service parameter, whether the node allows access of UE in the conventional art, and details are not described herein in this embodiment of the present invention.

Step 507. The target access node indicates to the source access node that the target access node disallows access of the UE.

If the target access node disallows access of the UE, the target access node may generate a message used to indicate that the target access node disallows access of the UE, and send, to the source access node, the message used to indicate that the target access node disallows access of the UE, so that after receiving the message used to indicate that the target access node disallows access of the UE, the source access node determines that the target access node disallows access of the UE.

Step 508. The target access node indicates to the source access node that the target access node allows access of the UE. Step 509 is performed.

The target access node may generate a handover feedback message used to indicate that the target access node allows access of the UE, and send the handover feedback message to the source access node.

Step 509. The source access node generates a handover command. Step 510 is performed.

After receiving the handover feedback message sent by the target access node, the source access node may generate the handover command used to instruct the UE to perform node handover. For example, the handover command may include the identifier of the target access node. It should be noted that the handover command may further include other information. This is not limited in this embodiment of the present invention.

Step 510. The source access node sends the handover command to the UE. Step 511 is performed.

For example, the source access node may send, to the UE by using the air interface, the handover command generated by the source access node.

Step 511. The UE establishes a connection to the target access node according to the handover command. Step 512 is performed.

After receiving the handover command used to instruct the UE to perform node handover, the UE may disconnect from the source access node and establish the connection to the target access node according to the handover command. For example, the UE may further re-establish a protocol layer for the UE. For a specific step of re-establishing, by the UE, the protocol layer for the UE, reference may be made to a specific step of establishing, by UE, a protocol layer in the conventional art, and details are not described herein in this embodiment of the present invention.

Step 512. The target access node generates a protocol configuration request message according to the handover request message. Step 513 is performed.

If the target access node allows access of the UE, the target access node may generate the protocol configuration request message according to the handover request message sent by the source access node. Both the handover request message and the protocol configuration request message may include the quality of service parameter of the UE. The protocol configuration request message is used to instruct to configure a function module for the target access node.

Step 513. The target access node sends the protocol configuration request message to a controller. Step 514 is performed.

Optionally, the target access node may send the generated protocol configuration request message to the controller. For example, the protocol configuration request message may be sent to the controller in a form of signaling.

Step 514. The controller determines, according to the protocol configuration request message, a function module corresponding to a service of the UE. Step 515 is performed.

The controller may determine, according to the quality of service parameter of the UE in the protocol configuration request message, the function module corresponding to a service of the UE. Optionally, multiple protocol layers may be set for each device in the SDP network system, and multiple function modules may be configured at each protocol layer. Multiple protocol layers may be set for the UE, and multiple function modules may be configured at each protocol layer of the UE, where functions of the function modules are different. For example, the controller may select, according to the quality of service parameter of the UE, the corresponding function module processing a service of the UE. The function module corresponding to a service of the UE may be the PHY layer function module 1, the MAC layer function module 2, the RLC layer function module 3, and the PDCP layer function module 4.

Step 515. The controller determines a target forwarding node according to the function module corresponding to a service of the UE and a network topology. Step 516 is performed.

The network topology of the SDP network system may be stored and maintained in the controller, that is, a connection relationship among multiple devices in the SDP network system and a function attribute of each device in the SDP network system. The controller may determine, according to the function module corresponding to a service of the UE determined in step 514 and the network topology of the SDP network system, the target forwarding node corresponding to the target access node, so that the target access node can send a data stream in the target access node to the gateway. That is, the controller determines, according to the function module corresponding to a service of the UE and the network topology, the target access node and the target forwarding node that bear the function module corresponding to a service of the UE after node handover. As shown in FIG. 5-3, when the UE-04 moves from a location near the source access node 032*b* to a location near the node 033*a*, the source access node 032*b* determines the node 033*a* as the target access node. In this case, a controller 01 may determine, according to the function module corresponding to a service of the UE and the network topology, that the node 033*b* is the target forwarding node corresponding to the target access node 033*a*.

Step 516. The controller configures function modules for the target access node and the target forwarding node. Step 517 is performed.

After determining the target access node and the target forwarding node, the controller may configure the function modules for the target access node and the target forwarding node according to the function module corresponding to a service of the UE and the network topology.

For example, it is assumed that the function module corresponding to a service of the UE includes the PHY layer function module 1, the MAC layer function module 2, the RLC layer function module 3, and the PDCP layer function module 4. As shown in FIG. 5-3, the controller may configure the PHY layer function module 1, the MAC layer function module 2, and the RLC layer function module 3 for the target access node 033a, and configure the PDCP layer function module 4 for the target forwarding node 033b. On the one hand, the controller may generate a target access node configuration command according to the PHY layer function module 1, the MAC layer function module 2, and the RLC layer function module 3, and generate a target forwarding node configuration command according to the PDCP layer function module 4. In addition, the controller sends the target access node configuration command to the target access node 033a, and sends the target forwarding node configuration command to the target forwarding node 033b, so that the target access node 033a activates the corresponding function modules according to the target access node configuration command, and the target forwarding node 033b activates the corresponding function module according to the target forwarding node configuration command. On the other hand, the controller may generate target access node configuration information according to the PHY layer function module 1, the MAC layer function module 2, and the RLC layer function module 3, and generate target forwarding node configuration information according to the PDCP layer function module 4. In addition, the controller sends the target access node configuration information to the target access node 033a, and sends the target forwarding node configuration information to the target forwarding node 033b, so that the target access node 033a configures the corresponding function modules according to the target access node configuration information, and the target forwarding node 033b configures the corresponding function module according to the target forwarding node configuration information.

Step 517. The controller configures a first forwarding entry group for the source access node. Step 518 is performed.

The controller may determine, according to the function modules configured for the target access node and the target forwarding node and the network topology, forwarding entry of the first forwarding entry group required for data stream transmission between the source access node and the target forwarding node. For example, the first forwarding entry group may include a forwarding entry required for sending a data stream by the source access node to the target forwarding node. Then, the controller may send, to the source access node, configuration information of the forwarding entry required for sending a data stream by the source access node to the target forwarding node, so that the source access node configures the forwarding entry according to the configuration information of the forwarding entry.

Step 518. The source access node sends protocol state information in the source access node to the target forwarding node. Step 519 is performed.

Before node handover, the gateway may send a data stream to the UE by using the source access node. For example, after the gateway sends the data stream to the source access node, the source access node may perform, according to protocol state information that is in the source access node and that is corresponding to a forwarding node function, encryption processing on the data stream sent by the gateway, and send the encrypted data stream to the UE, and may temporarily store the data stream encrypted by the source access node. Optionally, the source access node may send, to the target forwarding node in a form of signaling, the protocol state information that is in the source access node and that is corresponding to the forwarding node function, so that the target forwarding node processes the data stream between the UE and the gateway according to the protocol state information that is in the source access node and that is corresponding to the forwarding node function.

Step 519. The source access node sends, to the target forwarding node according to the first forwarding entry group, data temporarily stored in the source access node. Step 520 is performed.

For example, the source access node may decrypt the data in the source access node and send, according to the forwarding entry that is of the first forwarding entry group and that is in the source access node, the data temporarily stored in the source access node to the target access node.

Step 520. The controller configures a second forwarding entry group for the target access node, the target forwarding node, and the gateway. Step 521 is performed.

The second forwarding entry group may include a forwarding entry required for transmitting a data stream by the target access node to the target forwarding node and a forwarding entry required for transmitting a data stream by the target forwarding node to the gateway. The controller may determine, according to the function modules configured for the target access node and the target forwarding node and the network topology, the a forwarding entry required for transmitting a data stream by the target access node to the target forwarding node and the a forwarding entry required for transmitting a data stream by the target forwarding node to the gateway. In addition, the controller sends configuration information of the a forwarding entry required for transmitting a data stream by the target access node to the target forwarding node is sent to both the target access node and the target forwarding node, and sends configuration information of the a forwarding entry required for transmitting a data stream by the target forwarding node to the gateway to both the target forwarding node and the gateway, so that the target access node, the target forwarding node, and the gateway configure the forwarding entry of the second forwarding entry group according to the received configuration information of the forwarding entry of the second forwarding entry group. In this way, the second forwarding entry group is configured for the target access node, the target forwarding node, and the gateway.

It should be noted that after the controller configures the forwarding entry of the second forwarding entry group for the target forwarding node, the target forwarding node may encrypt, according to the protocol state information that is in the source access node, that is corresponding to the forwarding node function, and that is sent by the source access node in step 518, the data that is temporarily stored in the source access node and that is sent by the source access node in step 519. In addition, the target forwarding node sends the encrypted data temporarily stored in the source access node to the target access node according to the forwarding entry of the second forwarding entry group. The target access node temporarily stores the data temporarily stored in the source access node. It should be noted that after receiving the data that is temporarily stored in the source access node and that is sent by the target forwarding node, the target access node may alternatively send the data temporarily stored in the source access node to the UE.

Step 521. The gateway sends a downlink data stream end mark to the source access node. Step 522 is performed.

Before node handover, the gateway is connected to the Internet, and therefore, the gateway may receive a downlink data stream sent by the Internet and send the downlink data stream to the source access node. The source access node sends the downlink data stream to the UE. After the source access node receives the configuration information of the forwarding entry of the first forwarding entry group and the corresponding forwarding entry is configured according to the received configuration information of the forwarding entry, the source access node may send, to the target forwarding node according to the forwarding entry of the first forwarding entry group, the data temporarily stored in the source access node. After receiving the configuration information of the forwarding entry of the second forwarding entry group, the gateway may generate the downlink data stream end mark and send the downlink data stream end mark to the source access node.

After receiving the downlink data stream end mark sent by the gateway and sending the data temporarily stored in the source access node to the target forwarding node, the source access node may release the protocol state information in the source access node according to the downlink data stream end mark, and may further delete, according to the downlink data stream end mark, the forwarding entry of the first forwarding entry group and the forwarding entry of the third forwarding entry group that are in the source access node.

Step 522. The UE performs data stream exchange with the gateway by using the target access node and the target forwarding node.

For example, after the UE establishes a connection to the target access node, the second forwarding entry group required for data stream transmission between a target node and the gateway is configured for the target access node, the target forwarding node, and the gateway, the data temporarily stored in the source access node is sent to the target forwarding node, and the protocol state information that is in the source access node and that is corresponding to the forwarding node function is sent to the target forwarding node, the UE can perform data stream exchange with the gateway by using the target access node and the target forwarding node and perform handover from the source access node to the target access node and the target forwarding node.

Further, a downlink data stream received by the UE may include multiple downlink data packets. After step 522, the UE may detect whether the received downlink data stream is complete. If the UE detects that the downlink data stream received by the UE is incomplete, the UE may generate downlink data packet retransmission indication information according to a downlink data packet that is not received by the UE, and send the downlink retransmission indication information to the target access node. The target access node and the target forwarding node retransmit, to the UE according to the downlink data packet retransmission indication information, the downlink data packet that is not received by the UE.

The controller in this embodiment of the present invention can configure function modules for nodes and can configure forwarding entry for nodes and the gateway. In actual application, the controller may include an SDP controller and an SDN controller. The SDP controller is configured to configure the function modules for the nodes. The SDN controller is configured to configure the forwarding entry for the nodes and the gateway. It should be noted that on the one hand, in this embodiment of the present invention, the node handover method is described by using an example in which the source access node determines the target access node. In actual application, alternatively, the controller may determine the target access node and the target forwarding node. This is not limited in this embodiment of the present invention. On the other hand, in this embodiment of the present invention, the node handover method is described by using an example in which the target access node is corresponding to one target forwarding node. In actual application, a quantity of the target forwarding nodes may be another value. This is not limited in this embodiment of the present invention.

It should be noted that the order of the node handover method steps in this embodiment of the present invention may be appropriately adjusted, and the steps may also be correspondingly added or deleted according to a situation. All variant methods readily figured out by a person skilled in the art within the technical scope disclosed in the present invention shall fall within the protection scope of the present invention, and therefore are not described.

In conclusion, according to the node handover method provided in this embodiment of the present invention, after receiving a protocol configuration request message sent by a target access node, a controller determines, according to a quality of service parameter, a function module corresponding to a service of UE, configures, according to the function module corresponding to a service of the UE and a network topology, a function module for a target node, and determines a first forwarding entry group and a second forwarding entry group, so that a source node can send data temporarily stored in the source node to the target node according to the first forwarding entry group, and the target node performs data stream transmission with a gateway according to the second forwarding entry group. In this way, the target access node serves the UE, handover between nodes in an SDP network system is implemented, and functions of the SDP network system are enriched.

As shown in FIG. 6-1A, FIG. 6-1B, and FIG. 6-1C, another embodiment of the present invention provides a node handover method, applied to the SDP network system 0 shown in FIG. 1-1. For example, the node handover method may include the following steps.

Step 601. UE performs data stream exchange with a gateway by using a source access node and a source forwarding node. Step 602 is performed.

Figures 1A, 6:
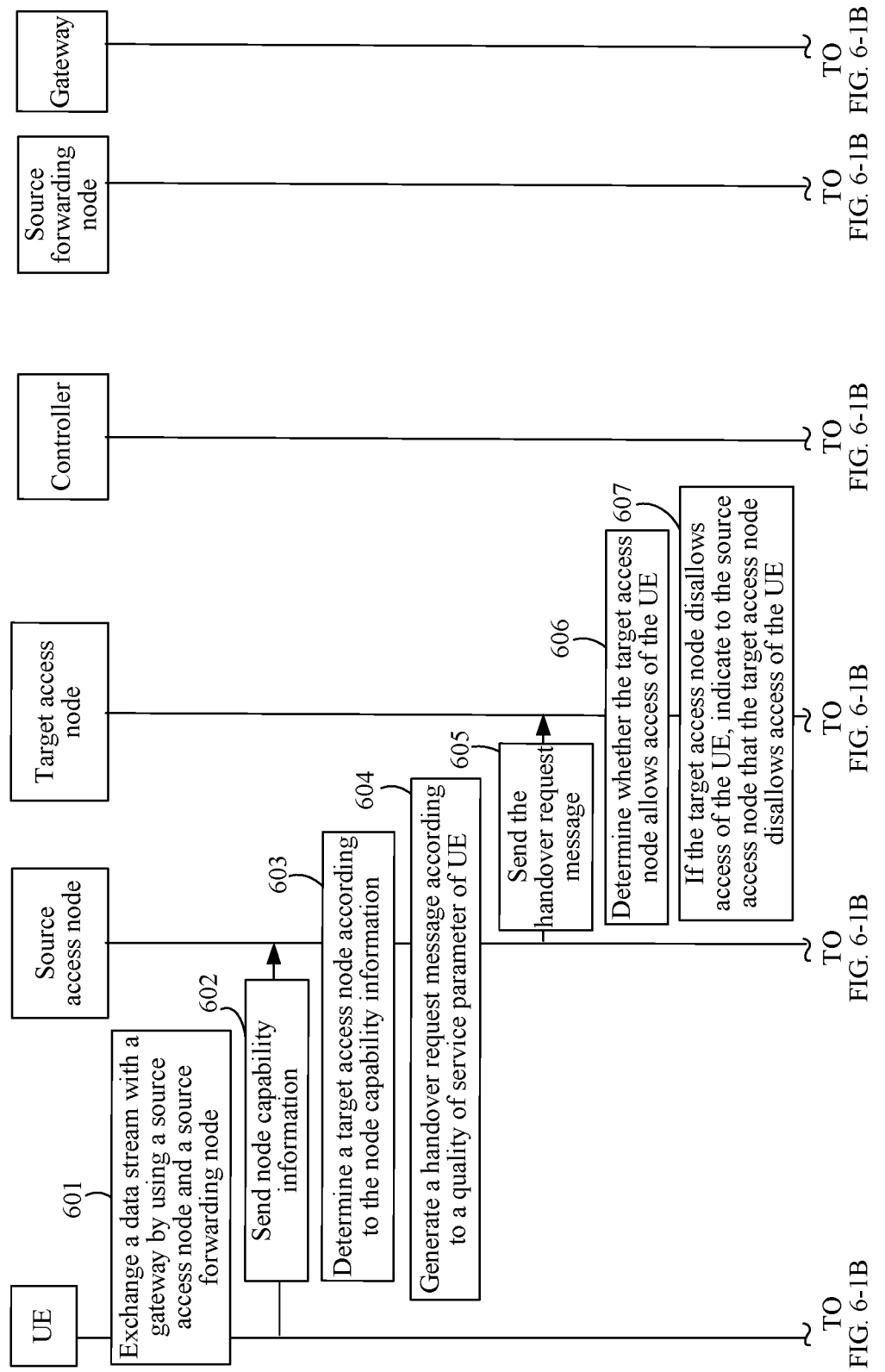
Figures 1B, 6:
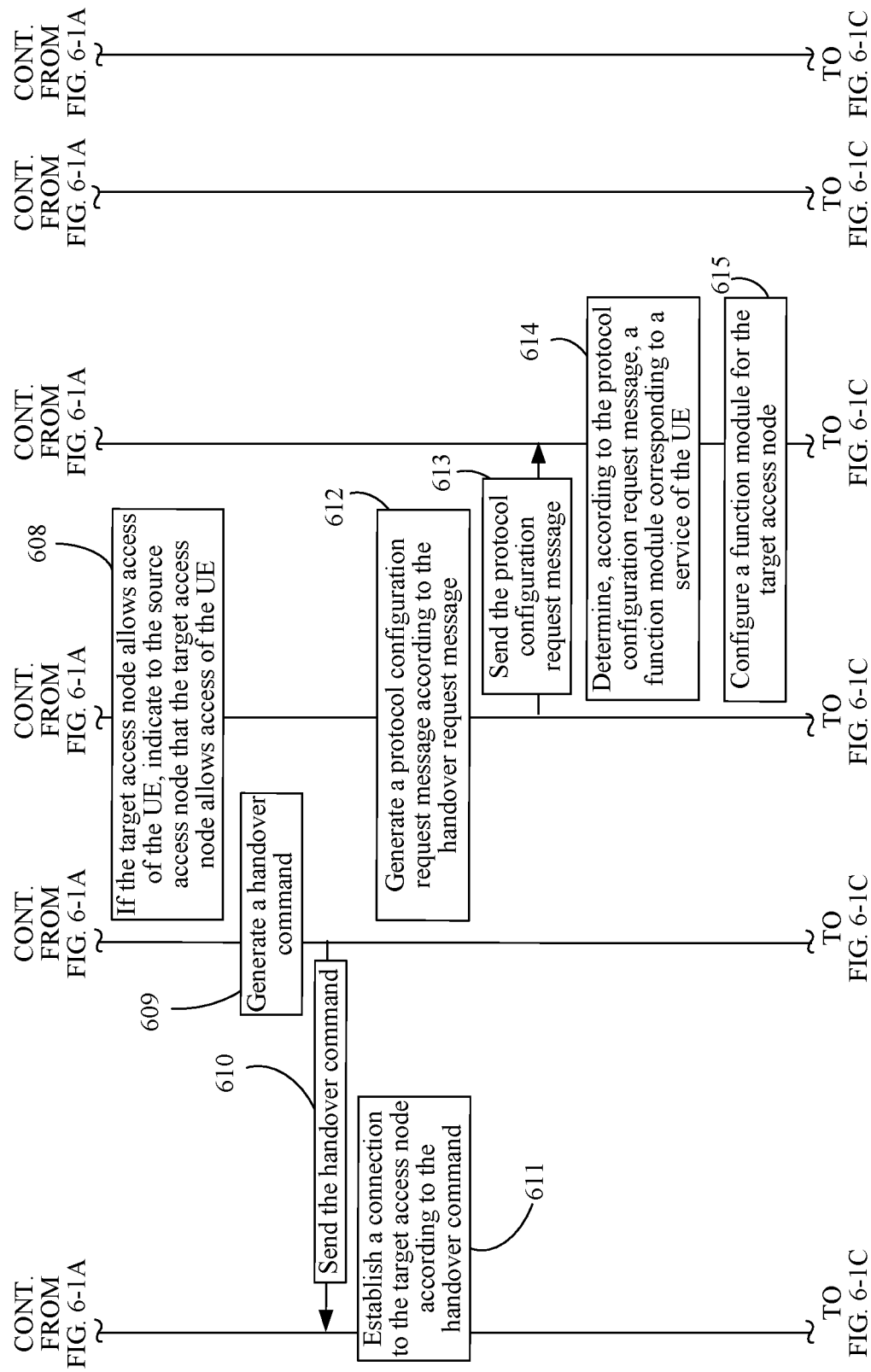
Figures 1C, 6:
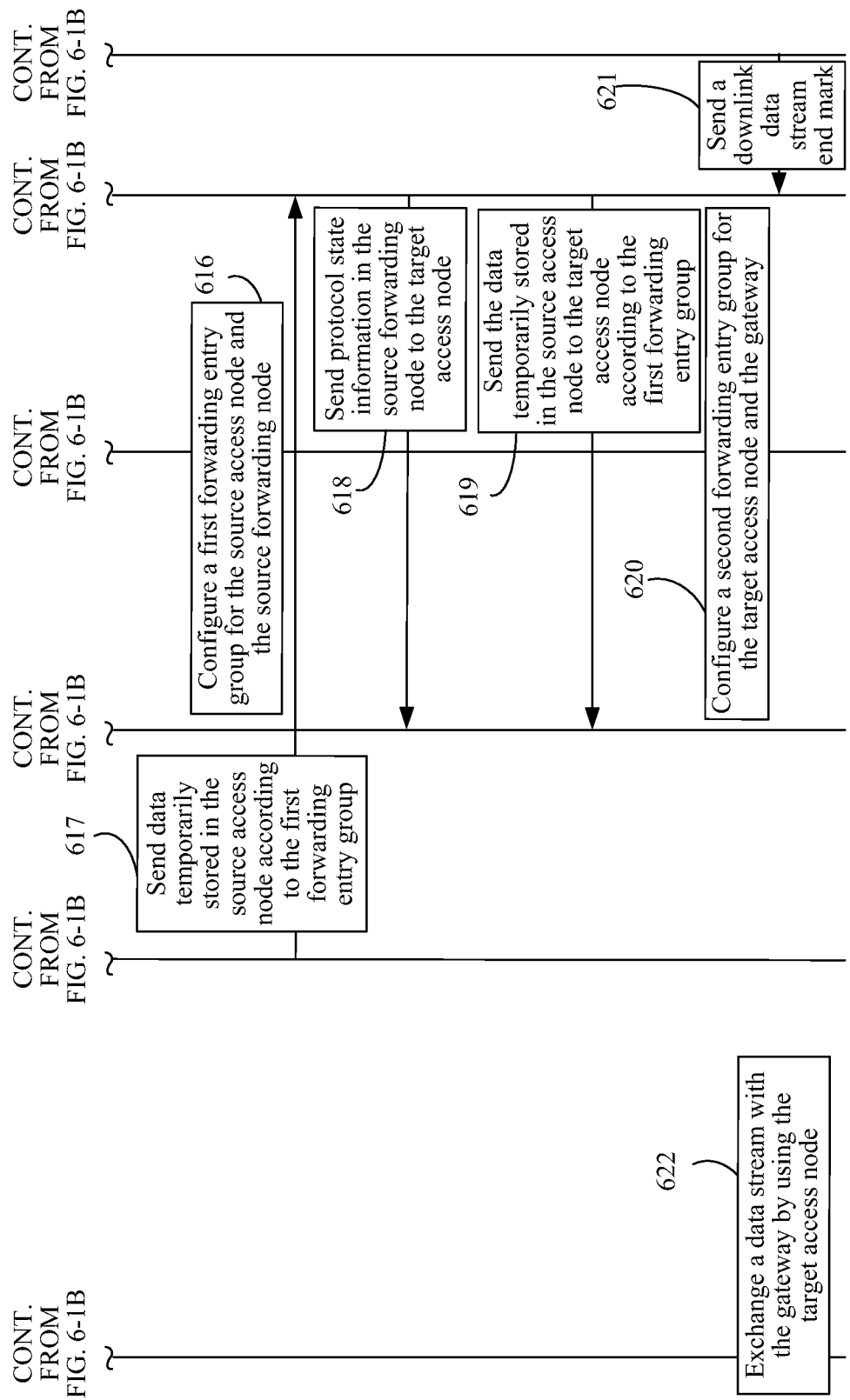
Figures 2, 6:
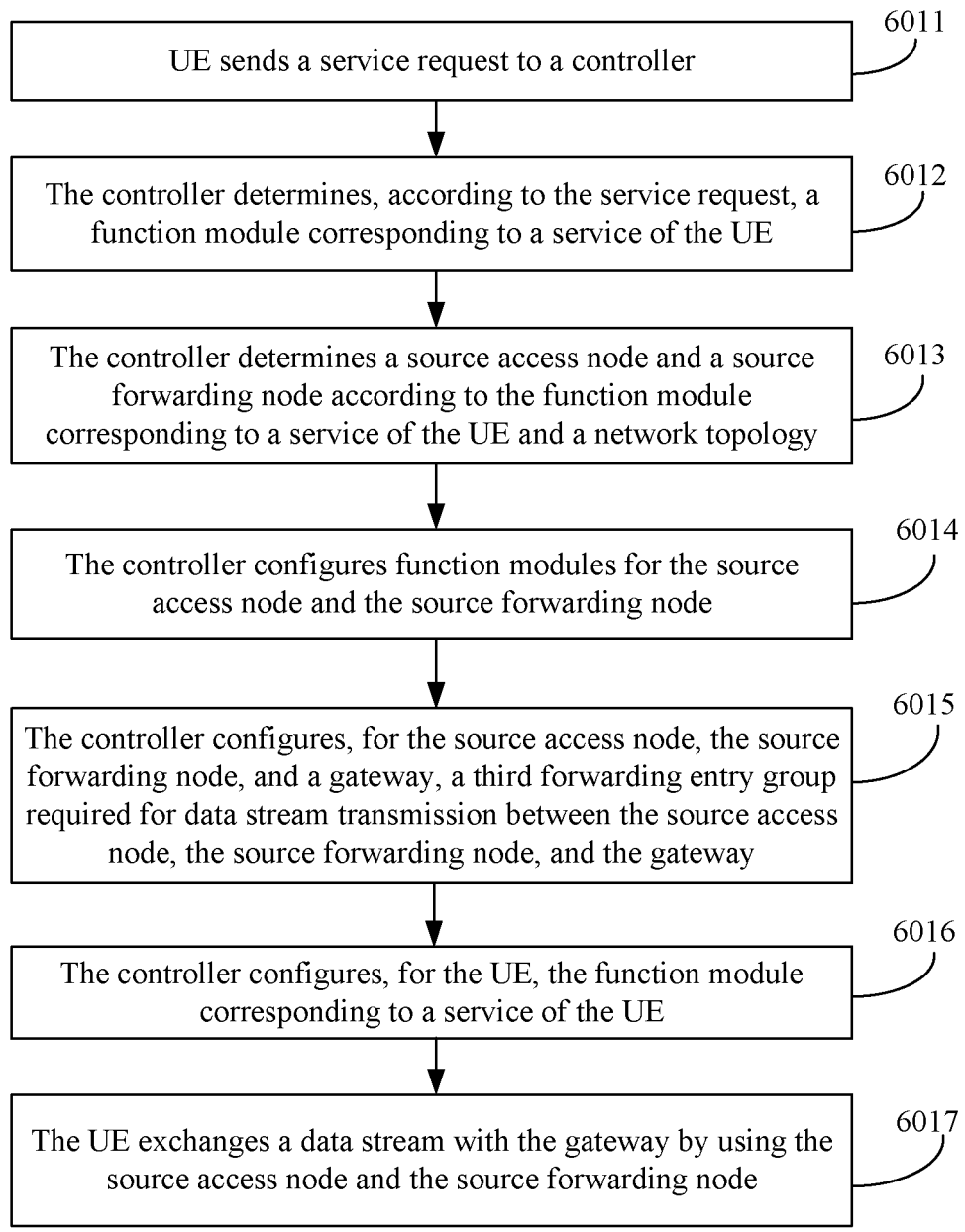
Figures 3, 6:
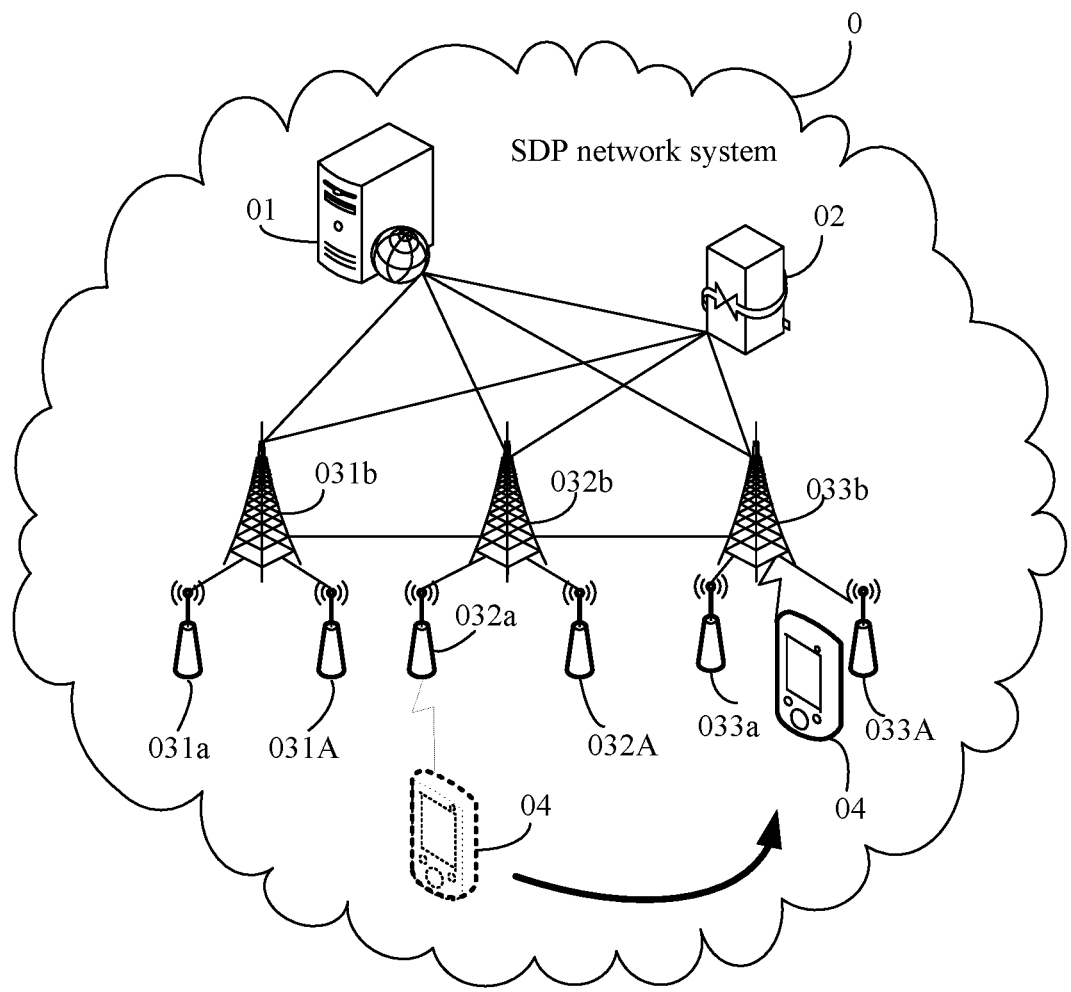

Optionally, as shown in FIG. 6-2, step 601 may include the following steps.

Step 6011. The UE sends a service request to a controller.

When the UE needs to execute a service, the UE can generate the service request according to identifier information of the UE and a quality of service parameter of the service, and send the service request to the controller.

Step 6012. The controller determines, according to the service request, a function module corresponding to a service of the UE.

For example, the controller may determine, according to the identifier information of the UE and the quality of service parameter that are in the service request, the function module corresponding to a service of the UE. It should be noted that multiple protocol layers may be set for each device in the SDP network system, and multiple function modules may be configured at each protocol layer. Optionally, the controller may determine, according to the identifier information of the UE and the quality of service parameter, an access technology supported by the UE and select, according to the access technology and the quality of service parameter, the corresponding function module processing a service of the UE. For example, after the controller receives the service request sent by the UE, the controller may determine, according to the service request, that a protocol layer at which a processing module corresponding to the UE is located includes a PHY layer, a MAC layer, an RLC layer, and a PDCP layer, and determine, at the PHY layer, the MAC layer, the RLC layer, and the PDCP layer according to the service request, function modules corresponding to a service of the UE.

It should be noted that in this embodiment of the present invention, the node handover method is described by using an example in which the protocol layer at which the processing module corresponding to the UE is located includes the PHY layer, the MAC layer, the RLC layer, and the PDCP layer. In actual application, the processing module corresponding to the UE may alternatively be located at another protocol layer. This is not limited in this embodiment of the present invention.

Step 6013. The controller determines the source access node and the source forwarding node according to the function module corresponding to a service of the UE and a network topology.

It should be noted that the network topology of the SDP network system may be maintained in the controller. A connection relationship between all devices in the SDP network system and a function attribute of each device in the SDP network system may be recorded in the network topology. For example, the controller may determine, according to the function module corresponding to a service of the UE and the network topology, the source access node and the source forwarding node that are configured to bear the function module corresponding to a service of the UE.

As shown in FIG. 1-1, it is assumed that the function module corresponding to a service of the UE determined in step 6012 includes a PHY layer function module 1, a MAC layer function module 2, an RLC layer function module 3, and a PDCP layer function module 4, and a node currently accessed by the UE is determined as a node 032*a* according to a network topology. The controller determines, according to a function attribute of the node 032*a* currently accessed by the UE recorded in the network topology and the function module corresponding to a service of the UE, that the node 032*a* currently accessed by the UE can bear the PHY layer function module 1, the MAC layer function module 2, and the RLC layer function module 3, but the node 032*a* currently accessed by the UE cannot bear the PDCP layer function module 4. In this case, it can be learned according to the network topology that a node 032*b* that can perform data stream exchange with the node 032*a* currently accessed by the UE can bear the PDCP layer function module 4. Therefore, the node 032*b* can be determined as a forwarding node corresponding to the node 032*a* currently accessed by the UE. In addition, the node 032*a* currently accessed by the UE and the forwarding node 032*b* corresponding to the node 032*a* currently accessed by the UE are determined as source nodes. In this case, the node 032*a* currently accessed by the UE is referred to as the source access node, and the forwarding node 032*b* corresponding to the node 032*a* currently accessed by the UE is referred to as the source forwarding node.

Step 6014. The controller configures function modules for the source access node and the source forwarding node.

For example, as shown in FIG. 1-1, the controller may configure the PHY layer function module 1, the MAC layer function module 2, and the RLC layer function module 3 for the source access node 032*a*, and configure the PDCP layer function module 4 for the source forwarding node 032*b*. On the one hand, the controller may generate a source access node configuration command according to the PHY layer function module 1, the MAC layer function module 2, and the RLC layer function module 3, and generate a source forwarding node configuration command according to the PDCP layer function module 4. In addition, the controller sends the source access node configuration command to the source access node 032*a*, and sends the source forwarding node configuration command to the source forwarding node 032*b*, so that the source access node 032*a* activates the corresponding function modules according to the source access node configuration command, and the source forwarding node 032*b* activates the corresponding function module according to the source forwarding node configuration command. On the other hand, the controller may generate source access node configuration information according to the PHY layer function module 1, the MAC layer function module 2, and the RLC layer function module 3, and generate source forwarding node configuration information according to the PDCP layer function module 4. In addition, the controller sends the source access node configuration information to the source access node 032*a*, and sends the source forwarding node configuration information to the source forwarding node 032, so that the source access node 032*a* configures the corresponding function modules according to the source access node configuration information, and the source forwarding node 032*b* configures the corresponding function module according to the source forwarding node configuration information.

Step 6015. The controller configures, for the source access node, the source forwarding node, and the gateway, a third forwarding entry group required for data stream transmission between the source access node, the source forwarding node, and the gateway.

After determining the source nodes, the controller may determine, according to the network topology, forwarding entries of the third forwarding entry group required for data stream transmission between the source access node, the source forwarding node, and the gateway, and send configuration information of the forwarding entries of the third forwarding entry group to the source access node, the source forwarding node, and the gateway, so that the source access node, the source forwarding node, and the gateway configure the corresponding forwarding entries according to the received configuration information. In this way, the third forwarding entry group required for data stream transmission between each source node and the gateway is configured for the source access node, the source forwarding node, and the gateway. Specifically, the third forwarding entry group may include a forwarding entry required for sending a data stream by the source access node to the source forwarding node, a forwarding entry required for sending a data stream by the source forwarding node to the source access node, a forwarding entry required for sending a data stream by the source forwarding node to the gateway, and a forwarding entry required for sending a data stream by the gateway to the source forwarding node. Then, configuration information of the forwarding entry required for sending a data stream by the source access node to the source forwarding node is sent to the source access node. Configuration information of the forwarding entry required for sending a data stream by the source forwarding node to the source access node is sent to the source forwarding node. Configuration information of the forwarding entry required for sending a data stream by the source forwarding node to the gateway is sent to the source forwarding node. Configuration information of the forwarding entry required for sending a data stream by the gateway to the source forwarding node is sent to the gateway.

Step 6016. The controller configures, for the UE, the function module corresponding to a service of the UE.

It is assumed that the PHY layer function module 1, the MAC layer function module 2, the RLC layer function module 3, and the PDCP layer function module 4 are determined as the function modules corresponding to a service of the UE. On the one hand, the controller may generate a UE configuration command according to the PHY layer function module 1, the MAC layer function module 2, the RLC layer function module 3, and the PDCP layer function module 4, and send the UE configuration command to the UE, so that the UE activates the corresponding function modules according to the UE configuration command. On the other hand, the controller may generate UE configuration information according to the PHY layer function module 1, the MAC layer function module 2, the RLC layer function module 3, and the PDCP layer function module 4, and send the UE configuration information to the UE, so that the UE configures the corresponding function modules according to the UE configuration information.

Step 6017. The UE performs data stream exchange with the gateway by using the source access node and the source forwarding node.

For example, as shown in FIG. 1-1, the source nodes determined in step 6013 include the source access node 032a and the source forwarding node 032b. Therefore, in step 6017, the UE can perform data stream exchange with a gateway 02 by using the source access node 032a and the source forwarding node 032b.

Step 602. The UE sends node capability information to the source access node. Step 603 is performed.

For example, the UE may regularly obtain capability information of each node within a detection range of the UE. The capability information of the node obtained by the UE may be signal quality strength of the node, obtained by the UE. It should be noted that the capability information of the node may alternatively be other information. This is not limited in this embodiment of the present invention. The UE may establish a connection to the source access node by using an air interface. After the UE obtains the capability information of each node within the detection range of the UE, the UE may send the capability information of each node within the detection range of the UE to the source access node by using the air interface.

Step 603. The source access node determines a target access node according to the node capability information. Step 604 is performed.

After receiving the capability information of each node within the detection range of the UE that is sent by the UE, the source access node may obtain, by means of filtering according to a preset filtering manner from the multiple nodes within the detection range of the UE, a node satisfying a filtering condition as the target access node. For example, a preset capability threshold may be stored in the source access node. The source access node may compare the preset capability threshold with a capability value indicated by the capability information of each node within the detection range of the UE, so as to obtain, by means of filtering from the multiple nodes within the detection range of the UE, nodes whose capability values indicated by the capability information are greater than the preset capability threshold, and determine, among the nodes whose capability values indicated by the capability information of the nodes are greater than the preset capability threshold, a node with a greatest capability value indicated by capability information as the target access node. It should be noted that if the capability values indicated by the capability information of all nodes within the detection range of the UE are less than the preset capability threshold, the source access node skips the action. In actual application, the source access node may alternatively determine the target access node in another manner. This is not limited in this embodiment of the present invention. As shown in FIG. 6-3, when UE-04 moves from a location near the source access node 032a to a location near a node 033b, the source access node 032a determines the node 033b as the target access node.

Step 604. The source access node generates a handover request message according to a quality of service parameter of the UE. Step 605 is performed.

The quality of service parameter of the UE may be stored in the source access node. The source access node may generate the handover request message according to the quality of service parameter of the UE. The handover request message is used to indicate that the UE needs to access the target access node. Optionally, the source access node may alternatively obtain the quality of service parameter of the UE from the UE.

Step 605. The source access node sends the handover request message to the target access node. Step 606 is performed.

The source access node determines the target access node in step 603, and the source access node generates the handover request message in step 605. Therefore, in step 605, the source access node may send the handover request message to the target access node according to an identifier of the target access node. For example, the handover request message may be sent to the target access node in a form of signaling.

Step 606. The target access node determines whether the target access node allows access of the UE. If the target access node disallows access of the UE, step 607 is performed. If the target access node allows access of the UE, step 608 is performed.

After receiving the handover request message sent by the source access node, the target access node may determine, according to the quality of service parameter of the UE in the handover request message, whether the target access node allows access of the UE. If the target access node disallows access of the UE, step 607 is performed. If the target access node allows access of the UE, step 608 is performed. Optionally, for a specific step of determining, by the target access node according to the quality of service parameter of the UE in the handover request message, whether the target access node allows access of the UE, reference may be made to a specific step of determining, by a node according to a quality of service parameter, whether the node allows access of UE in the conventional art, and details are not described herein in this embodiment of the present invention.

Step 607. The target access node indicates to the source access node that the target access node disallows access of the UE.

If the target access node disallows access of the UE, the target access node may generate a message used to indicate that the target access node disallows access of the UE, and send, to the source access node, the message used to indicate that the target access node disallows access of the UE, so that after receiving the message used to indicate that the target access node disallows access of the UE, the source access node determines that the target access node disallows access of the UE.

Step 608. The target access node indicates to the source access node that the target access node allows access of the UE. Step 609 is performed.

The target access node may generate a handover feedback message used to indicate that the target access node allows access of the UE, and send the handover feedback message to the source access node.

Step 609. The source access node generates a handover command. Step 610 is performed.

After receiving the handover feedback message sent by the target access node, the source access node may generate the handover command used to instruct the UE to perform node handover. For example, the handover command may include the identifier of the target access node. It should be noted that the handover command may further include other information. This is not limited in this embodiment of the present invention.

Step 610. The source access node sends the handover command to the UE. Step 611 is performed.

For example, the source access node may send, to the UE by using the air interface, the handover command generated by the source access node.

Step 611. The UE establishes a connection to the target access node according to the handover command. Step 612 is performed.

After receiving the handover command used to instruct the UE to perform node handover, the UE may disconnect from the source access node and establish the connection to the target access node according to the handover command. For example, the UE may further re-establish a protocol layer for the UE. For a specific step of re-establishing, by the UE, the protocol layer for the UE, reference may be made to a specific step of establishing, by UE, a protocol layer in the conventional art, and details are not described herein in this embodiment of the present invention.

Step 612. The target access node generates a protocol configuration request message according to the handover request message. Step 613 is performed.

If the target access node allows access of the UE, the target access node may generate the protocol configuration request message according to the handover request message sent by the source access node. Both the handover request message and the protocol configuration request message may include the quality of service parameter of the UE. The protocol configuration request message is used to instruct to configure a function module for the target access node.

Step 613. The target access node sends the protocol configuration request message to a controller. Step 614 is performed.

Optionally, the target access node may send the generated protocol configuration request message to the controller. For example, the protocol configuration request message may be sent to the controller in a form of signaling.

Step 614. The controller determines, according to the protocol configuration request message, a function module corresponding to a service of the UE. Step 615 is performed.

The controller may determine, according to the quality of service parameter of the UE in the protocol configuration request message, the function module corresponding to a service of the UE. Optionally, multiple protocol layers may be set for each device in the SDP network system, and multiple function modules may be configured at each protocol layer. Multiple protocol layers may be set for the UE, and multiple function modules may be configured at each protocol layer of the UE, where functions of the function modules are different. For example, the controller may select, according to the quality of service parameter of the UE, the corresponding function module processing a service of the UE. The function module corresponding to a service of the UE may be the PHY layer function module 1, the MAC layer function module 2, the RLC layer function module 3, and the PDCP layer function module 4.

Step 615. The controller configures the function module for the target access node. Step 616 is performed.

It should be noted that the network topology of the SDP network system may be stored and maintained in the controller, that is, a connection relationship among multiple devices in the SDP network system and a function attribute of each device in the SDP network system. The controller may determine, according to the function module corresponding to a service of the UE determined in step 614 and the network topology of the SDP network system, that the target access node is able to bear all function modules corresponding to a service of the UE, and a data stream in the target access node can be sent to the gateway without using a forwarding node between the target access node and the gateway. As shown in FIG. 6-3, when the UE-04 moves from a location near the source access node 032*a* to a location near the node 033*b*, the source access node 032*a* determines the node 033*b* as the target access node.

After determining the target access node, the controller may configure the function module for the target access node according to the function module corresponding to a service of the UE and the network topology.

For example, it is assumed that the function module corresponding to a service of the UE includes the PHY layer function module 1, the MAC layer function module 2, the RLC layer function module 3, and the PDCP layer function module 4. For example, as shown in FIG. 6-3, the controller may configure the PHY layer function module 1, the MAC layer function module 2, the RLC layer function module 3, and the PDCP layer function module 4 for the target access node 033*b*. On the one hand, the controller may generate a target access node configuration command according to the PHY layer function module 1, the MAC layer function module 2, the RLC layer function module 3, and the PDCP layer function module 4, and send the target access node configuration command to the target access node 033*b*, so that the target access node 033*b* activates the corresponding function modules according to the target access node configuration command. On the other hand, the controller may generate target access node configuration information according to the PHY layer function module 1, the MAC layer function module 2, the RLC layer function module 3, and the PDCP layer function module 4, and send the target access node configuration information to the target access node 033*b*, so that the target access node 033*b* configures the corresponding function modules according to the target access node configuration information.

Step 616. The controller configures a first forwarding entry group for the source access node and the source forwarding node. Step 617 is performed.

The controller may determine, according to the function module configured for the target access node and the network topology, a forwarding entry required for sending a data stream by the source access node to the source forwarding node, and a forwarding entry required for transmitting a data stream by the source forwarding node to the target access node. For example, the first forwarding entry group may include a forwarding entry required for sending a data stream by the source forwarding node to the target access node and a forwarding entry required for sending a data stream by the source access node to the source forwarding node. Then, the controller may send, to the source forwarding node, configuration information of the forwarding entry required for sending a data stream by the source forwarding node to the target access node, and send, to the source access node, configuration information of the forwarding entry required for sending a data stream by the source access node to the source forwarding node, so that the source access node and the source forwarding node configure the corresponding forwarding entry according to the received configuration information of the forwarding entry.

It should be noted that in step 6015, the controller configures the forwarding entry of the third forwarding entry group for the source access node, so that the source access node sends, to the source forwarding node according to the forwarding entry of the third forwarding entry group, data sent by the UE. However, the forwarding entry of the first forwarding entry group configured for the source access node in step 616 is used to forward data temporarily stored in the source access node. That is, data sent by the source forwarding node to the source access node is different from data sent by the UE to the source access node. Therefore, the forwarding entry of the third forwarding entry group configured for the source access node in step 6015 cannot be directly used to forward the data temporarily stored in the source access node, and the forwarding entry of the first forwarding entry group needs to be configured for the source access node.

Step 617. The source access node sends, to the source forwarding node according to the first forwarding entry group, data temporarily stored in the source access node. Step 618 is performed.

The source access node may send, to the source forwarding node according to the forwarding entry that is of the first forwarding entry group and that is in the source access node, the data temporarily stored in the source access node. The gateway may send a data stream to the UE by using the source forwarding node and the source access node. For example, after the gateway sends the data stream to the source forwarding node, the source forwarding node may perform encryption processing on the data stream sent by the gateway and send the encrypted data stream to the source access node. The source access node may process the data stream encrypted by the source forwarding node and send the data stream to the UE, and may temporarily store the data stream encrypted by the source forwarding node.

Step 618. The source forwarding node sends protocol state information in the source forwarding node to the target access node. Step 619 is performed.

Before node handover, the gateway may send a data stream to the source access node by using the source forwarding node, and further, the source access node sends the data stream to the UE. For example, after the gateway sends the data stream to the source forwarding node, the source forwarding node may perform, according to protocol state information that is in the source forwarding node and that is corresponding to a forwarding node function, encryption processing on the data stream sent by the gateway, and send the encrypted data stream to the source access node. Optionally, the source forwarding node may send, to the target access node in a form of signaling, the protocol state information that is in the source forwarding node and that is corresponding to the forwarding node function, so that the target access node processes the data stream between the UE and the gateway according to the protocol state information that is in the source forwarding node and that is corresponding to the forwarding node function.

Step 619. The source forwarding node sends, to the target access node according to the first forwarding entry group, the data temporarily stored in the source access node. Step 620 is performed.

For example, after the source access node sends the data temporarily stored in the source access node to the source forwarding node, the source forwarding node may decrypt the data in the source access node and send the decrypted data temporarily stored in the source access node to the target access node.

It should be noted that the target access node may encrypt, according to the protocol state information that is in the source forwarding node, that is corresponding to the forwarding node function, and that is sent by the source forwarding node in step 618, the data that is temporarily stored in the source access node and that is sent by the source forwarding node in step 619, and the target access node temporarily stores the data temporarily stored in the source access node. It should be noted that the target access node may alternatively send the data temporarily stored in the source access node to the UE.

Step 620. The controller configures a second forwarding entry group for the target access node and the gateway. Step 621 is performed.

The second forwarding entry group may include a forwarding entry required for transmitting a data stream by the target access node to the gateway. The controller may determine, according to the function module configured for the target access node and the network topology, the a forwarding entry required for transmitting a data stream by the target access node to the gateway. In addition, the controller sends configuration information of the a forwarding entry required for transmitting a data stream by the target access node to the gateway to both the target access node and the gateway, so that the target access node and the gateway configure the corresponding forwarding entry according to the received configuration information of the forwarding entry. In this way, the second forwarding entry group is configured for the target access node and the gateway.

Step 621. The gateway sends a downlink data stream end mark to the source forwarding node. Step 622 is performed.

Before node handover, the gateway is connected to the Internet, and therefore, the gateway may receive a downlink data stream sent by the Internet and send the downlink data stream to the source forwarding node. The source forwarding node sends the downlink data stream to the source access node. Finally, the source access node sends the downlink data stream to the UE. After the source access node and the source forwarding node receive the configuration information of the forwarding entry of the first forwarding entry group and configure the corresponding forwarding entry according to the received configuration information of the forwarding entry, the source access node may send, to the source forwarding node according to the forwarding entry of the first forwarding entry group, the data temporarily stored in the source access node, so that the source forwarding node sends, to the target access node according to the forwarding entry of the first forwarding entry group, the data temporarily stored in the source access node. After receiving the configuration information of the forwarding entry of the second forwarding entry group, the gateway may generate the downlink data stream end mark and send the downlink data stream end mark to the source forwarding node.

After receiving the downlink data stream end mark sent by the gateway, the source forwarding node may send the downlink data stream end mark to the source access node. After sending the data temporarily stored in the source access node to the source forwarding node, the source access node may release protocol state information in the source access node according to the downlink data stream end mark, and may further delete, according to the downlink data stream end mark, the forwarding entry of the first forwarding entry group and the forwarding entry of the third forwarding entry group that are in the source access node. The source access node may further send the downlink data stream end mark to the source forwarding node. After receiving the downlink data stream end mark sent by the source access node, the source forwarding node may release the protocol state information in the source forwarding node according to the downlink data stream end mark. The source forwarding node may further delete, according to the downlink data stream end mark, the forwarding entry of the first forwarding entry group and the forwarding entry of the third forwarding entry group that are in the source forwarding node.

Step 622. The UE performs data stream exchange with the gateway by using the target access node.

For example, after the UE establishes a connection to the target access node, the second forwarding entry group required for data stream transmission between a target node and the gateway is configured for the target access node and the gateway, the data temporarily stored in the source access node is sent to the target access node, and the protocol state information in the source forwarding node is sent to the target access node, the UE can perform data stream exchange with the gateway by using the target access node and perform handover from the source access node and the source forwarding node to the target access node.

Further, a downlink data stream received by the UE may include multiple downlink data packets. After step 622, the UE may detect whether the received downlink data stream is complete. If the UE detects that the downlink data stream received by the UE is incomplete, the UE may generate downlink data packet retransmission indication information according to a downlink data packet that is not received by the UE, and send the downlink retransmission indication information to the target access node. The target access node retransmits, to the UE according to the downlink data packet retransmission indication information, the downlink data packet that is not received by the UE.

The controller in this embodiment of the present invention can configure function modules for nodes and can configure forwarding entry for nodes and the gateway. In actual application, the controller may include an SDP controller and an SDN controller. The SDP controller is configured to configure the function modules for the nodes. The SDN controller is configured to configure the forwarding entry for the nodes and the gateway. It should be noted that on the one hand, in this embodiment of the present invention, the node handover method is described by using an example in which the source access node determines the target access node. In actual application, alternatively, the controller may determine the target access node. This is not limited in this embodiment of the present invention. On the other hand, in this embodiment of the present invention, the node handover method is described by using an example in which the source access node is corresponding to one source forwarding node. In actual application, a quantity of the source forwarding nodes may be another value. This is not limited in this embodiment of the present invention.

It should be noted that the order of the node handover method steps in this embodiment of the present invention may be appropriately adjusted, and the steps may also be correspondingly added or deleted according to a situation. All variant methods readily figured out by a person skilled in the art within the technical scope disclosed in the present invention shall fall within the protection scope of the present invention, and therefore are not described.

In conclusion, according to the node handover method provided in this embodiment of the present invention, after receiving a protocol configuration request message sent by a target access node, a controller determines, according to a quality of service parameter, a function module corresponding to a service of UE, configures, according to the function module corresponding to a service of the UE and a network topology, a function module for a target node, and determines a first forwarding entry group and a second forwarding entry group, so that a source node can send data temporarily stored in the source node to the target node according to the first forwarding entry group, and the target node performs data stream transmission with a gateway according to the second forwarding entry group. In this way, the target access node serves the UE, handover between nodes in an SDP network system is implemented, and functions of the SDP network system are enriched.

As shown in FIG. 7-1A, FIG. 7-1B, and FIG. 7-1C, another embodiment of the present invention provides another node handover method, applied to the SDP network system 0 shown in FIG. 1-1. For example, the node handover method may include the following steps.

Step 701. UE performs data stream exchange with a gateway by using a source access node and a source forwarding node. Step 702 is performed.

Figures 1A, 7:
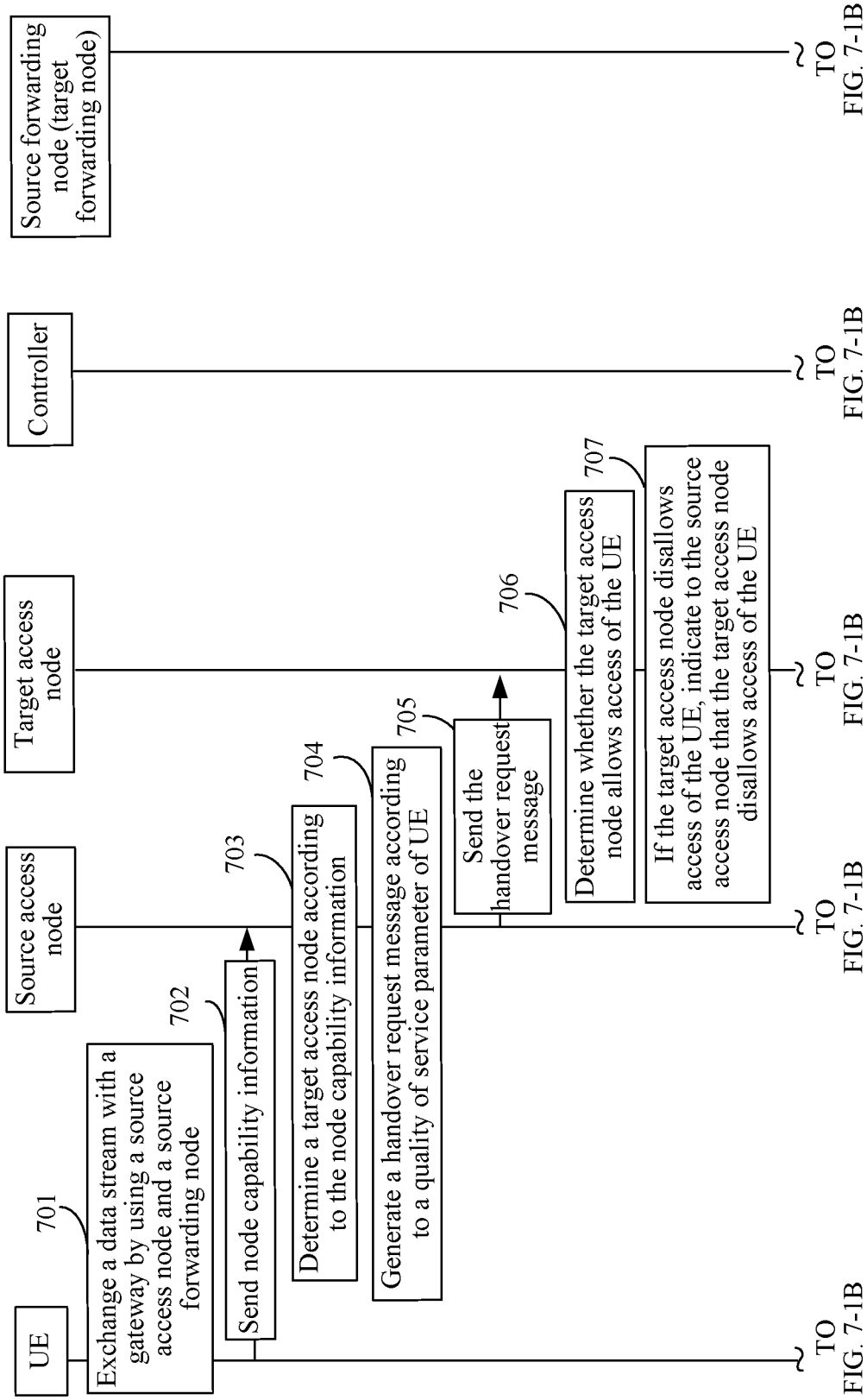
Figures 1B, 7:
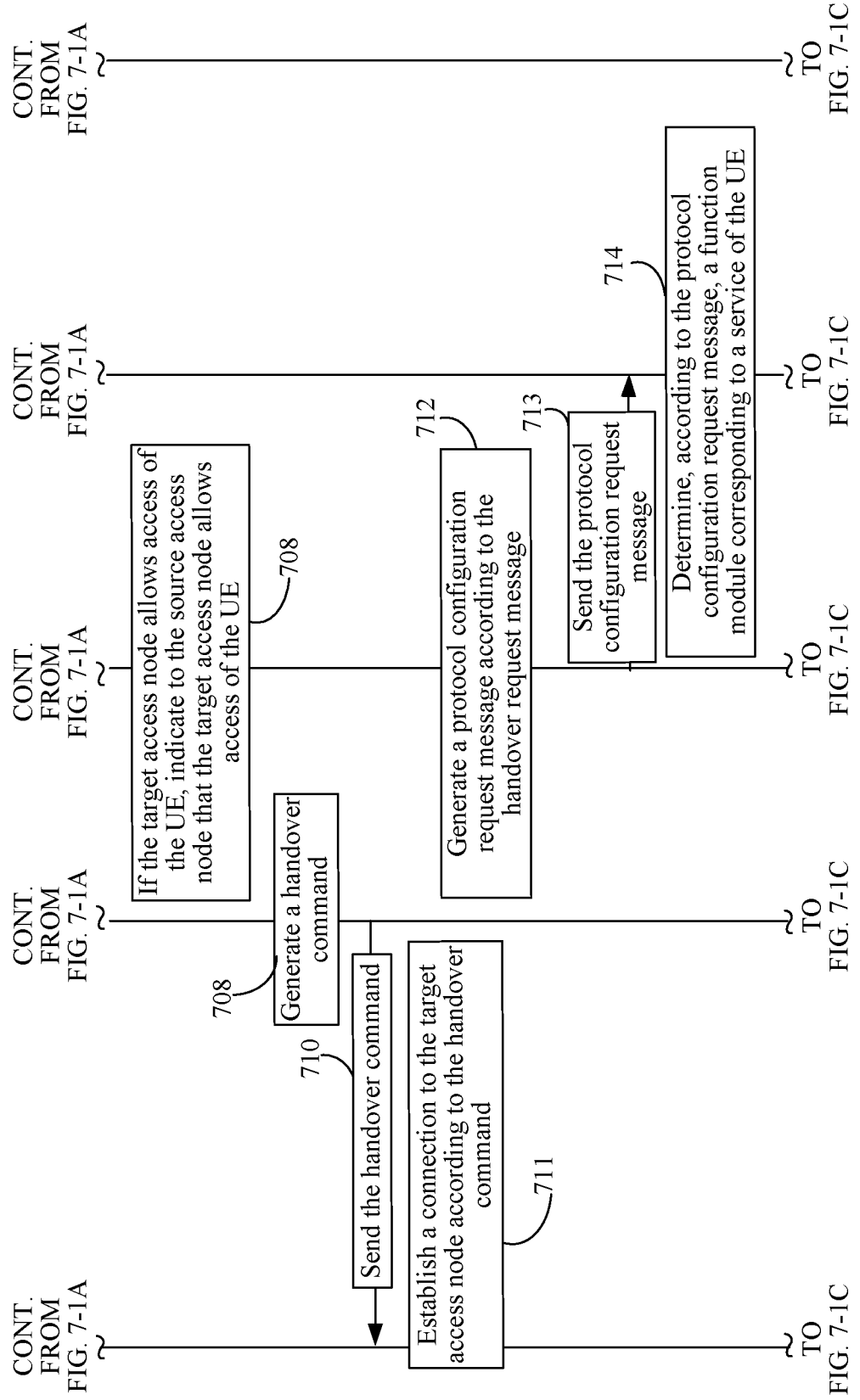
Figures 1C, 7:
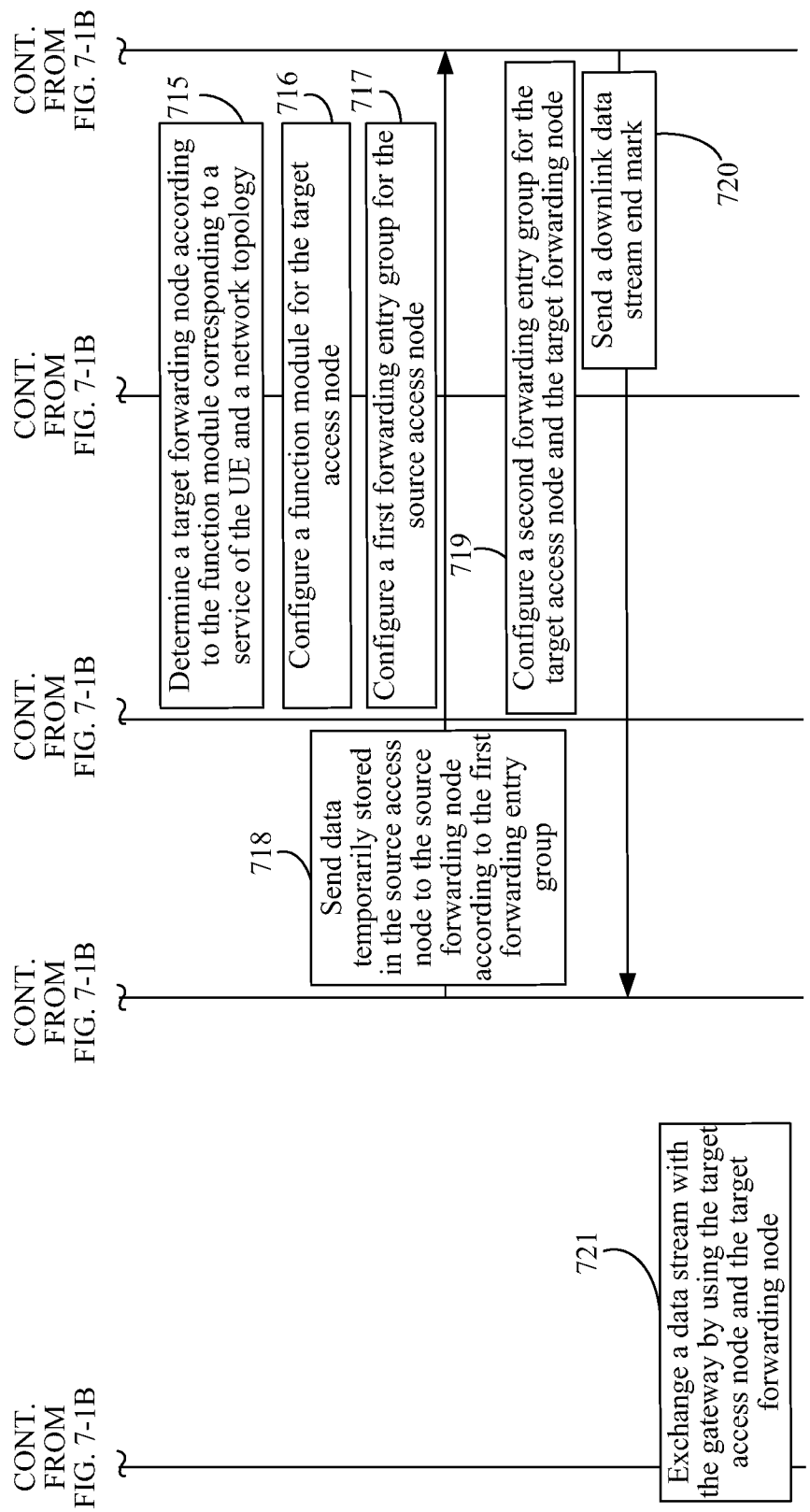
Figures 2, 7:
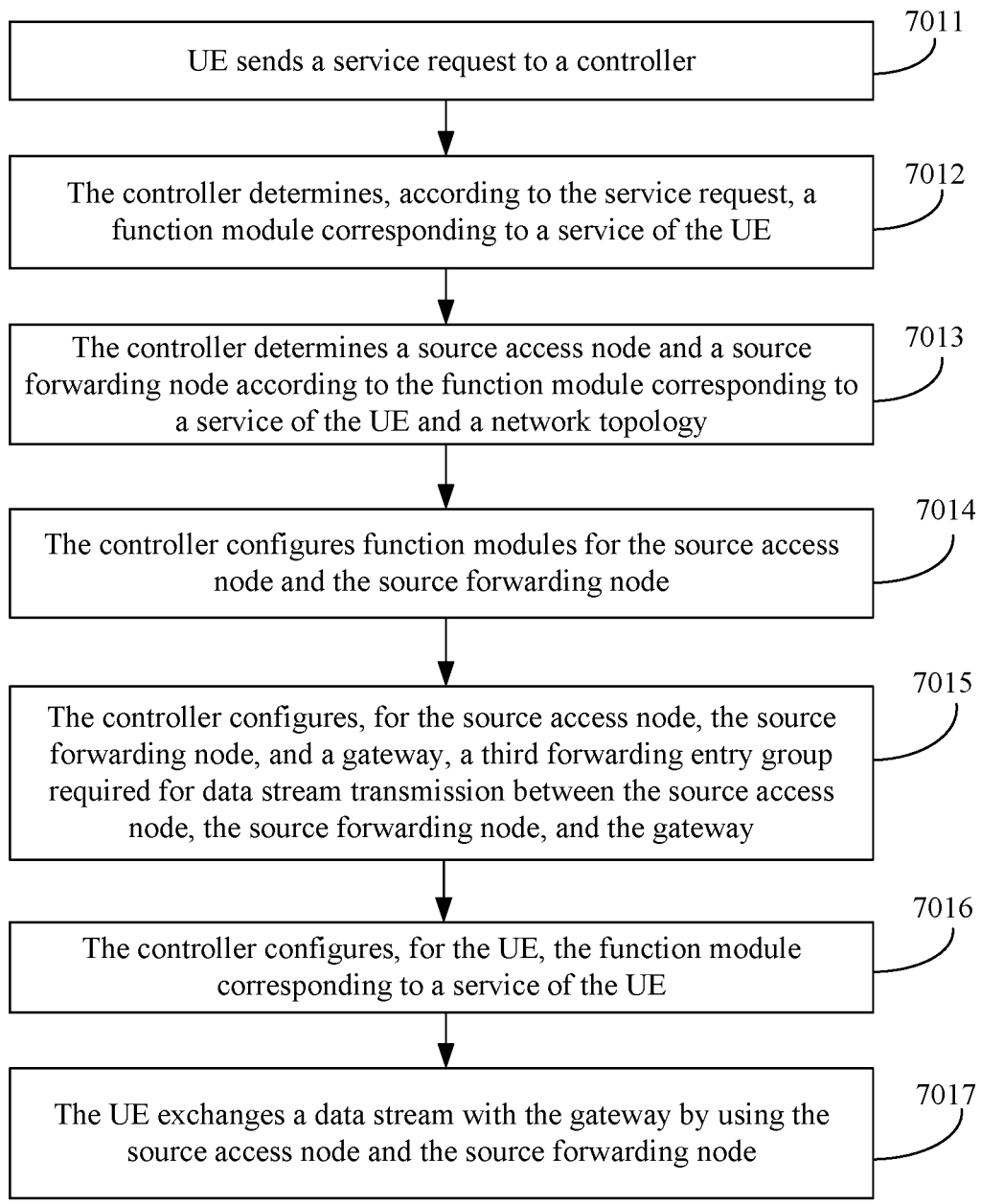
Figures 3, 7:
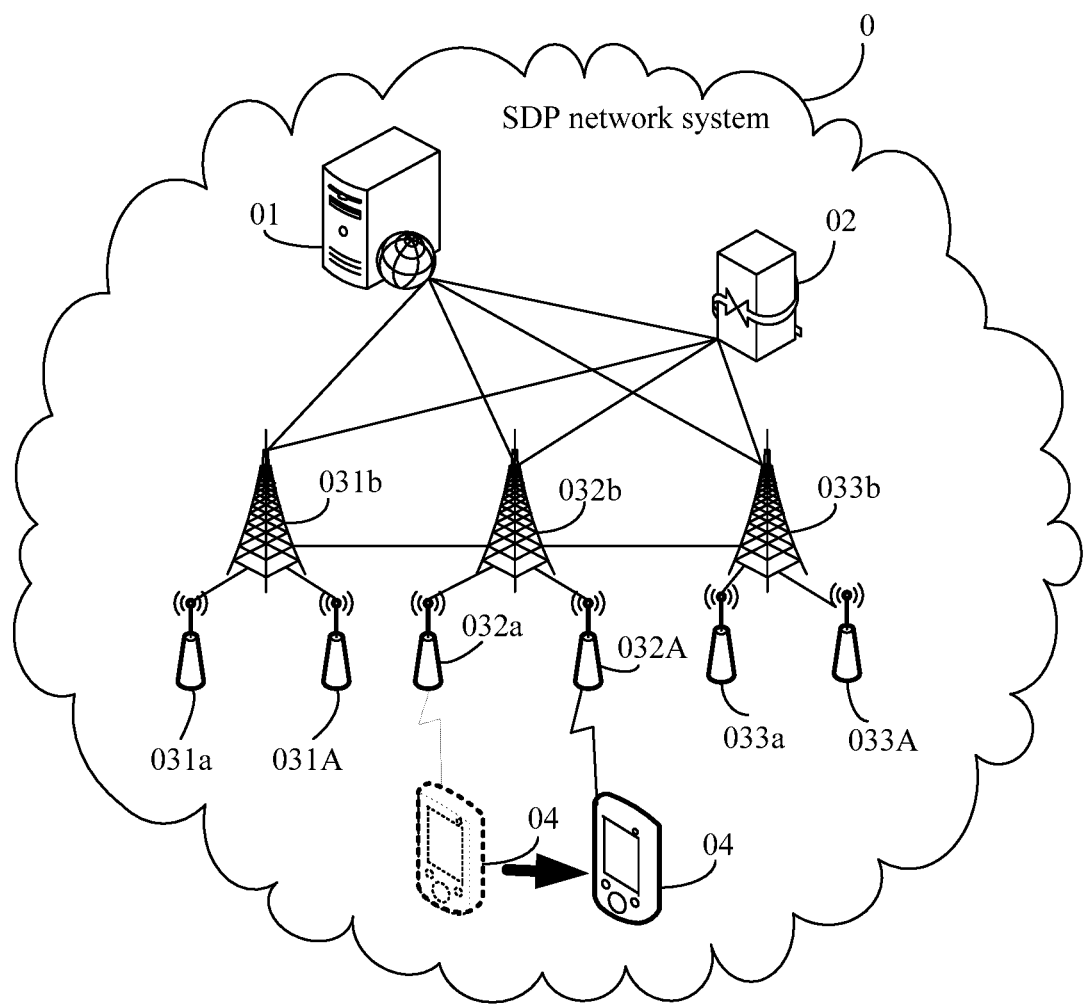

Optionally, as shown in FIG. 7-2, step 701 may include the following steps.

Step 7011. The UE sends a service request to a controller.

When the UE needs to execute a service, the UE can generate the service request according to identifier information of the UE and a quality of service parameter of the service, and send the service request to the controller.

Step 7012. The controller determines, according to the service request, a function module corresponding to a service of the UE.

For example, the controller may determine, according to the identifier information of the UE and the quality of service parameter that are in the service request, the function module corresponding to a service of the UE. It should be noted that multiple protocol layers may be set for each device in the SDP network system, and multiple function modules may be configured at each protocol layer. Optionally, the controller may determine, according to the identifier information of the UE and the quality of service parameter, an access technology supported by the UE and select, according to the access technology and the quality of service parameter, the corresponding function module processing a service of the UE. For example, after the controller receives the service request sent by the UE, the controller may determine, according to the service request, that a protocol layer at which a processing module corresponding to the UE is located includes a PHY layer, a Media Access Control MAC layer, an RLC layer, and a PDCP layer, and determine, at the PHY layer, the MAC layer, the RLC layer, and the PDCP layer according to the service request, function modules corresponding to a service of the UE.

It should be noted that in this embodiment of the present invention, the node handover method is described by using an example in which the protocol layer at which the processing module corresponding to the UE is located includes the PHY layer, the MAC layer, the RLC layer, and the PDCP layer. In actual application, the processing module corresponding to the UE may alternatively be located at another protocol layer. This is not limited in this embodiment of the present invention.

Step 7013. The controller determines the source access node and the source forwarding node according to the function module corresponding to a service of the UE and a network topology.

It should be noted that the network topology of the SDP network system may be maintained in the controller. A connection relationship between all devices in the SDP network system and a function attribute of each device in the SDP network system may be recorded in the network topology. For example, the controller may determine, according to the function module corresponding to a service of the UE and the network topology, the source access node and the source forwarding node that are configured to bear the function module corresponding to a service of the UE.

As shown in FIG. 1-1, it is assumed that the function module corresponding to a service of the UE determined in step 7012 includes a PHY layer function module 1, a MAC layer function module 2, an RLC layer function module 3, and a PDCP layer function module 4, and a node currently accessed by the UE is determined as a node 032*a* according to a network topology. The controller determines, according to a function attribute of the node 032*a* currently accessed by the UE recorded in the network topology and the function module corresponding to a service of the UE, that the node 032*a* currently accessed by the UE can bear the PHY layer function module 1, the MAC layer function module 2, and the RLC layer function module 3, but the node 032*a* currently accessed by the UE cannot bear the PDCP layer function module 4. In this case, it can be learned according to the network topology that a node 032*b* that can perform data stream exchange with the node 032*a* currently accessed by the UE can bear the PDCP layer function module 4. Therefore, the node 032*b* can be determined as a forwarding node corresponding to the node 032*a* currently accessed by the UE. In addition, the node 032*a* currently accessed by the UE and the forwarding node 032*b* corresponding to the node 032*a* currently accessed by the UE are determined as source nodes. In this case, the node 032*a* currently accessed by the UE is referred to as the source access node, and the forwarding node 032*b* corresponding to the node 032*a* currently accessed by the UE is referred to as the source forwarding node.

Step 7014. The controller configures function modules for the source access node and the source forwarding node.

For example, as shown in FIG. 1-1, the controller may configure the PHY layer function module 1, the MAC layer function module 2, and the RLC layer function module 3 for the source access node 032*a*, and configure the PDCP layer function module 4 for the source forwarding node 032*b*. On the one hand, the controller may generate a source access node configuration command according to the PHY layer function module 1, the MAC layer function module 2, and the RLC layer function module 3, and generate a source forwarding node configuration command according to the PDCP layer function module 4. In addition, the controller sends the source access node configuration command to the source access node 032*a*, and sends the source forwarding node configuration command to the source forwarding node 032*b*, so that the source access node 032*a* activates the corresponding function modules according to the source access node configuration command, and the source forwarding node 032*b* activates the corresponding function module according to the source forwarding node configuration command. On the other hand, the controller may generate source access node configuration information according to the PHY layer function module 1, the MAC layer function module 2, and the RLC layer function module 3, and generate source forwarding node configuration information according to the PDCP layer function module 4. In addition, the controller sends the source access node configuration information to the source access node 032*a*, and sends the source forwarding node configuration information to the source forwarding node 032, so that the source access node 032*a* configures the corresponding function modules according to the source access node configuration information, and the source forwarding node 032*b* configures the corresponding function module according to the source forwarding node configuration information.

Step 7015. The controller configures, for the source access node, the source forwarding node, and the gateway, a third forwarding entry group required for data stream transmission between the source access node, the source forwarding node, and the gateway.

After determining the source nodes, the controller may determine, according to the network topology, forwarding entries of the third forwarding entry group required for data stream transmission between the source access node, the source forwarding node, and the gateway, and send configuration information of the forwarding entries of the third forwarding entry group to the source access node, the source forwarding node, and the gateway, so that the source access node, the source forwarding node, and the gateway configure the corresponding forwarding entries according to the received configuration information. In this way, the third forwarding entry group required for data stream transmission between each source node and the gateway is configured for the source access node, the source forwarding node, and the gateway. Specifically, the third forwarding entry group may include a forwarding entry required for sending a data stream by the source access node to the source forwarding node, a forwarding entry required for sending a data stream by the source forwarding node to the source access node, a forwarding entry required for sending a data stream by the source forwarding node to the gateway, and a forwarding entry required for sending a data stream by the gateway to the source forwarding node. Then, configuration information of the forwarding entry required for sending a data stream by the source access node to the source forwarding node is sent to the source access node. Configuration information of the forwarding entry required for sending a data stream by the source forwarding node to the source access node is sent to the source forwarding node. Configuration information of the forwarding entry required for sending a data stream by the source forwarding node to the gateway is sent to the source forwarding node. Configuration information of the forwarding entry required for sending a data stream by the gateway to the source forwarding node is sent to the gateway.

Step 7016. The controller configures, for the UE, the function module corresponding to a service of the UE.

It is assumed that the PHY layer function module 1, the MAC layer function module 2, the RLC layer function module 3, and the PDCP layer function module 4 are determined as the function modules corresponding to a service of the UE. On the one hand, the controller may generate a UE configuration command according to the PHY layer function module 1, the MAC layer function module 2, the RLC layer function module 3, and the PDCP layer function module 4, and send the UE configuration command to the UE, so that the UE activates the corresponding function modules according to the UE configuration command. On the other hand, the controller may generate UE configuration information according to the PHY layer function module 1, the MAC layer function module 2, the RLC layer function module 3, and the PDCP layer function module 4, and send the UE configuration information to the UE, so that the UE configures the corresponding function modules according to the UE configuration information.

Step 7017. The UE performs data stream exchange with the gateway by using the source access node and the source forwarding node.

For example, as shown in FIG. 1-1, the source nodes determined in step 7013 include the source access node 032*a* and the source forwarding node 032*b*. Therefore, in step 7017, the UE can perform data stream exchange with a gateway 02 by using the source access node 032*a* and the source forwarding node 032*b*.

Step 702. The UE sends node capability information to the source access node. Step 703 is performed.

For example, the UE may regularly obtain capability information of each node within a detection range of the UE. The capability information of the node obtained by the UE may be signal quality strength of the node, obtained by the UE. It should be noted that the capability information of the node may alternatively be other information. This is not limited in this embodiment of the present invention. The UE may establish a connection to the source access node by using an air interface. After the UE obtains the capability information of each node within the detection range of the UE, the UE may send the capability information of each node within the detection range of the UE to the source access node by using the air interface.

Step 703. The source access node determines a target access node according to the node capability information. Step 704 is performed.

After receiving the capability information of each node within the detection range of the UE that is sent by the UE, the source access node may obtain, by means of filtering according to a preset filtering manner from the multiple nodes within the detection range of the UE, a node satisfying a filtering condition as the target access node. For example, a preset capability threshold may be stored in the source access node. The source access node may compare the preset capability threshold with a capability value indicated by the capability information of each node within the detection range of the UE, so as to obtain, by means of filtering from the multiple nodes within the detection range of the UE, nodes whose capability values indicated by the capability information are greater than the preset capability threshold, and determine, among the nodes whose capability values indicated by the capability information of the nodes are greater than the preset capability threshold, a node with a greatest capability value indicated by capability information as the target access node. It should be noted that if the capability values indicated by the capability information of all nodes within the detection range of the UE are less than the preset capability threshold, the source access node skips the action. In actual application, the source access node may alternatively determine the target access node in another manner. This is not limited in this embodiment of the present invention. As shown in FIG. 7-3, when UE-04 moves from a location near the source access node 032*a* to a location near a node 032A, the source access node 032*a* determines the node 032A as the target access node.

Step 704. The source access node generates a handover request message according to a quality of service parameter of the UE. Step 705 is performed.

The quality of service parameter of the UE may be stored in the source access node. The source access node may generate the handover request message according to the quality of service parameter of the UE. The handover request message is used to indicate that the UE needs to access the target access node. Optionally, the source access node may alternatively obtain the quality of service parameter of the UE from the UE.

Step 705. The source access node sends the handover request message to the target access node. Step 706 is performed.

The source access node determines the target access node in step 703, and the source access node generates the handover request message in step 705. Therefore, in step 705, the source access node may send the handover request message to the target access node according to an identifier of the target access node. For example, the handover request message may be sent to the target access node in a form of signaling.

Step 706. The target access node determines whether the target access node allows access of the UE. If the target access node disallows access of the UE, step 707 is performed. If the target access node allows access of the UE, step 708 is performed.

After receiving the handover request message sent by the source access node, the target access node may determine, according to the quality of service parameter of the UE in the handover request message, whether the target access node allows access of the UE. If the target access node disallows access of the UE, step 707 is performed. If the target access node allows access of the UE, step 708 is performed. Optionally, for a specific step of determining, by the target access node according to the quality of service parameter of the UE in the handover request message, whether the target access node allows access of the UE, reference may be made to a specific step of determining, by a node according to a quality of service parameter, whether the node allows access of UE in the conventional art, and details are not described herein in this embodiment of the present invention.

Step 707. The target access node indicates to the source access node that the target access node disallows access of the UE.

If the target access node disallows access of the UE, the target access node may generate a message used to indicate that the target access node disallows access of the UE, and send, to the source access node, the message used to indicate that the target access node disallows access of the UE, so that after receiving the message used to indicate that the target access node disallows access of the UE, the source access node determines that the target access node disallows access of the UE.

Step 708. The target access node indicates to the source access node that the target access node allows access of the UE. Step 709 is performed.

The target access node may generate a handover feedback message used to indicate that the target access node allows access of the UE, and send the handover feedback message to the source access node.

Step 709. The source access node generates a handover command. Step 710 is performed.

After receiving the handover feedback message sent by the target access node, the source access node may generate the handover command used to instruct the UE to perform node handover. For example, the handover command may include the identifier of the target access node. It should be noted that the handover command may further include other information. This is not limited in this embodiment of the present invention.

Step 710. The source access node sends the handover command to the UE. Step 711 is performed.

For example, the source access node may send, to the UE by using the air interface, the handover command generated by the source access node.

Step 711. The UE establishes a connection to the target access node according to the handover command. Step 712 is performed.

After receiving the handover command used to instruct the UE to perform node handover, the UE may disconnect from the source access node and establish the connection to the target access node according to the handover command. For example, the UE may further re-establish a protocol layer for the UE. For a specific step of re-establishing, by the UE, the protocol layer for the UE, reference may be made to a specific step of establishing, by UE, a protocol layer in the conventional art, and details are not described herein in this embodiment of the present invention.

Step 712. The target access node generates a protocol configuration request message according to the handover request message. Step 713 is performed.

If the target access node allows access of the UE, the target access node may generate the protocol configuration request message according to the handover request message sent by the source access node. Both the handover request message and the protocol configuration request message may include the quality of service parameter of the UE. The protocol configuration request message is used to instruct to configure a function module for the target access node.

Step 713. The target access node sends the protocol configuration request message to a controller. Step 714 is performed.

Optionally, the target access node may send the generated protocol configuration request message to the controller. For example, the protocol configuration request message may be sent to the controller in a form of signaling.

Step 714. The controller determines, according to the protocol configuration request message, a function module corresponding to a service of the UE. Step 715 is performed.

The controller may determine, according to the quality of service parameter of the UE in the protocol configuration request message, the function module corresponding to a service of the UE. Optionally, multiple protocol layers may be set for each device in the SDP network system, and multiple function modules may be configured at each protocol layer. Multiple protocol layers may be set for the UE, and multiple function modules may be configured at each protocol layer of the UE, where functions of the function modules are different. For example, the controller may select, according to the quality of service parameter of the UE, the corresponding function module processing a service of the UE. The function module corresponding to a service of the UE may be the PHY layer function module 1, the MAC layer function module 2, the RLC layer function module 3, and the PDCP layer function module 4.

Step 715. The controller determines a target forwarding node according to the function module corresponding to a service of the UE and a network topology. Step 716 is performed.

The network topology of the SDP network system may be stored and maintained in the controller, that is, a connection relationship among multiple devices in the SDP network system and a function attribute of each device in the SDP network system. The controller may determine, according to the function module corresponding to a service of the UE determined in step 714 and the network topology of the SDP network system, the target forwarding node (that is, the source forwarding node) corresponding to the target access node, so that the target access node can send a data stream in the target access node to the gateway. That is, the controller determines, according to the function module corresponding to a service of the UE and the network topology, the target access node and the target forwarding node (that is, the source forwarding node) that bear the function module corresponding to a service of the UE after node handover. As shown in FIG. 7-3, when the UE-04 moves from a location near the source access node 032a to a location near the node 032A, the source access node 032a determines the node 032A as the target access node. In this case, a controller 01 may determine, according to the function module corresponding to a service of the UE and the network topology, that the node 032b is the target forwarding node (that is, the source forwarding node) corresponding to the target access node 032A. That is, the target forwarding node and the source forwarding node are a same node.

Step 716. The controller configures the function module for the target access node. Step 717 is performed.

After determining the target access node and the target forwarding node (that is, the source forwarding node), the controller may configure the function module for the target access node according to the function module corresponding to a service of the UE and the network topology. Because the target forwarding node and the source forwarding node are a same node, there is no need to configure a function module for the target forwarding node (that is, the source forwarding node).

For example, it is assumed that the function module corresponding to a service of the UE includes the PHY layer function module 1, the MAC layer function module 2, the RLC layer function module 3, and the PDCP layer function module 4. As shown in FIG. 7-3, the controller may configure the PHY layer function module 1, the MAC layer function module 2, and the RLC layer function module 3 for the target access node 032A. Because the target forwarding node 032b and the source forwarding node 032b are a same node, and the PDCP layer function module 4 is configured in the source forwarding node 032b, the PDCP layer function module 4 is configured in the target forwarding node 032b. On the one hand, the controller may generate a target access node configuration command according to the PHY layer function module 1, the MAC layer function module 2, and the RLC layer function module 3, and send the target access node configuration command to the target access node 032A, so that the target access node 032A activates the corresponding function modules according to the target access node configuration command. On the other hand, the controller may generate target access node configuration information according to the PHY layer function module 1, the MAC layer function module 2, and the RLC layer function module 3, and send the target access node configuration information to the target access node 032A, so that the target access node 032A configures the corresponding function modules according to the target access node configuration information.

Step 717. The controller configures a first forwarding entry group for the source access node. Step 718 is performed.

The controller may determine, according to the function modules configured for the target access node and the target forwarding node (that is, the source forwarding node) and the network topology, a forwarding entry required for sending a data stream by the source access node to the source forwarding node (that is, the target forwarding node). For example, the first forwarding entry group may include the forwarding entry required for sending a data stream by the source access node to the source forwarding node (that is, the target forwarding node). Then, the controller may send, to the source access node, configuration information of the forwarding entry required for sending a data stream by the source access node to the source forwarding node (that is, the target forwarding node), so that the source access node configures the corresponding forwarding entry according to the received configuration information of the forwarding entry.

It should be noted that in step 7015, the controller configures the forwarding entry of the third forwarding entry group for the source access node, so that the source access node sends, to the source forwarding node (that is, the target forwarding node) according to the forwarding entry of the third forwarding entry group, data sent by the UE. However, the forwarding entry of the first forwarding entry group configured for the source access node in step 717 is used to forward data temporarily stored in the source access node. That is, data sent by the source forwarding node to the source access node is different from data sent by the UE to the source access node. Therefore, the forwarding entry of the third forwarding entry group configured for the source access node in step 7015 cannot be directly used to forward the data temporarily stored in the source access node, and the forwarding entry of the first forwarding entry group needs to be configured for the source access node.

Step 718. The source access node sends, to the source forwarding node according to the first forwarding entry group, data temporarily stored in the source access node. Step 719 is performed.

The source access node may send, to the source forwarding node (that is, the target forwarding node) according to the forwarding entry of the first forwarding entry group, the data temporarily stored in the source access node. The gateway may send a data stream to the UE by using the source forwarding node and the source access node. For example, after the gateway sends the data stream to the source forwarding node, the source forwarding node may perform encryption processing on the data stream sent by the gateway and send the encrypted data stream to the source access node. The source access node may process the data stream encrypted by the source forwarding node and send the data stream to the UE, and may temporarily store the data stream encrypted by the source forwarding node.

Step 719. The controller configures a second forwarding entry group for the target access node and the target forwarding node. Step 720 is performed.

The second forwarding entry group may include a forwarding entry required for transmitting a data stream by the target access node to the target forwarding node (that is, the source forwarding node). The controller may determine, according to the function modules configured for the target access node and the target forwarding node and the network topology, the a forwarding entry required for transmitting a data stream by the target access node to the target forwarding node (that is, the source forwarding node). In addition, the controller sends configuration information of the a forwarding entry required for transmitting a data stream by the target access node to the target forwarding node (that is, the source forwarding node) to both the target access node and the target forwarding node (that is, the source forwarding node), so that the target access node and the target forwarding node (that is, the source forwarding node) configure the corresponding forwarding entry according to the received configuration information of the forwarding entry. In this way, the second forwarding entry group is configured for the target access node and the target forwarding node (that is, the source forwarding node). Because the target forwarding node and the source forwarding node are a same node, there is no need to configure a forwarding entry of the second forwarding entry group for the gateway.

It should be noted that after the controller configures the forwarding entry of the second forwarding entry group for the target forwarding node (that is, the source forwarding node), because the target forwarding node and the source forwarding node are a same node, the data that is temporarily stored in the source access node and that is sent by the source access node is stored in the target forwarding node. The target forwarding node (that is, the source forwarding node) may send, to the target access node according to the forwarding entry of the second forwarding entry group, the data temporarily stored in the source access node, and the target access node temporarily stores the data temporarily stored in the source access node. It should be noted that after receiving the data that is temporarily stored in the source access node and that is sent by the target forwarding node (that is, the source forwarding node), the target access node may alternatively send the data temporarily stored in the source access node to the UE.

Step 720. The source forwarding node sends a downlink data stream end mark to the source access node. Step 721 is performed.

Before node handover, the gateway is connected to the Internet, and therefore, the gateway may receive a downlink data stream sent by the Internet and send the downlink data stream to the source forwarding node. The source forwarding node sends the downlink data stream to the source access node. Finally, the source access node sends the downlink data stream to the UE. After the source access node receives the configuration information of the forwarding entry of the first forwarding entry group and the corresponding forwarding entry is configured according to the received configuration information of the forwarding entry, the source access node may send, to the source forwarding node (that is, the target forwarding node) according to the forwarding entry of the first forwarding entry group, the data temporarily stored in the source access node. After receiving the configuration information of the forwarding entry of the second forwarding entry group, the source forwarding node (that is, the target forwarding node) may generate the downlink data stream end mark and send the downlink data stream end mark to the source access node.

After sending the data temporarily stored in the source access node to the source forwarding node (that is, the target forwarding node), the source access node may release protocol state information in the source access node according to the downlink data stream end mark, and may further delete, according to the downlink data stream end mark, the forwarding entry of the first forwarding entry group and the forwarding entry of the third forwarding entry group that are in the source access node. The source access node may further send the downlink data stream end mark to the source forwarding node (that is, the target forwarding node). After receiving the downlink data stream end mark sent by the source access node, the source forwarding node (that is, the target forwarding node) may delete, according to the downlink data stream end mark, the forwarding entry of the third forwarding entry group for sending data by the source forwarding node to the source access node. It should be noted that the forwarding entry of the third forwarding entry group for sending data by the source forwarding node (that is, the target forwarding node) to the gateway still exists in the source forwarding node.

Step 721. The UE performs data stream exchange with the gateway by using the target access node and the target forwarding node.

For example, after the UE establishes a connection to the target access node, the second forwarding entry group required for data stream transmission between a target node and the gateway is configured for both the target access node and the target forwarding node (that is, the source forwarding node), and the data temporarily stored in the source access node is sent to the target access node, the UE can perform data stream exchange with the gateway by using the target access node and the target forwarding node, and perform handover from the source access node and the source forwarding node to the target access node and the target forwarding node (that is, the source forwarding node).

Further, a downlink data stream received by the UE may include multiple downlink data packets. After step 721, the UE may detect whether the received downlink data stream is complete. If the UE detects that the downlink data stream received by the UE is incomplete, the UE may generate downlink data packet retransmission indication information according to a downlink data packet that is not received by the UE, and send the downlink retransmission indication information to the target access node. The target access node and the target forwarding node (that is, the source forwarding node) retransmit, to the UE according to the downlink data packet retransmission indication information, the downlink data packet that is not received by the UE.

The controller in this embodiment of the present invention can configure function modules for nodes and can configure forwarding entry for nodes and the gateway. In actual application, the controller may include an SDP controller and an SDN controller. The SDP controller is configured to configure the function modules for the nodes. The SDN controller is configured to configure the forwarding entry for the nodes and the gateway. It should be noted that on the one hand, in this embodiment of the present invention, the node handover method is described by using an example in which the source access node determines the target access node. In actual application, alternatively, the controller may determine the target access node and the target forwarding node. This is not limited in this embodiment of the present invention. On the other hand, in this embodiment of the present invention, the node handover method is described by using an example in which the source access node is corresponding to one source forwarding node, and the target access node is corresponding to one target forwarding node. In actual application, a quantity of the source forwarding nodes may be another value, and a quantity of the target forwarding nodes may be another value. This is not limited in this embodiment of the present invention.

It should be noted that the order of the node handover method steps in this embodiment of the present invention may be appropriately adjusted, and the steps may also be correspondingly added or deleted according to a situation. All variant methods readily figured out by a person skilled in the art within the technical scope disclosed in the present invention shall fall within the protection scope of the present invention, and therefore are not described.

In conclusion, according to the node handover method provided in this embodiment of the present invention, after receiving a protocol configuration request message sent by a target access node, a controller determines, according to a quality of service parameter, a function module corresponding to a service of UE, configures, according to the function module corresponding to a service of the UE and a network topology, a function module for a target node, and determines a first forwarding entry group and a second forwarding entry group, so that a source node can send data temporarily stored in the source node to the target node according to the first forwarding entry group, and the target node performs data stream transmission with a gateway according to the second forwarding entry group. In this way, the target access node serves the UE, handover between nodes in an SDP network system is implemented, and functions of the SDP network system are enriched.

Figures 1B, 4:
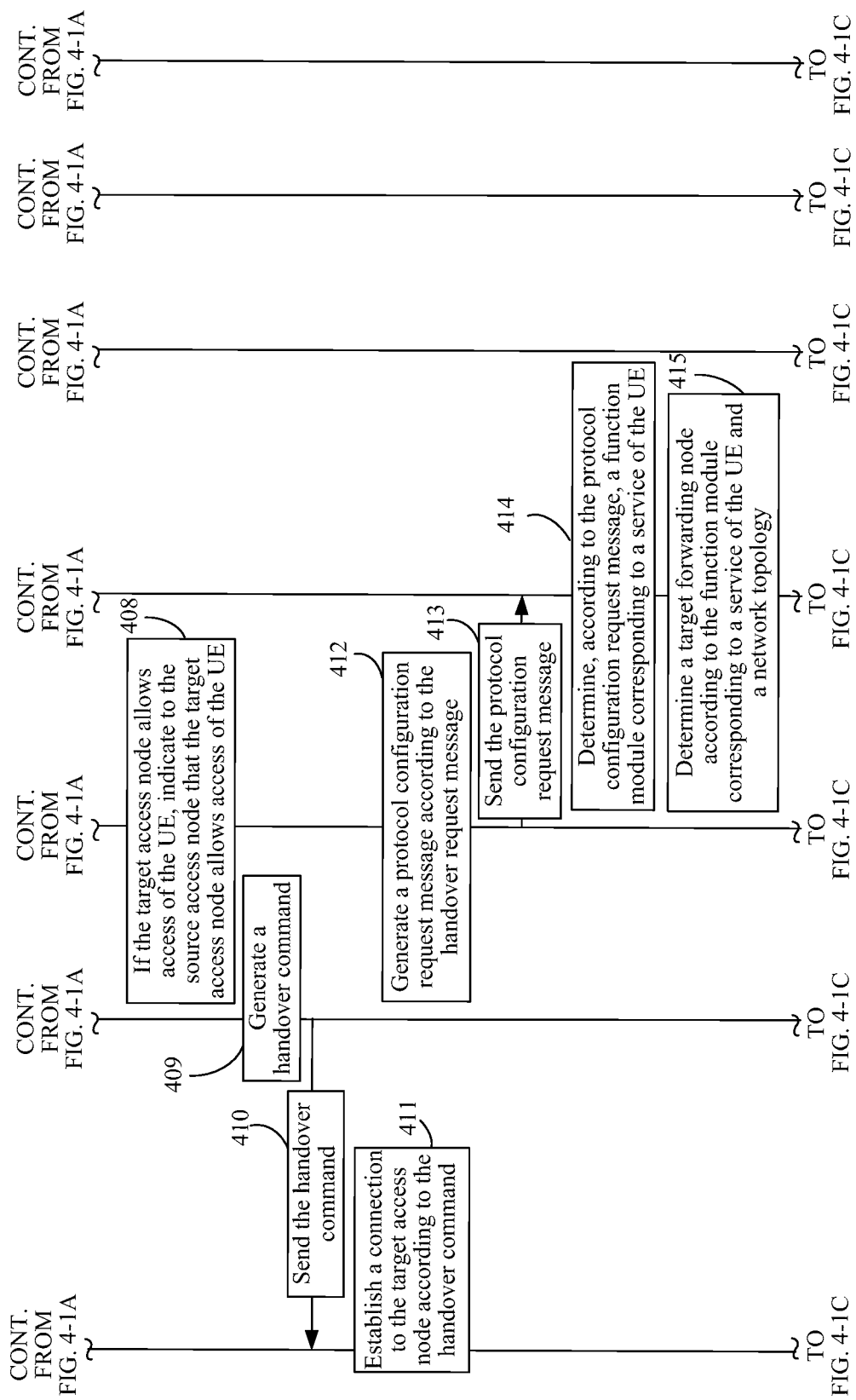
Figures 1C, 4:
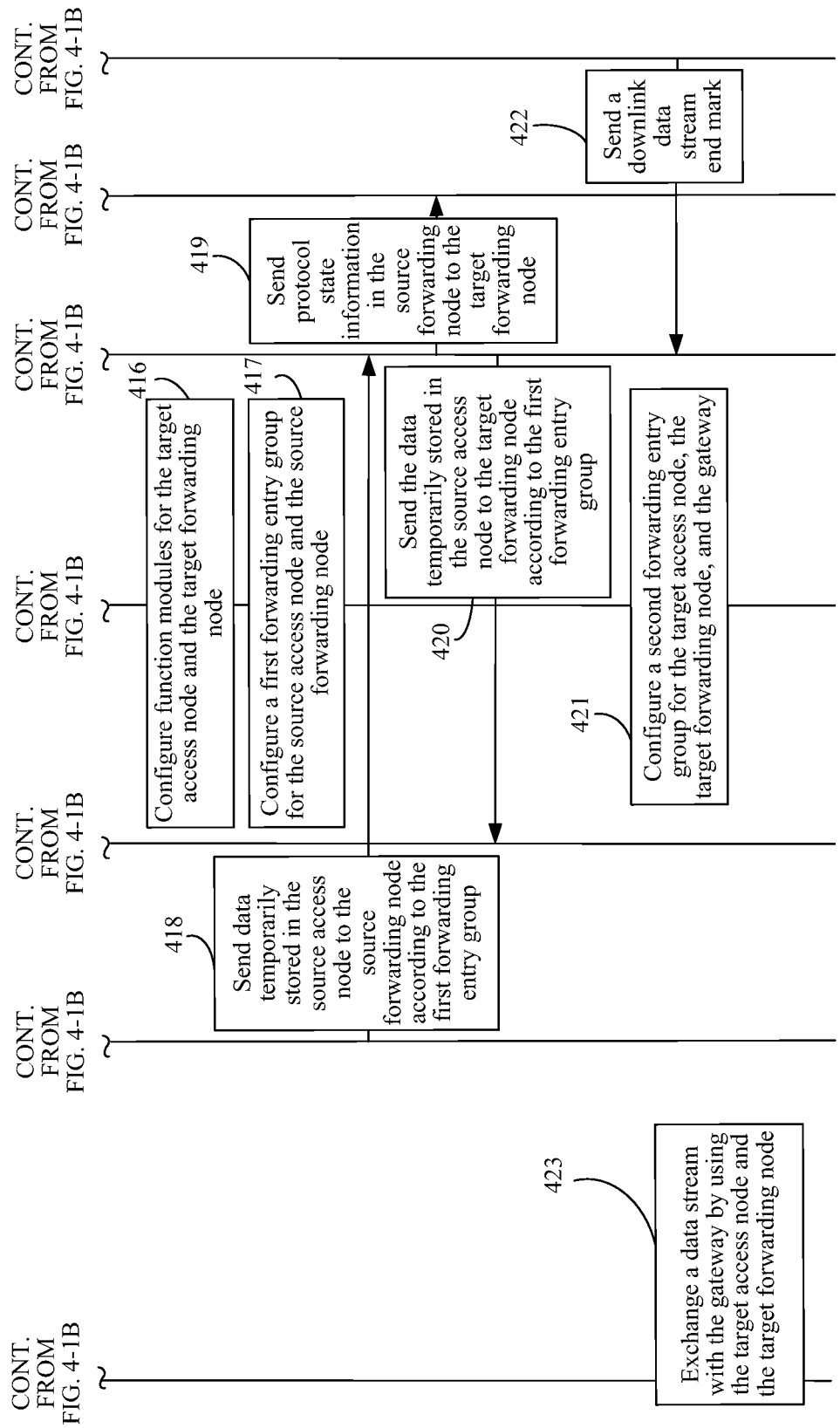
Figures 2, 4:
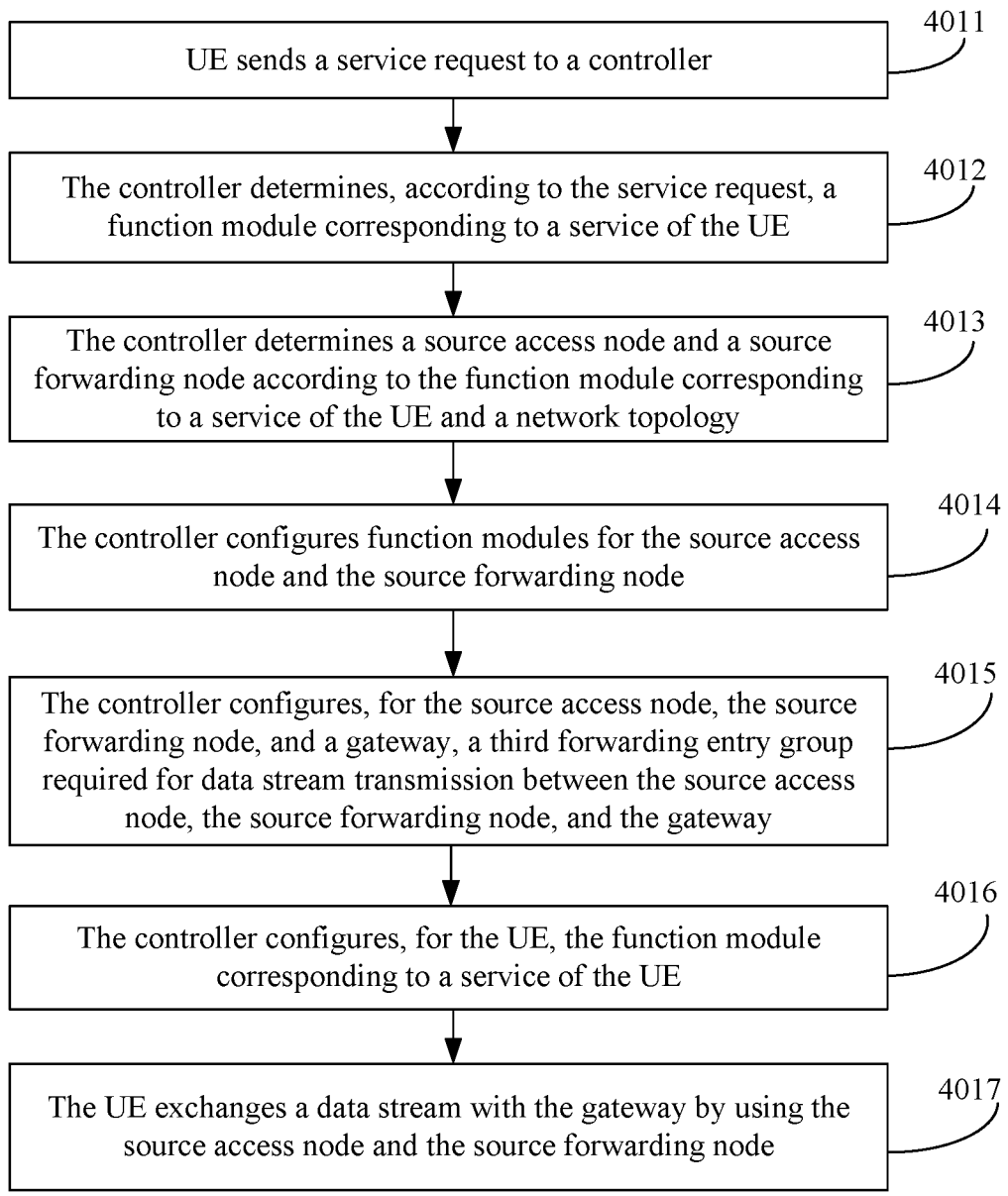
Figures 3, 4:
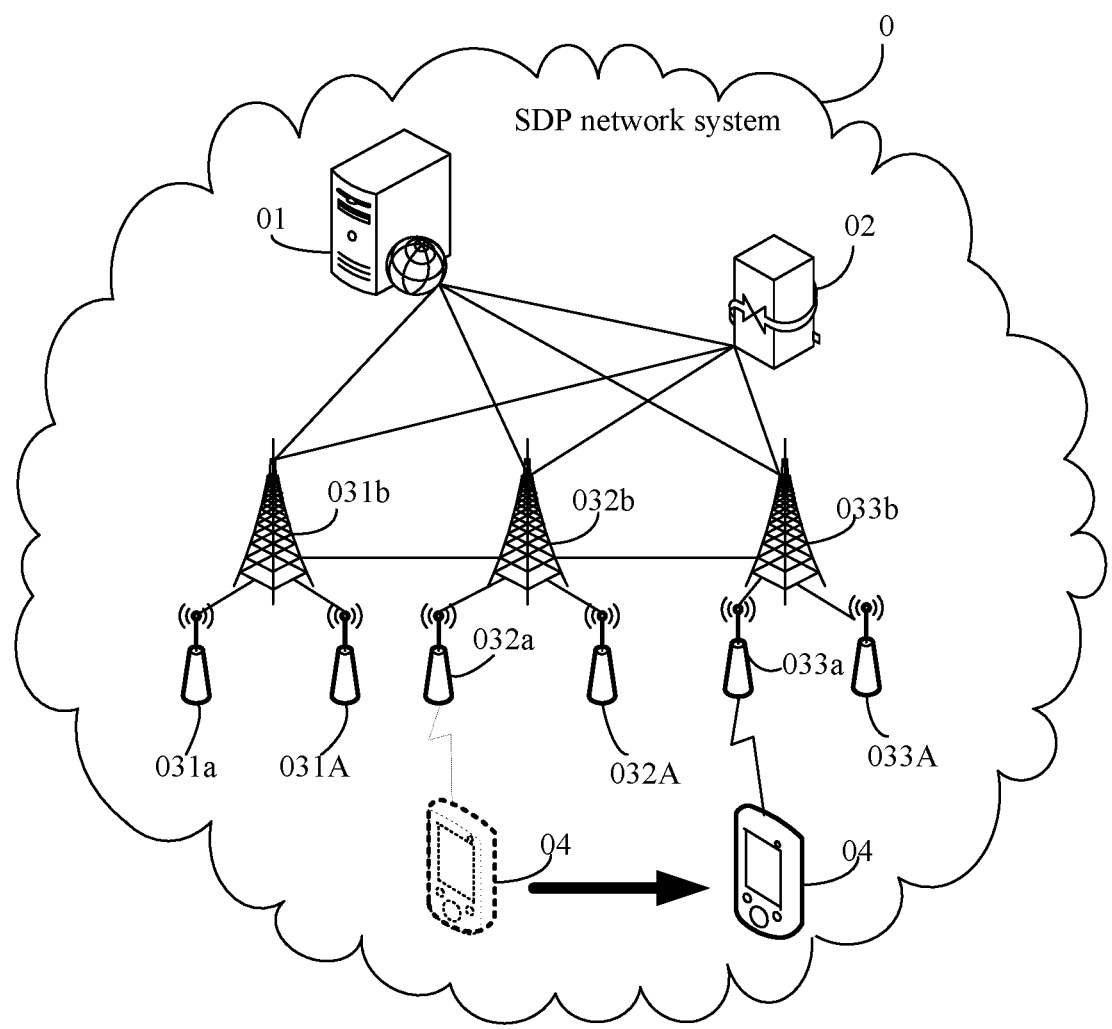
Figures 1B, 8:
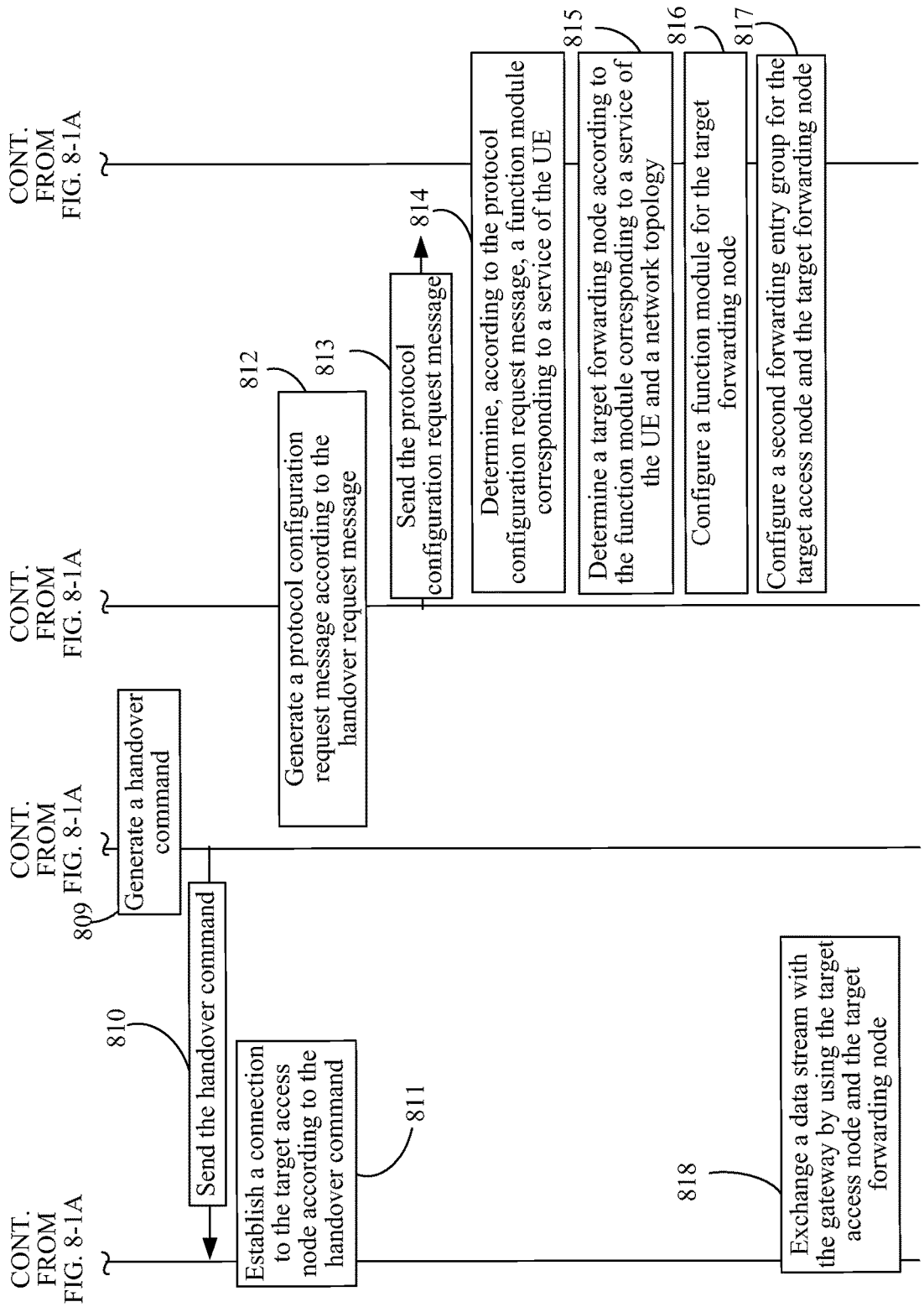
Figures 2, 8:
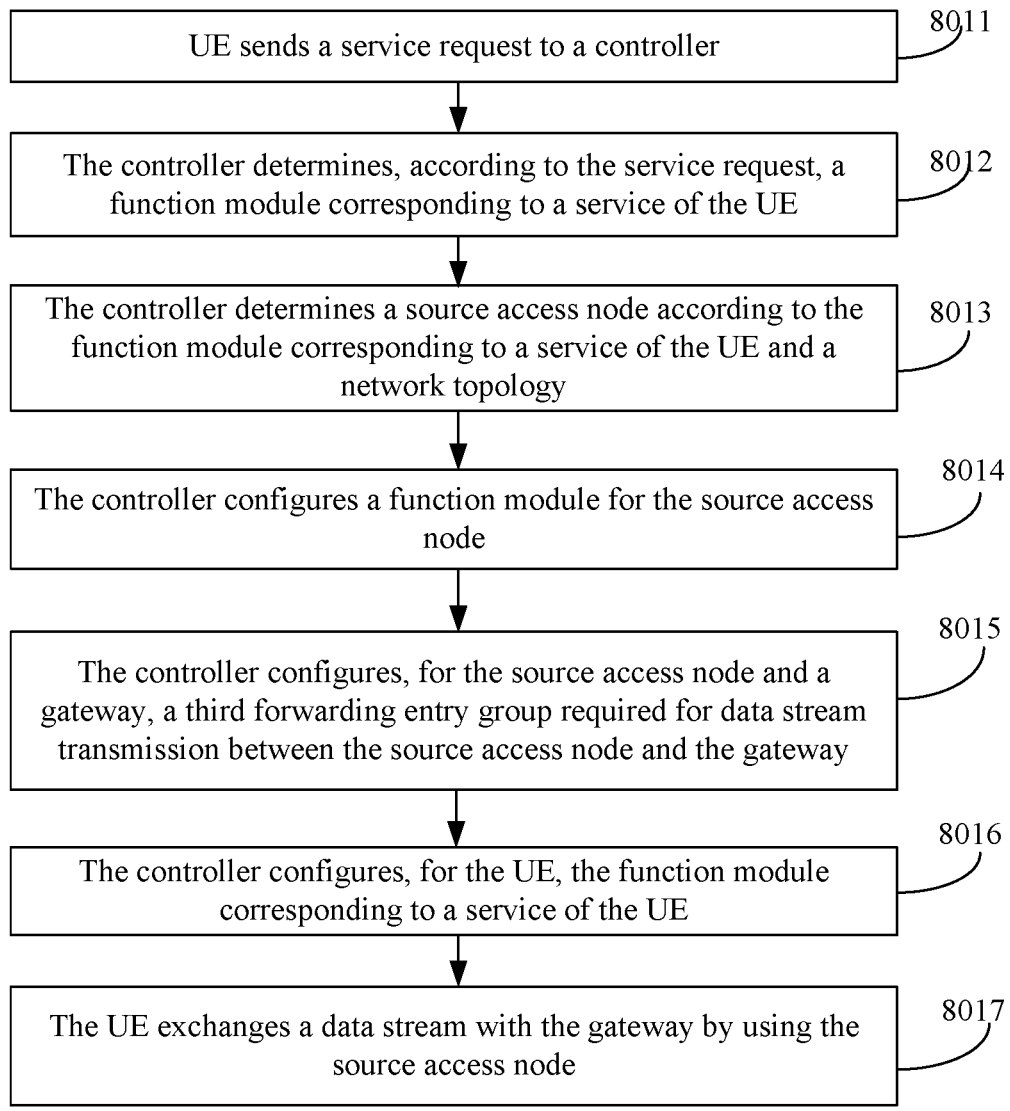
Figures 3, 8:
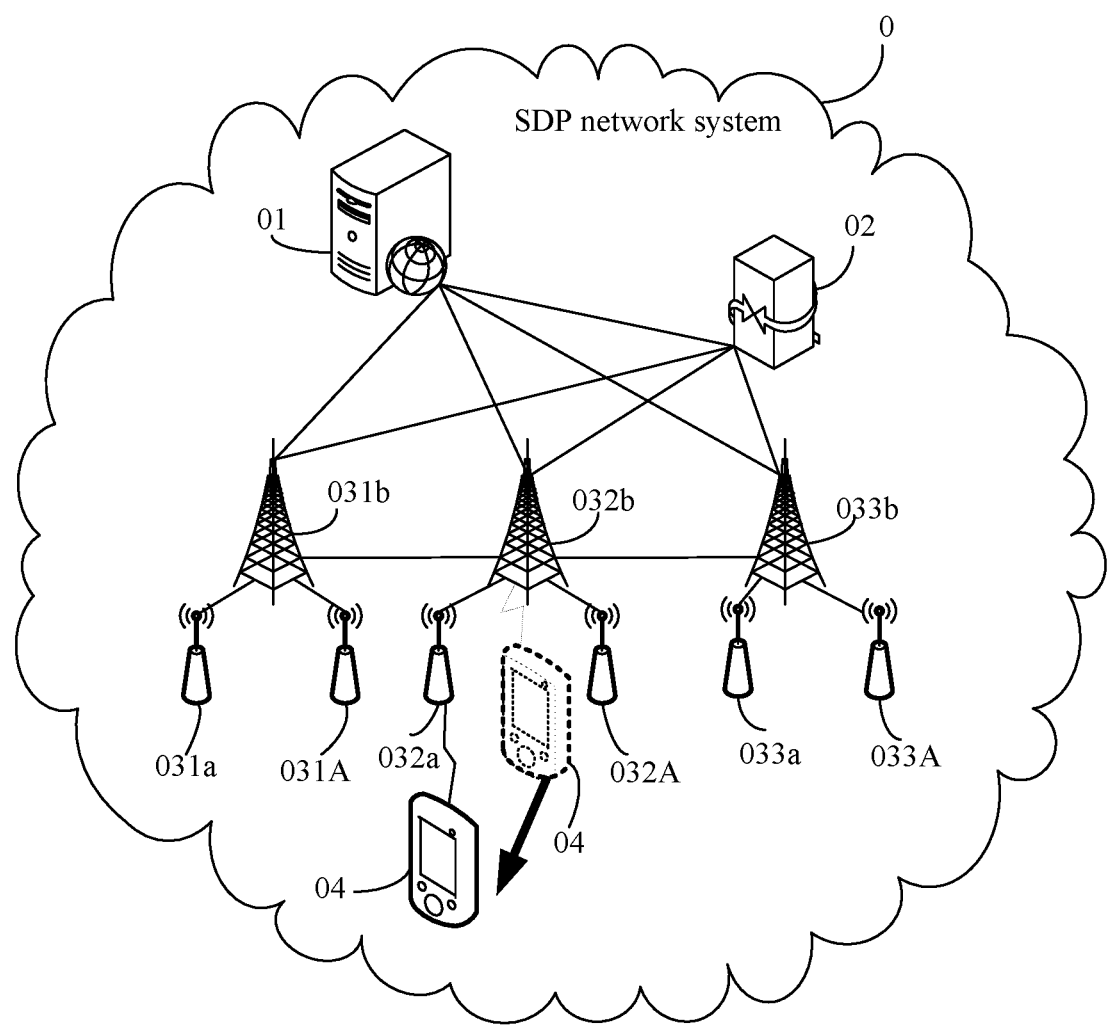

As shown in FIG. 8-1A and FIG. 8-1B, another embodiment of the present invention provides still another node handover method, applied to the SDP network system 0 shown in FIG. 1-2. For example, the node handover method may include the following steps.

Step 801. UE performs data stream exchange with a gateway by using a source access node. Step 802 is performed.

Optionally, as shown in FIG. 5-2, step 801 may include the following steps.

Step 8011. The UE sends a service request to a controller.

When the UE needs to execute a service, the UE can generate the service request according to identifier information of the UE and a quality of service parameter of the service, and send the service request to the controller.

Step 8012. The controller determines, according to the service request, a function module corresponding to a service of the UE.

For example, the controller may determine, according to the identifier information of the UE and the quality of service parameter that are in the service request, the function module corresponding to a service of the UE. It should be noted that multiple protocol layers may be set for each device in the SDP network system, and multiple function modules may be configured at each protocol layer. Optionally, the controller may determine, according to the identifier information of the UE and the quality of service parameter, an access technology supported by the UE and select, according to the access technology and the quality of service parameter, the corresponding function module processing a service of the UE. For example, after the controller receives the service request sent by the UE, the controller may determine, according to the service request, that a protocol layer at which a processing module corresponding to the UE is located includes a PHY layer, a MAC layer, an RLC layer, and a PDCP layer, and determine, at the PHY layer, the MAC layer, the RLC layer, and the PDCP layer according to the service request, function modules corresponding to a service of the UE.

It should be noted that in this embodiment of the present invention, the node handover method is described by using an example in which the protocol layer at which the processing module corresponding to the UE is located includes the PHY layer, the MAC layer, the RLC layer, and the PDCP layer. In actual application, the processing module corresponding to the UE may alternatively be located at another protocol layer. This is not limited in this embodiment of the present invention.

Step 8013. The controller determines the source access node according to the function module corresponding to a service of the UE and a network topology.

It should be noted that the network topology of the SDP network system may be maintained in the controller. A connection relationship between all devices in the SDP network system and a function attribute of each device in the SDP network system may be recorded in the network topology. For example, the controller may determine, according to the function module corresponding to a service of the UE and the network topology, the source access node configured to bear the function module corresponding to a service of the UE.

As shown in FIG. 1-2, it is assumed that the function module corresponding to a service of the UE determined in step 8012 includes a PHY layer function module 1, a MAC layer function module 2, an RLC layer function module 3, and a PDCP layer function module 4, and a node currently accessed by the UE is determined as a node 032*b* according to the network topology. The controller determines, according to a function attribute of the node 032*b* currently accessed by the UE recorded in the network topology and the function module corresponding to a service of the UE, that the node 032*b* currently accessed by the UE can bear the PHY layer function module 1, the MAC layer function module 2, the RLC layer function module 3, and the PDCP layer function module 4.

Step 8014. The controller configures the function module for the source access node.

For example, as shown in FIG. 1-2, the controller may configure the PHY layer function module 1, the MAC layer function module 2, the RLC layer function module 3, and the PDCP layer function module 4 for the source access node 032*b*. On the one hand, the controller may generate a source access node configuration command according to the PHY layer function module 1, the MAC layer function module 2, the RLC layer function module 3, and the PDCP layer function module 4. In addition, the controller sends the source access node configuration command to the source access node 032*b*, so that the source access node 032*b* activates the corresponding function modules according to the source access node configuration command. On the other hand, the controller may generate source access node configuration information according to the PHY layer function module 1, the MAC layer function module 2, the RLC layer function module 3, and the PDCP layer function module 4, and send the source access node configuration information to the source access node 032*b*, so that the source access node 032*b* configures the corresponding function modules according to the source access node configuration information.

Step 8015. The controller configures, for the source access node and the gateway, a third forwarding entry group required for data stream transmission between the source access node and the gateway.

After determining a source node, the controller may determine, according to the network topology, a forwarding entry of the third forwarding entry group required for transmitting a data stream by the source access node to the gateway, and send configuration information of the forwarding entry of the third forwarding entry group to both the source access node and the gateway, so that the source access node and the gateway configure the corresponding forwarding entry according to the received configuration information. In this way, the third forwarding entry group required for data stream transmission between the source access node and the gateway is configured for the source access node and the gateway. Specifically, the third forwarding entry group may include a forwarding entry required for sending a data stream by the source access node to the gateway and a forwarding entry required for sending a data stream by the gateway to the source access node. Then, configuration information of the forwarding entry required for sending a data stream by the source access node to the gateway is sent to the source access node. Configuration information of the forwarding entry required for sending a data stream by the gateway to the source access node is sent to the gateway.

Step 8016. The controller configures, for the UE, the function module corresponding to a service of the UE.

It is assumed that the PHY layer function module 1, the MAC layer function module 2, the RLC layer function module 3, and the PDCP layer function module 4 are determined as the function modules corresponding to a service of the UE. On the one hand, the controller may generate a UE configuration command according to the PHY layer function module 1, the MAC layer function module 2, the RLC layer function module 3, and the PDCP layer function module 4, and send the UE configuration command to the UE, so that the UE activates the corresponding function modules according to the UE configuration command. On the other hand, the controller may generate UE configuration information according to the PHY layer function module 1, the MAC layer function module 2, the RLC layer function module 3, and the PDCP layer function module 4, and send the UE configuration information to the UE, so that the UE configures the corresponding function modules according to the UE configuration information.

Step 8017. The UE performs data stream exchange with the gateway by using the source access node.

For example, as shown in FIG. 1-2, the source node determined in step 8013 includes the source access node 032*b*. Therefore, in step 8017, the UE can perform data stream exchange with a gateway 02 by using the source access node 032*b*.

Step 802. The UE sends node capability information to the source access node. Step 803 is performed.

For example, the UE may regularly obtain capability information of each node within a detection range of the UE. The capability information of the node obtained by the UE may be signal quality strength of the node, obtained by the UE. It should be noted that the capability information of the node may alternatively be other information. This is not limited in this embodiment of the present invention. The UE may establish a connection to the source access node by using an air interface. After the UE obtains the capability information of each node within the detection range of the UE, the UE may send the capability information of each node within the detection range of the UE to the source access node by using the air interface.

Step 803. The source access node determines a target access node according to the node capability information. Step 804 is performed.

After receiving the capability information of each node within the detection range of the UE that is sent by the UE, the source access node may obtain, by means of filtering according to a preset filtering manner from the multiple nodes within the detection range of the UE, a node satisfying a filtering condition as the target access node. For example, a preset capability threshold may be stored in the source access node. The source access node may compare the preset capability threshold with a capability value indicated by the capability information of each node within the detection range of the UE, so as to obtain, by means of filtering from the multiple nodes within the detection range of the UE, nodes whose capability values indicated by the capability information are greater than the preset capability threshold, and determine, among the nodes whose capability values indicated by the capability information of the nodes are greater than the preset capability threshold, a node with a greatest capability value indicated by capability information as the target access node. It should be noted that if the capability values indicated by the capability information of all nodes within the detection range of the UE are less than the preset capability threshold, the source access node skips the action. In actual application, the source access node may alternatively determine the target access node in another manner. This is not limited in this embodiment of the present invention. As shown in FIG. 8-3, when UE-04 moves from a location near the source access node 032*b* to a location near a node 032*a*, the source access node 032*b* determines the node 032*a* as the target access node.

Step 804. The source access node generates a handover request message according to a quality of service parameter of the UE. Step 805 is performed.

The quality of service parameter of the UE may be stored in the source access node. The source access node may generate the handover request message according to the quality of service parameter of the UE. The handover request message is used to indicate that the UE needs to access the target access node. Optionally, the source access node may alternatively obtain the quality of service parameter of the UE from the UE.

Step 805. The source access node sends the handover request message to the target access node. Step 806 is performed.

The source access node determines the target access node in step 803, and the source access node generates the handover request message in step 805. Therefore, in step 805, the source access node may send the handover request message to the target access node according to an identifier of the target access node. For example, the handover request message may be sent to the target access node in a form of signaling.

Step 806. The target access node determines whether the target access node allows access of the UE. If the target access node disallows access of the UE, step 807 is performed. If the target access node allows access of the UE, step 808 is performed.

After receiving the handover request message sent by the source access node, the target access node may determine, according to the quality of service parameter of the UE in the handover request message, whether the target access node allows access of the UE. If the target access node disallows access of the UE, step 807 is performed. If the target access node allows access of the UE, step 808 is performed. Optionally, for a specific step of determining, by the target access node according to the quality of service parameter of the UE in the handover request message, whether the target access node allows access of the UE, reference may be made to a specific step of determining, by a node according to a quality of service parameter, whether the node allows access of UE in the conventional art, and details are not described herein in this embodiment of the present invention.

Step 807. The target access node indicates to the source access node that the target access node disallows access of the UE.

If the target access node disallows access of the UE, the target access node may generate a message used to indicate that the target access node disallows access of the UE, and send, to the source access node, the message used to indicate that the target access node disallows access of the UE, so that after receiving the message used to indicate that the target access node disallows access of the UE, the source access node determines that the target access node disallows access of the UE.

Step 808. The target access node indicates to the source access node that the target access node allows access of the UE. Step 809 is performed.

The target access node may generate a handover feedback message used to indicate that the target access node allows access of the UE, and send the handover feedback message to the source access node.

Step 809. The source access node generates a handover command. Step 810 is performed.

After receiving the handover feedback message sent by the target access node, the source access node may generate the handover command used to instruct the UE to perform node handover. For example, the handover command may include the identifier of the target access node. It should be noted that the handover command may further include other information. This is not limited in this embodiment of the present invention.

Step 810. The source access node sends the handover command to the UE. Step 811 is performed.

For example, the source access node may send, to the UE by using the air interface, the handover command generated by the source access node.

Step 811. The UE establishes a connection to the target access node according to the handover command. Step 812 is performed.

After receiving the handover command used to instruct the UE to perform node handover, the UE may disconnect from the source access node and establish the connection to the target access node according to the handover command. For example, the UE may further re-establish a protocol layer for the UE. For a specific step of re-establishing, by the UE, the protocol layer for the UE, reference may be made to a specific step of establishing, by UE, a protocol layer in the conventional art, and details are not described herein in this embodiment of the present invention.

Step 812. The target access node generates a protocol configuration request message according to the handover request message. Step 813 is performed.

If the target access node allows access of the UE, the target access node may generate the protocol configuration request message according to the handover request message sent by the source access node. Both the handover request message and the protocol configuration request message may include the quality of service parameter of the UE. The protocol configuration request message is used to instruct to configure a function module for the target access node.

Step 813. The target access node sends the protocol configuration request message to a controller. Step 814 is performed.

Optionally, the target access node may send the generated protocol configuration request message to the controller. For example, the protocol configuration request message may be sent to the controller in a form of signaling.

Step 814. The controller determines, according to the protocol configuration request message, a function module corresponding to a service of the UE. Step 815 is performed.

The controller may determine, according to the quality of service parameter of the UE in the protocol configuration request message, the function module corresponding to a service of the UE. Optionally, multiple protocol layers may be set for each device in the SDP network system, and multiple function modules may be configured at each protocol layer. Multiple protocol layers may be set for the UE, and multiple function modules may be configured at each protocol layer of the UE, where functions of the function modules are different. For example, the controller may select, according to the quality of service parameter of the UE, the corresponding function module processing a service of the UE. The function module corresponding to a service of the UE may be the PHY layer function module 1, the MAC layer function module 2, the RLC layer function module 3, and the PDCP layer function module 4.

Step 815. The controller determines a target forwarding node according to the function module corresponding to a service of the UE and a network topology. Step 816 is performed.

The network topology of the SDP network system may be stored and maintained in the controller, that is, a connection relationship among multiple devices in the SDP network system and a function attribute of each device in the SDP network system. The controller may determine, according to the function module corresponding to a service of the UE determined in step 814 and the network topology of the SDP network system, the target forwarding node (that is, the source access node) corresponding to the target access node, so that the target access node can send a data stream in the target access node to the gateway. That is, the controller determines, according to the function module corresponding to a service of the UE and the network topology, the target access node and the target forwarding node (that is, the source access node) that bear the function module corresponding to a service of the UE after node handover. As shown in FIG. 8-3, when the UE-04 moves from a location near the source access node 032b to a location near the node 032a, the source access node 032b determines the node 032a as the target access node. In this case, a controller 01 may determine, according to the function module corresponding to a service of the UE and the network topology, that the node 032b is the target forwarding node (that is, the source access node) corresponding to the target access node 032a.

Step 816. The controller configures the function module for the target access node. Step 817 is performed.

After determining the target access node and the target forwarding node (that is, the source access node), the controller may configure the function modules for the target access node and the target forwarding node (that is, the source access node) according to the function module corresponding to a service of the UE and the network topology.

For example, it is assumed that the function module corresponding to a service of the UE includes the PHY layer function module 1, the MAC layer function module 2, the RLC layer function module 3, and the PDCP layer function module 4. As shown in FIG. 8-3, the controller may configure the PHY layer function module 1, the MAC layer function module 2, and the RLC layer function module 3 for the target access node 032a. Because the PDCP layer function module 4 is configured in the node 032b before node handover, there is no need to configure the PDCP layer function module 4 for the target forwarding node 032b (that is, the source access node). On the one hand, the controller may generate a target access node configuration command according to the PHY layer function module 1, the MAC layer function module 2, and the RLC layer function module 3, and send the target access node configuration command to the target access node 032a, so that the target access node 032a activates the corresponding function modules according to the target access node configuration command. On the other hand, the controller may generate target access node configuration information according to the PHY layer function module 1, the MAC layer function module 2, and the RLC layer function module 3, and send the target access node configuration information to the target access node 032, so that the target access node 032a configures the corresponding function modules according to the target access node configuration information.

Step 817. The controller configures a second forwarding entry group for the target access node and the target forwarding node. Step 818 is performed.

The controller may determine, according to the function modules configured for the target access node and the target forwarding node (that is, the source access node) and the network topology, a forwarding entry of the second forwarding entry group required for transmitting a data stream by the target access node to the target forwarding node (that is, the source access node), and send configuration information of the a forwarding entry of the second forwarding entry group required for transmitting a data stream by the target access node to the target forwarding node (that is, the source access node) to both the target access node and the target forwarding node (that is, the source access node), so that the target access node and the target forwarding node configure the corresponding forwarding entry according to the received configuration information of the forwarding entry of the second forwarding entry group. In this way, the second forwarding entry group is configured for the target access node and the target forwarding node (that is, the source access node). Because the target forwarding node and the source access node are a same node, and the forwarding entry of the third forwarding entry group for transmitting a data stream between the source access node and the gateway are configured in the source access node, there is no need to configure forwarding entry of the second forwarding entry group for transmitting a data stream between the target forwarding node (that is, the source access node) and gateway for the target forwarding node (that is, the source access node) and the gateway.

It should be noted that because the target forwarding node and the source access node are a same node, data temporarily stored in the source access node is stored in the target forwarding node. After the controller configures the forwarding entry of the second forwarding entry group for the target forwarding node (that is, the source access node), the target forwarding node (that is, the source access node) may send, according to the forwarding entry of the second forwarding entry group, the data temporarily stored in the source access node to the target access node, and the target access node temporarily stores the data temporarily stored in the source access node. It should be noted that after receiving the data that is temporarily stored in the source access node and that is sent by the target forwarding node (that is, the source access node), the target access node may alternatively send the data temporarily stored in the source access node to the UE.

Step 818. The UE performs data stream exchange with the gateway by using the target access node and the target forwarding node.

For example, after the UE establishes a connection to the target access node, the second forwarding entry group required for data stream transmission between a target node and the gateway is configured for the target access node, the target forwarding node (that is, the source access node), and the gateway, and the data temporarily stored in the source access node is sent to the target access node, the UE can perform data stream exchange with the gateway by using the target access node and the target forwarding node (that is, the source access node), and perform handover from the source access node to the target access node and the target forwarding node (that is, the source access node).

Further, a downlink data stream received by the UE may include multiple downlink data packets. After step 818, the UE may detect whether the received downlink data stream is complete. If the UE detects that the downlink data stream received by the UE is incomplete, the UE may generate downlink data packet retransmission indication information according to a downlink data packet that is not received by the UE, and send the downlink retransmission indication information to the target access node. The target access node and the target forwarding node (that is, the source access node) retransmit, to the UE according to the downlink data packet retransmission indication information, the downlink data packet that is not received by the UE.

The controller in this embodiment of the present invention can configure function modules for nodes and can configure forwarding entry for nodes and the gateway. In actual application, the controller may include an SDP controller and an SDN controller. The SDP controller is configured to configure the function modules for the nodes. The SDN controller is configured to configure the forwarding entry for the nodes and the gateway. It should be noted that on the one hand, in this embodiment of the present invention, the node handover method is described by using an example in which the source access node determines the target access node. In actual application, alternatively, the controller may determine the target access node and the target forwarding node. This is not limited in this embodiment of the present invention. On the other hand, in this embodiment of the present invention, the node handover method is described by using an example in which the target access node is corresponding to one target forwarding node. In actual application, a quantity of the target forwarding nodes may alternatively be another value. This is not limited in this embodiment of the present invention.

It should be noted that the order of the node handover method steps in this embodiment of the present invention may be appropriately adjusted, and the steps may also be correspondingly added or deleted according to a situation. All variant methods readily figured out by a person skilled in the art within the technical scope disclosed in the present invention shall fall within the protection scope of the present invention, and therefore are not described.

In conclusion, according to the node handover method provided in this embodiment of the present invention, after receiving a protocol configuration request message sent by a target access node, a controller determines, according to a quality of service parameter, a function module corresponding to a service of UE, configures, according to the function module corresponding to a service of the UE and a network topology, a function module for a target node, and determines a first forwarding entry group and a second forwarding entry group, so that a source node can send data temporarily stored in the source node to the target node according to the first forwarding entry group, and the target node performs data stream transmission with a gateway according to the second forwarding entry group. In this way, the target access node serves the UE, handover between nodes in an SDP network system is implemented, and functions of the SDP network system are enriched.

Figures 1A, 9:
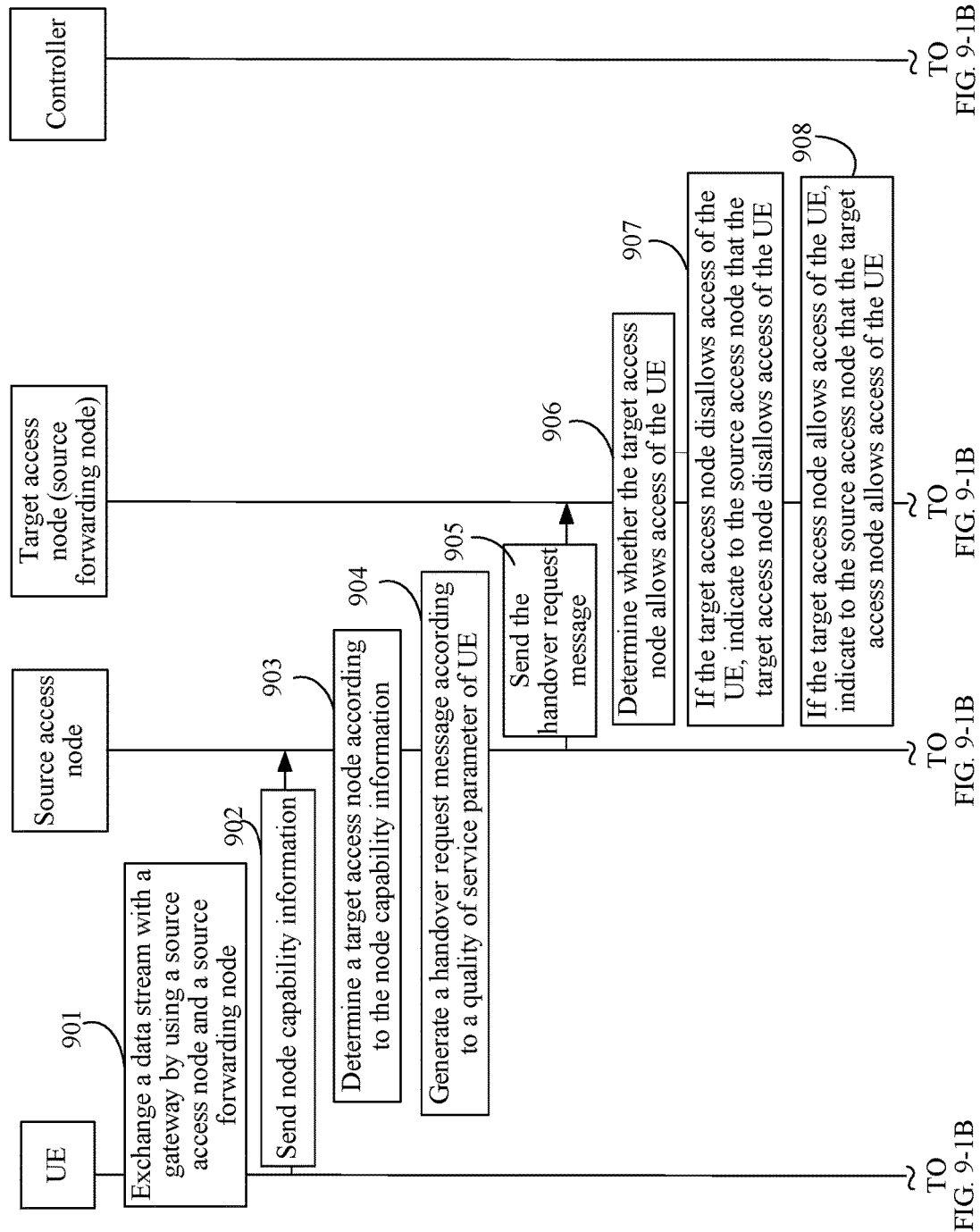
Figures 1B, 9:
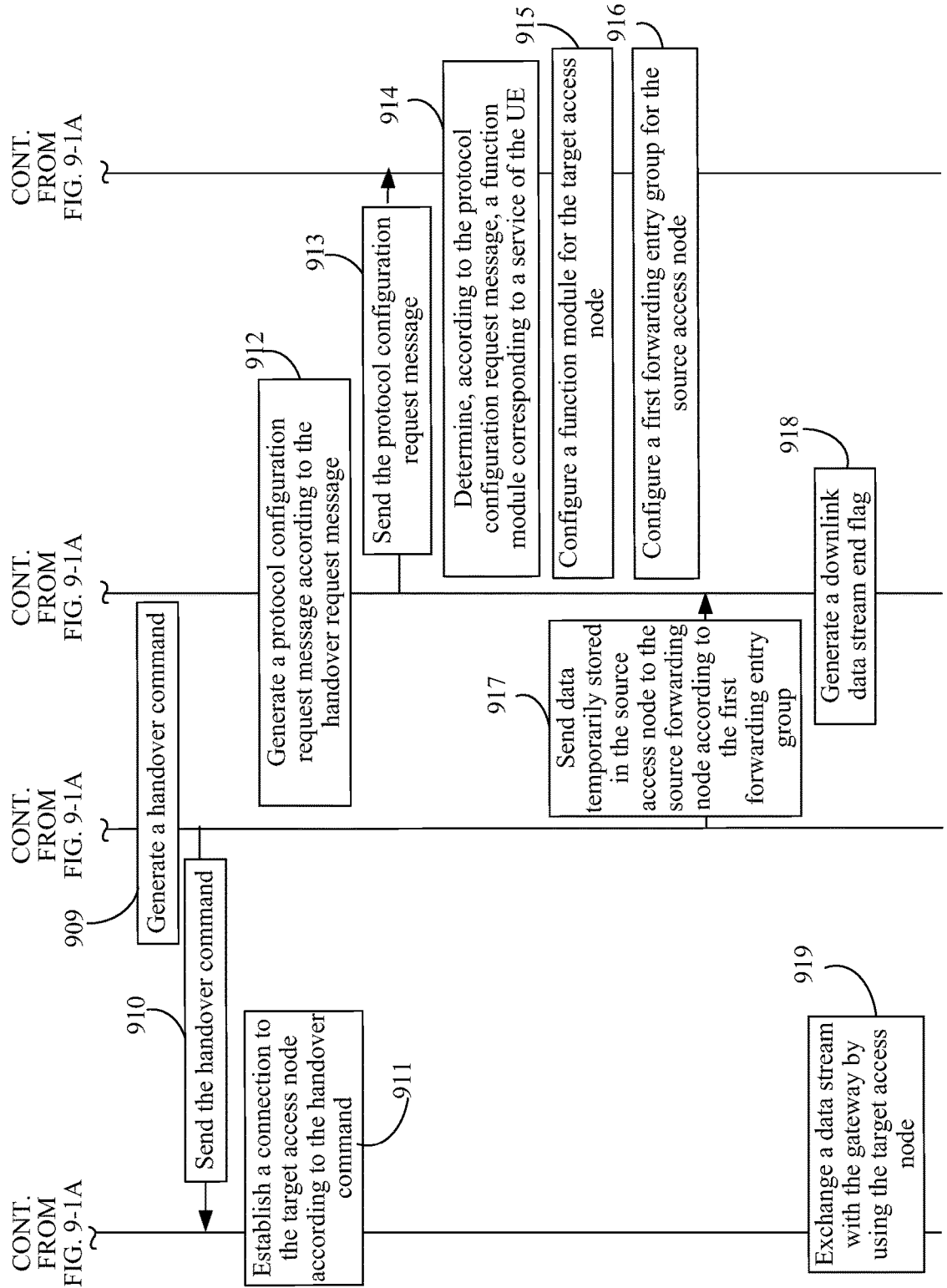
Figures 2, 9:
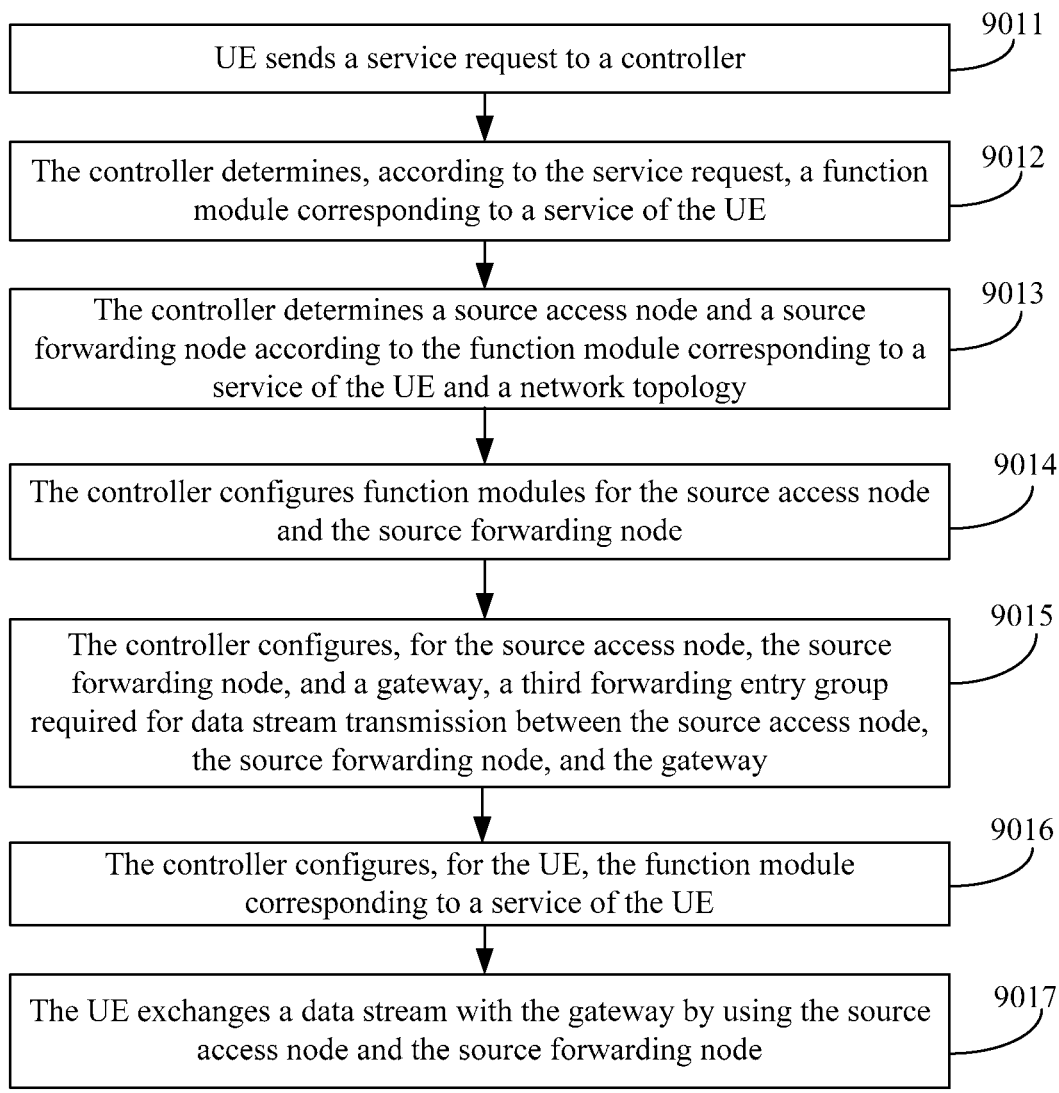
Figures 3, 9:
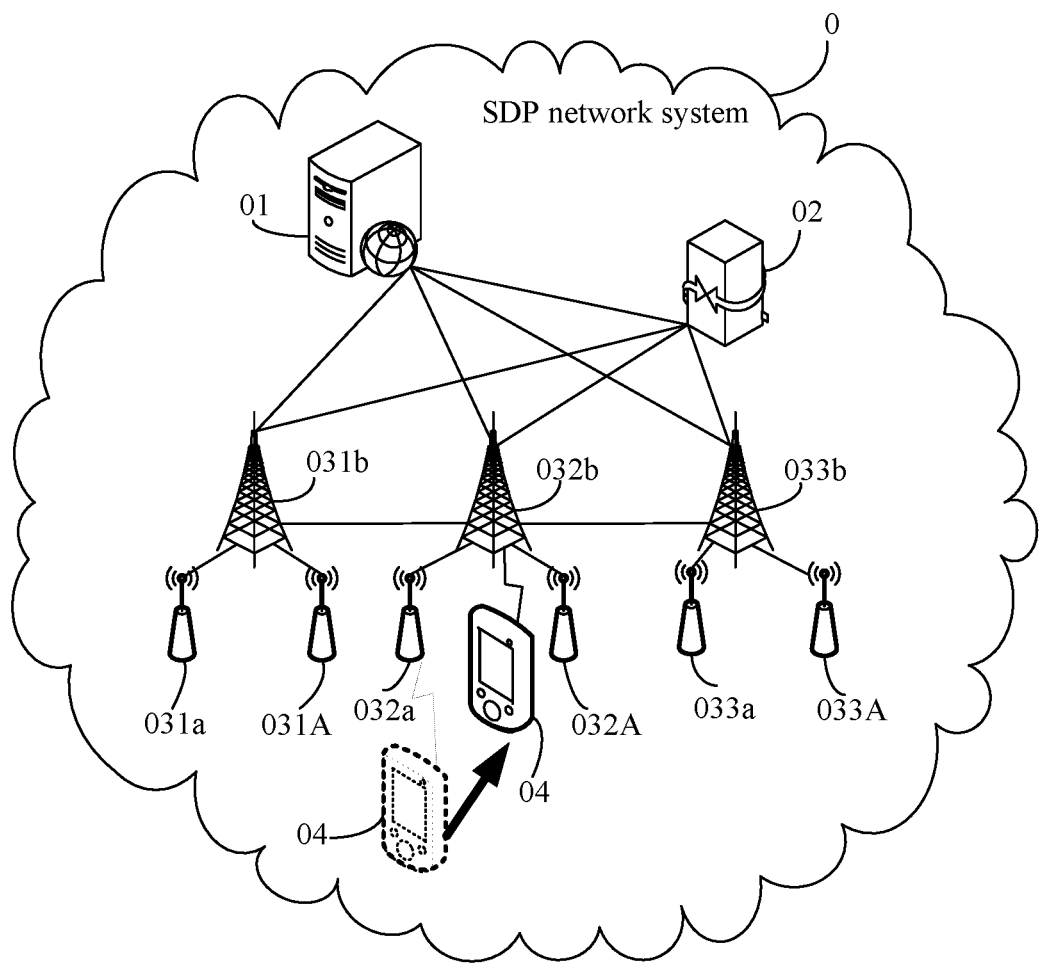

As shown in FIG. 9-1A and FIG. 9-1B, another embodiment of the present invention provides yet another node handover method, applied to the SDP network system 0 shown in FIG. 1-1. For example, the node handover method may include the following steps.

Step 901. UE performs data stream exchange with a gateway by using a source access node and a source forwarding node. Step 902 is performed.

Optionally, as shown in FIG. 9-2, step 901 may include the following steps.

Step 9011. The UE sends a service request to a controller.

When the UE needs to execute a service, the UE can generate the service request according to identifier information of the UE and a quality of service parameter of the service, and send the service request to the controller.

Step 9012. The controller determines, according to the service request, a function module corresponding to a service of the UE.

For example, the controller may determine, according to the identifier information of the UE and the quality of service parameter that are in the service request, the function module corresponding to a service of the UE. It should be noted that multiple protocol layers may be set for each device in the SDP network system, and multiple function modules may be configured at each protocol layer. Optionally, the controller may determine, according to the identifier information of the UE and the quality of service parameter, an access technology supported by the UE and select, according to the access technology and the quality of service parameter, the corresponding function module processing a service of the UE. For example, after the controller receives the service request sent by the UE, the controller may determine, according to the service request, that a protocol layer at which a processing module corresponding to the UE is located includes a PHY layer, a MAC layer, an RLC layer, and a PDCP layer, and determine, at the PHY layer, the MAC layer, the RLC layer, and the PDCP layer according to the service request, function modules corresponding to a service of the UE.

It should be noted that in this embodiment of the present invention, the node handover method is described by using an example in which the protocol layer at which the processing module corresponding to the UE is located includes the PHY layer, the MAC layer, the RLC layer, and the PDCP layer. In actual application, the processing module corresponding to the UE may alternatively be located at another protocol layer. This is not limited in this embodiment of the present invention.

Step 9013. The controller determines the source access node and the source forwarding node according to the function module corresponding to a service of the UE and a network topology.

It should be noted that the network topology of the SDP network system may be maintained in the controller. A connection relationship between all devices in the SDP network system and a function attribute of each device in the SDP network system may be recorded in the network topology. For example, the controller may determine, according to the function module corresponding to a service of the UE and the network topology, the source access node and the source forwarding node that are configured to bear the function module corresponding to a service of the UE.

As shown in FIG. 1-1, it is assumed that the function module corresponding to a service of the UE determined in step 9012 includes a PHY layer function module 1, a MAC layer function module 2, an RLC layer function module 3, and a PDCP layer function module 4, and a node currently accessed by the UE is determined as a node 032a according to a network topology. The controller determines, according to a function attribute of the node 032a currently accessed by the UE recorded in the network topology and the function module corresponding to a service of the UE, that the node 032a currently accessed by the UE can bear the PHY layer function module 1, the MAC layer function module 2, and the RLC layer function module 3, but the node 032a currently accessed by the UE cannot bear the PDCP layer function module 4. In this case, it can be learned according to the network topology that a node 032b that can perform data stream exchange with the node 032a currently accessed by the UE can bear the PDCP layer function module 4. Therefore, the node 032b can be determined as a forwarding node corresponding to the node 032a currently accessed by the UE. In addition, the node 032a currently accessed by the UE and the forwarding node 032b corresponding to the node 032a currently accessed by the UE are determined as source nodes. In this case, the node 032a currently accessed by the UE is referred to as the source access node, and the forwarding node 032b corresponding to the node 032a currently accessed by the UE is referred to as the source forwarding node.

Step 9014. The controller configures function modules for the source access node and the source forwarding node.

For example, as shown in FIG. 1-1, the controller may configure the PHY layer function module 1, the MAC layer function module 2, and the RLC layer function module 3 for the source access node 032a, and configure the PDCP layer function module 4 for the source forwarding node 032b. On the one hand, the controller may generate a source access node configuration command according to the PHY layer function module 1, the MAC layer function module 2, and the RLC layer function module 3, and generate a source forwarding node configuration command according to the PDCP layer function module 4. In addition, the controller sends the source access node configuration command to the source access node 032a, and sends the source forwarding node configuration command to the source forwarding node 032b, so that the source access node 032a activates the corresponding function modules according to the source access node configuration command, and the source forwarding node 032b activates the corresponding function module according to the source forwarding node configuration command. On the other hand, the controller may generate source access node configuration information according to the PHY layer function module 1, the MAC layer function module 2, and the RLC layer function module 3, and generate source forwarding node configuration information according to the PDCP layer function module 4. In addition, the controller sends the source access node configuration information to the source access node 032a, and sends the source forwarding node configuration information to the source forwarding node 032, so that the source access node 032a configures the corresponding function modules according to the source access node configuration information, and the source forwarding node 032b configures the corresponding function module according to the source forwarding node configuration information.

Step 9015. The controller configures, for the source access node, the source forwarding node, and the gateway, a third forwarding entry group required for data stream transmission between the source access node, the source forwarding node, and the gateway.

After determining the source nodes, the controller may determine, according to the network topology, forwarding entries of the third forwarding entry group required for data stream transmission between the source access node, the source forwarding node, and the gateway, and send configuration information of the forwarding entries of the third forwarding entry group to the source access node, the source forwarding node, and the gateway, so that the source access node, the source forwarding node, and the gateway configure the corresponding forwarding entries according to the received configuration information. In this way, the third forwarding entry group required for data stream transmission between each source node and the gateway is configured for the source access node, the source forwarding node, and the gateway. Specifically, the third forwarding entry group may include a forwarding entry required for sending a data stream by the source access node to the source forwarding node, a forwarding entry required for sending a data stream by the source forwarding node to the source access node, a forwarding entry required for sending a data stream by the source forwarding node to the gateway, and a forwarding entry required for sending a data stream by the gateway to the source forwarding node. Then, configuration information of the forwarding entry required for sending a data stream by the source access node to the source forwarding node is sent to the source access node. Configuration information of the forwarding entry required for sending a data stream by the source forwarding node to the source access node is sent to the source forwarding node. Configuration information of the forwarding entry required for sending a data stream by the source forwarding node to the gateway is sent to the source forwarding node. Configuration information of the forwarding entry required for sending a data stream by the gateway to the source forwarding node is sent to the gateway.

Step 9016. The controller configures, for the UE, the function module corresponding to a service of the UE.

It is assumed that the PHY layer function module 1, the MAC layer function module 2, the RLC layer function module 3, and the PDCP layer function module 4 are determined as the function modules corresponding to a service of the UE. On the one hand, the controller may generate a UE configuration command according to the PHY layer function module 1, the MAC layer function module 2, the RLC layer function module 3, and the PDCP layer function module 4, and send the UE configuration command to the UE, so that the UE activates the corresponding function modules according to the UE configuration command. On the other hand, the controller may generate UE configuration information according to the PHY layer function module 1, the MAC layer function module 2, the RLC layer function module 3, and the PDCP layer function module 4, and send the UE configuration information to the UE, so that the UE configures the corresponding function modules according to the UE configuration information.

Step 9017. The UE performs data stream exchange with the gateway by using the source access node and the source forwarding node.

For example, as shown in FIG. 1-1, the source nodes determined in step 9013 include the source access node 032a and the source forwarding node 032b. Therefore, in step 9017, the UE can perform data stream exchange with a gateway 02 by using the source access node 032a and the source forwarding node 032b.

Step 902. The UE sends node capability information to the source access node. Step 903 is performed.

For example, the UE may regularly obtain capability information of each node within a detection range of the UE. The capability information of the node obtained by the UE may be signal quality strength of the node, obtained by the UE. It should be noted that the capability information of the node may alternatively be other information. This is not limited in this embodiment of the present invention. The UE may establish a connection to the source access node by using an air interface. After the UE obtains the capability information of each node within the detection range of the UE, the UE may send the capability information of each node within the detection range of the UE to the source access node by using the air interface.

Step 903. The source access node determines a target access node according to the node capability information. Step 904 is performed.

After receiving the capability information of each node within the detection range of the UE that is sent by the UE, the source access node may obtain, by means of filtering according to a preset filtering manner from the multiple nodes within the detection range of the UE, a node satisfying a filtering condition as the target access node. For example, a preset capability threshold may be stored in the source access node. The source access node may compare the preset capability threshold with a capability value indicated by the capability information of each node within the detection range of the UE, so as to obtain, by means of filtering from the multiple nodes within the detection range of the UE, nodes whose capability values indicated by the capability information are greater than the preset capability threshold, and determine, among the nodes whose capability values indicated by the capability information of the nodes are greater than the preset capability threshold, a node with a greatest capability value indicated by capability information as the target access node. It should be noted that if the capability values indicated by the capability information of all nodes within the detection range of the UE are less than the preset capability threshold, the source access node skips the action. In actual application, the source access node may alternatively determine the target access node in another manner. This is not limited in this embodiment of the present invention. As shown in FIG. 9-3, when UE-04 moves from a location near the source access node 032*a* to a location near the node 032*b*, the source access node 032*a* determines the node 032*b* as the target access node (that is, the source forwarding node).

Step 904. The source access node generates a handover request message according to a quality of service parameter of the UE. Step 905 is performed.

The quality of service parameter of the UE may be stored in the source access node. The source access node may generate the handover request message according to the quality of service parameter of the UE. The handover request message is used to indicate that the UE needs to access the target access node (that is, the source forwarding node). Optionally, the source access node may alternatively obtain the quality of service parameter of the UE from the UE.

Step 905. The source access node sends the handover request message to the target access node. Step 906 is performed.

The source access node determines the target access node (that is, the source forwarding node) in step 903, and the source access node generates the handover request message in step 905. Therefore, in step 905, the source access node may send the handover request message to the target access node (that is, the source forwarding node) according to an identifier of the target access node (that is, the source forwarding node). For example, the handover request message may be sent to the target access node (that is, the source forwarding node) in a form of signaling.

Step 906. The target access node determines whether the target access node allows access of the UE. If the target access node disallows access of the UE, step 907 is performed. If the target access node allows access of the UE, step 908 is performed.

After receiving the handover request message sent by the source access node, the target access node (that is, the source forwarding node) may determine, according to the quality of service parameter of the UE in the handover request message, whether the target access node (that is, the source forwarding node) allows access of the UE. If the target access node (that is, the source forwarding node) disallows access of the UE, step 907 is performed. If the target access node (that is, the source forwarding node) allows access of the UE, step 908 is performed. Optionally, for a specific step of determining, by the target access node according to the quality of service parameter of the UE in the handover request message, whether the target access node allows access of the UE, reference may be made to a specific step of determining, by a node according to a quality of service parameter, whether the node allows access of UE in the conventional art, and details are not described herein in this embodiment of the present invention.

Step 907. The target access node indicates to the source access node that the target access node disallows access of the UE. Step 908 is performed.

If the target access node (that is, the source forwarding node) disallows access of the UE, the target access node may generate a message used to indicate that the target access node disallows access of the UE, and send, to the source access node, the message used to indicate that the target access node disallows access of the UE, so that after receiving the message used to indicate that the target access node disallows access of the UE, the source access node determines that the target access node disallows access of the UE.

Step 908. The target access node indicates to the source access node that the target access node allows access of the UE. Step 909 is performed.

The target access node (that is, the source forwarding node) may generate a handover feedback message used to indicate that the target access node allows access of the UE, and send the handover feedback message to the source access node.

Step 909. The source access node generates a handover command. Step 910 is performed.

After receiving the handover feedback message sent by the target access node, the source access node may generate the handover command used to instruct the UE to perform node handover. For example, the handover command may include the identifier of the target access node. It should be noted that the handover command may further include other information. This is not limited in this embodiment of the present invention.

Step 910. The source access node sends the handover command to the UE. Step 911 is performed.

For example, the source access node may send, to the UE by using the air interface, the handover command generated by the source access node.

Step 911. The UE establishes a connection to the target access node according to the handover command. Step 912 is performed.

After receiving the handover command used to instruct the UE to perform node handover, the UE may disconnect from the source access node and establish the connection to the target access node (that is, the source forwarding node) according to the handover command. For example, the UE may further re-establish a protocol layer for the UE. For a specific step of re-establishing, by the UE, the protocol layer for the UE, reference may be made to a specific step of establishing, by UE, a protocol layer in the conventional art, and details are not described herein in this embodiment of the present invention.

Step 912. The target access node generates a protocol configuration request message according to the handover request message. Step 913 is performed.

If the target access node (that is, the source forwarding node) allows access of the UE, the target access node may generate the protocol configuration request message according to the handover request message sent by the source access node. Both the handover request message and the protocol configuration request message may include the quality of service parameter of the UE. The protocol configuration request message is used to instruct to configure a function module for the target access node.

Step 913. The target access node sends the protocol configuration request message to a controller. Step 914 is performed.

Optionally, the target access node (that is, the source forwarding node) may send the generated protocol configuration request message to the controller. For example, the protocol configuration request message may be sent to the controller in a form of signaling.

Step 914. The controller determines, according to the protocol configuration request message, a function module corresponding to a service of the UE. Step 915 is performed.

The controller may determine, according to the quality of service parameter of the UE in the protocol configuration request message, the function module corresponding to a service of the UE. Optionally, multiple protocol layers may be set for each device in the SDP network system, and multiple function modules may be configured at each protocol layer. Multiple protocol layers may be set for the UE, and multiple function modules may be configured at each protocol layer of the UE, where functions of the function modules are different. For example, the controller may select, according to the quality of service parameter of the UE, the corresponding function module processing a service of the UE. The function module corresponding to a service of the UE may be the PHY layer function module 1, the MAC layer function module 2, the RLC layer function module 3, and the PDCP layer function module 4.

Step 915. The controller configures the function module for the target access node. Step 916 is performed.

After determining the target access node (that is, the source forwarding node), the controller may configure the function module for the target access node (that is, the source forwarding node) according to the function module corresponding to a service of the UE and the network topology.

It should be noted that the network topology of the SDP network system may be stored and maintained in the controller, that is, a connection relationship among multiple devices in the SDP network system and a function attribute of each device in the SDP network system. The controller may determine, according to the function module corresponding to a service of the UE and the network topology of the SDP network system, that the target access node (that is, the source forwarding node) is able to bear all function modules corresponding to a service of the UE, and a data stream in the target access node can be sent to the gateway without using a forwarding node between the target access node (that is, the source forwarding node) and the gateway. As shown in FIG. 9-3, when the UE-04 moves from a location near the source access node 032*a* to a location near a node 032*b*, the source access node 032*a* determines the node 032*b* as the target access node (that is, the source forwarding node).

For example, it is assumed that the function module corresponding to a service of the UE includes the PHY layer function module 1, the MAC layer function module 2, the RLC layer function module 3, and the PDCP layer function module 4. As shown in FIG. 9-3, the controller may configure the PHY layer function module 1, the MAC layer function module 2, and the RLC layer function module 3 for the target access node 032*b*. The target access node and the source forwarding node are a same node. Therefore, the function module corresponding to a function of a forwarding node is configured in the target access node (that is, the source forwarding node). That is, the PDCP layer function module 4 is configured in the target access node 032*b*. Therefore, there is no need to configure the PDCP layer function module 4 for the target access node (that is, the source forwarding node). On the one hand, the controller may generate a target access node configuration command according to the PHY layer function module 1, the MAC layer function module 2, and the RLC layer function module 3, and send the target access node configuration command to the target access node 032*b*, so that the target access node 032*b* activates the corresponding function modules according to the target access node configuration command. On the other hand, the controller may generate target access node configuration information according to the PHY layer function module 1, the MAC layer function module 2, and the RLC layer function module 3, and send the target access node configuration information to the target access node 032*b*, so that the target access node 032*b* configures the corresponding function modules according to the target access node configuration information.

Step 916. The controller configures a first forwarding entry group for the source access node. Step 917 is performed.

The controller may determine, according to the function module configured for the target access node (that is, the source forwarding node) and the network topology, a forwarding entry of the first forwarding entry group required for sending a data stream by the source access node to the source forwarding node. For example, the first forwarding entry group may include the forwarding entry required for sending a data stream by the source access node to the source forwarding node. Then, the controller may send, to the source access node, configuration information of the forwarding entry required for sending a data stream by the source access node to the source forwarding node, so that the source access node configures the corresponding forwarding entry according to the received configuration information of the forwarding entry.

It should be noted that in step 9015, the controller configures the forwarding entry of the third forwarding entry group for the source access node, so that the source access node sends, to the source forwarding node according to the forwarding entry of the third forwarding entry group, data sent by the UE. However, the forwarding entry of the first forwarding entry group configured for the source access node in step 916 is used to forward data temporarily stored in the source access node. That is, data sent by the source forwarding node to the source access node is different from data sent by the UE to the source access node. Therefore, the forwarding entry of the third forwarding entry group configured for the source access node in step 9015 cannot be directly used to forward the data temporarily stored in the source access node, and the forwarding entry of the first forwarding entry group needs to be configured for the source access node.

Step 917. The source access node sends, to the source forwarding node according to the first forwarding entry group, data temporarily stored in the source access node. Step 918 is performed.

The source access node may send, to the source forwarding node according to the forwarding entry that is of the first forwarding entry group and that is in the source access node, the data temporarily stored in the source access node. The gateway may send a data stream to the UE by using the source forwarding node and the source access node. For example, after the gateway sends the data stream to the source forwarding node, the source forwarding node may perform encryption processing on the data stream sent by the gateway and send the encrypted data stream to the source access node. The source access node may process the data stream encrypted by the source forwarding node and send the data stream to the UE, and may temporarily store the data stream encrypted by the source forwarding node.

Because the source forwarding node and the target access node are a same node, the target access node receives the data that is temporarily stored in the source access node and that is sent by the source access node.

Step 918. The source forwarding node generates a downlink data stream end mark. Step 919 is performed.

Before node handover, the gateway is connected to the Internet, and therefore, the gateway may receive a downlink data stream sent by the Internet and send the downlink data stream to the source forwarding node. The source forwarding node sends the downlink data stream to the source access node. Finally, the source access node sends the downlink data stream to the UE. After the source access node receives the configuration information of the forwarding entry of the first forwarding entry group and the corresponding forwarding entry is configured according to the received configuration information of the forwarding entry, the source access node may send the data temporarily stored in the source access node to the source forwarding node (that is, the target access node) according to the forwarding entry of the first forwarding entry group. After receiving protocol function module configuration information, the source forwarding node (that is, the target access node) may further generate the downlink data stream end mark and send the downlink data stream end mark to the source access node.

After sending the data temporarily stored in the source access node to the source forwarding node, the source access node may release protocol state information in the source access node according to the downlink data stream end mark, and may further delete, according to the downlink data stream end mark, the forwarding entry of the first forwarding entry group and the forwarding entry of the third forwarding entry group that are in the source access node. The source access node may alternatively send the downlink data stream end mark to the source forwarding node (that is, the target access node). After receiving the downlink data stream end mark sent by the source access node, the source forwarding node (that is, the target access node) may delete, according to the downlink data stream end mark, the forwarding entry of the third forwarding entry group for sending data by the source forwarding node to the source access node. It should be noted that the forwarding entry of the third forwarding entry group for sending data by the source forwarding node (that is, the target access node) to the gateway still exists in the source forwarding node (that is, the target access node).

Step 919. The UE performs data stream exchange with the gateway by using the target access node.

For example, after the UE establishes a connection to the target access node (that is, the source forwarding node), the second forwarding entry group required for data stream transmission between a target node and the gateway is configured for the target access node, and the data temporarily stored in the source access node is sent to the target access node (that is, the source forwarding node), the UE can perform data stream exchange with the gateway by using the target access node, and perform handover from the source access node and the source forwarding node to the target access node.

Further, a downlink data stream received by the UE may include multiple downlink data packets. After step 919, the UE may detect whether the received downlink data stream is complete. If the UE detects that the downlink data stream received by the UE is incomplete, the UE may generate downlink data packet retransmission indication information according to a downlink data packet that is not received by the UE, and send the downlink retransmission indication information to the target access node. The target access node and the target forwarding node retransmit, to the UE according to the downlink data packet retransmission indication information, the downlink data packet that is not received by the UE.

The controller in this embodiment of the present invention can configure function modules for nodes and can configure forwarding entries for nodes and the gateway. In actual application, the controller may include an SDP controller and an SDN controller. The SDP controller is configured to configure the function modules for the nodes. The SDN controller is configured to configure the forwarding entries for the nodes and the gateway. It should be noted that on the one hand, in this embodiment of the present invention, the node handover method is described by using an example in which the source access node determines the target access node. In actual application, alternatively, the controller may determine the target access node. This is not limited in this embodiment of the present invention. On the other hand, in this embodiment of the present invention, the node handover method is described by using an example in which the source access node is corresponding to one source forwarding node. In actual application, a quantity of the source forwarding nodes may alternatively be another value. This is not limited in this embodiment of the present invention.

It should be noted that the order of the node handover method steps in this embodiment of the present invention may be appropriately adjusted, and the steps may also be correspondingly added or deleted according to a situation. All variant methods readily figured out by a person skilled in the art within the technical scope disclosed in the present invention shall fall within the protection scope of the present invention, and therefore are not described.

In conclusion, according to the node handover method provided in this embodiment of the present invention, after receiving a protocol configuration request message sent by a target access node, a controller determines, according to a quality of service parameter, a function module corresponding to a service of UE, configures, according to the function module corresponding to a service of the UE and a network topology, a function module for a target node, and determines a first forwarding entry group and a second forwarding entry group, so that a source node can send data temporarily stored in the source node to the target node according to the first forwarding entry group, and the target node performs data stream transmission with a gateway according to the second forwarding entry group. In this way, the target access node serves the UE, handover between nodes in an SDP network system is implemented, and functions of the SDP network system are enriched.

The node handover methods provided in the embodiments of the present invention may be applied to the node handover apparatuses described below. For a working procedure and a working principle of each unit in embodiments of the present invention, reference may be made to descriptions in the foregoing embodiments.

Figure 10:
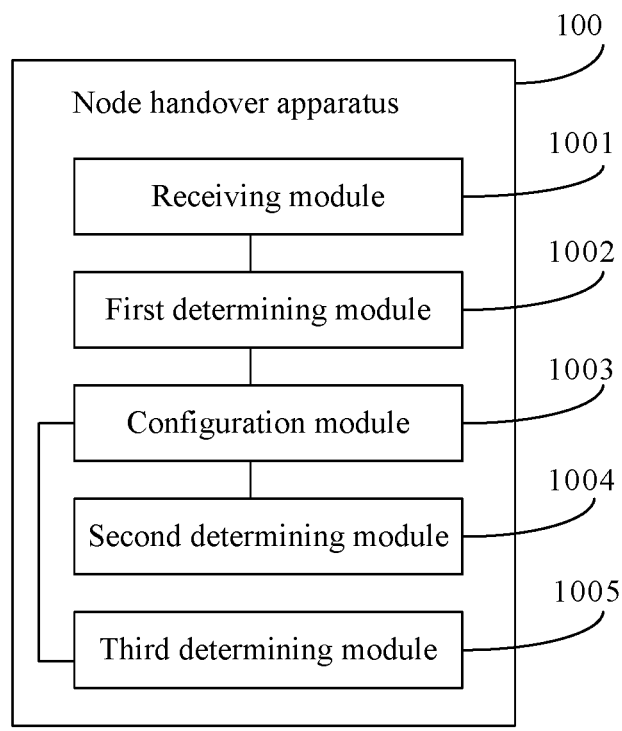
FIG. 10 is a schematic structural diagram of a node handover apparatus according to an embodiment of the present invention.

As shown in FIG. 10, an embodiment of the present invention provides a node handover apparatus 100, applied to the controller in the node handover system shown in FIG. 1 or FIG. 2. The node handover apparatus 100 may include:

a receiving module 1001, configured to receive a protocol configuration request message sent by a target access node, where the target access node is a node accessed by the UE after node handover, and the protocol configuration request message includes a quality of service parameter of UE. The protocol configuration request message is generated by the target access node according to a handover request message sent by a source access node. The source access node is a node accessed by the UE before node handover;

a first determining module 1002, configured to determine, according to the quality of service parameter, a function module corresponding to a service of the UE;

a configuration module 1003, configured to configure, according to the function module corresponding to a service of the UE and a network topology, a function module for a target node. The target node includes the target access node. The target node is configured to bear the function module corresponding to a service of the UE after node handover;

a second determining module 1004, configured to determine, according to the function module configured for the target node and the network topology, a first forwarding entry group required for data stream transmission between a source node and the target node. The source node includes the source access node. The source node is configured to bear the function module corresponding to a service of the UE before node handover; and a third determining module 1005, configured to determine, according to the function module configured for the target node and the network topology, a second forwarding entry group required for data stream transmission between any node of the target node and a gateway.

In conclusion, according to the node handover apparatus provided in this embodiment of the present invention, a first determining module determines, according to a quality of service parameter, a function module corresponding to a service of UE. A configuration module configures, according to the function module corresponding to a service of the UE and a network topology, a function module for a target node. A second determining module and a third determining module determine a first forwarding entry group and a second forwarding entry group, so that a source node can send data temporarily stored in the source node to the target node according to the first forwarding entry group, and the target node performs data stream transmission with a gateway according to the second forwarding entry group. In this way, a target access node serves the UE, handover between nodes in an SDP network system is implemented, and functions of the SDP network system are enriched.

Optionally, the target node may further include a target forwarding node, and the configuration module 1003 may be configured to:

determine the target forwarding node according to the function module corresponding to a service of the UE and the network topology, where the target forwarding node is a node between the target access node and the gateway and is able to bear a part of the function module corresponding to a service of the UE after node handover; and determine a function module of the target forwarding node and a function module of the target access node according to the function module corresponding to a service of the UE and the network topology, where the function module of the target forwarding node and the function module of the target access node form the function module corresponding to a service of the UE.

For example, the source node further includes a source forwarding node, and the first forwarding entry group includes:

a forwarding entry required for sending a data stream by the source access node to the source forwarding node and a forwarding entry required for transmitting a data stream by the source forwarding node to the target node.

Optionally, the source node further includes a source forwarding node, and the first forwarding entry group includes:

a forwarding entry required for sending a data stream by the source access node to the source forwarding node and a forwarding entry required for transmitting a data stream by the source forwarding node to the target forwarding node.

Optionally, the third determining module 1005 may be configured to:

determine a forwarding entry of the any node of the target node according to the function module configured for the target node and the network topology;

determine whether a source node nearest to the gateway before handover and a target node nearest to the gateway after handover are a same node; and if the source node nearest to the gateway before handover and the target node nearest to the gateway after handover are not a same node, determine a forwarding entry of the gateway.

In conclusion, according to the node handover apparatus provided in this embodiment of the present invention, a first determining module determines, according to a quality of service parameter, a function module corresponding to a service of UE. A configuration module configures, according to the function module corresponding to a service of the UE and a network topology, a function module for a target node. A second determining module and a third determining module determine a first forwarding entry group and a second forwarding entry group, so that a source node can send data temporarily stored in the source node to the target node according to the first forwarding entry group, and the target node performs data stream transmission with a gateway according to the second forwarding entry group. In this way, a target access node serves the UE, handover between nodes in an SDP network system is implemented, and functions of the SDP network system are enriched.

Figures 1, 11:
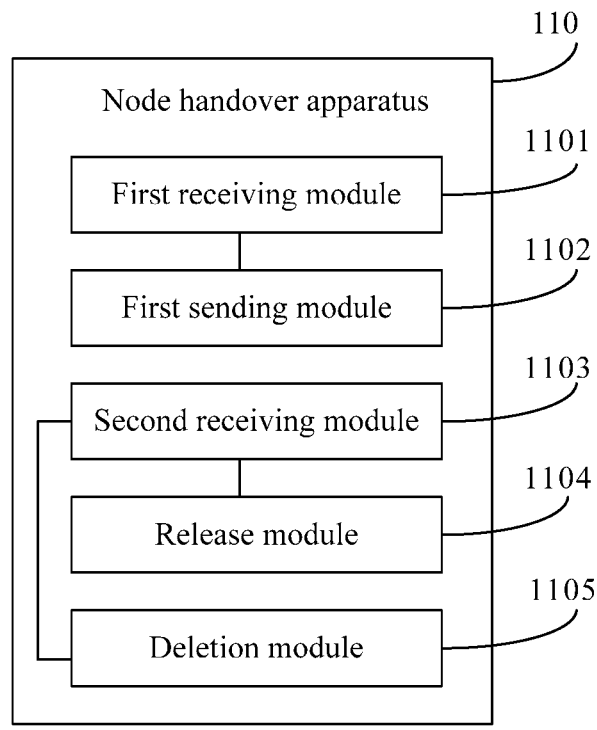
Figures 2, 11:
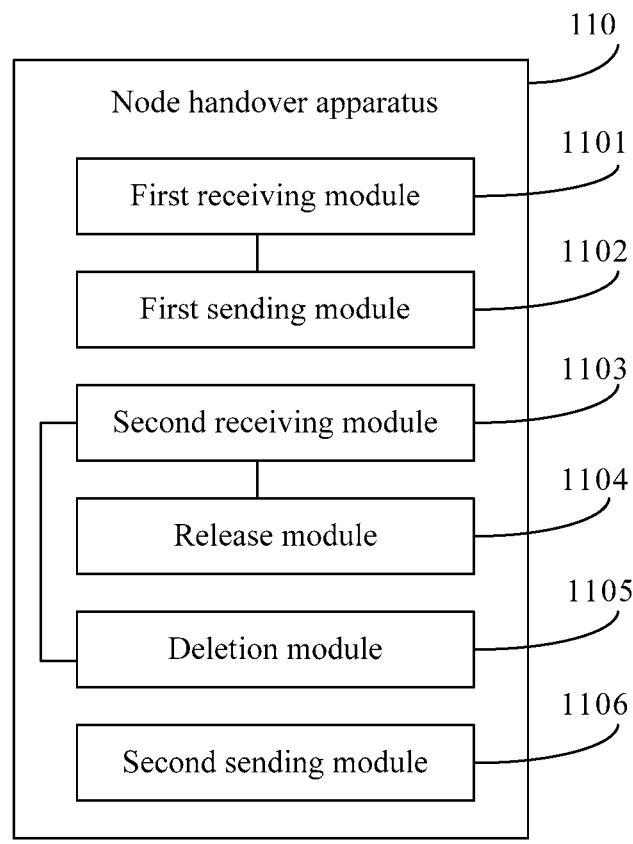

As shown in FIG. 11-1, an embodiment of the present invention provides another node handover apparatus 110, applied to a source node. The source node may be a node, of the multiple nodes in the node handover system shown in FIG. 1 or FIG. 2, that bears a function module corresponding to a service of UE before node handover. The node handover apparatus 110 may include:

a first receiving module 1101, configured to receive a first forwarding entry group sent by a controller. The first forwarding entry group is determined by the controller according to a function module configured for a target node and a network topology. The target node is a node that bears the function module corresponding to a service of the UE after node handover;

a first sending module 1102, configured to send data temporarily stored in a source node to the target node according to the first forwarding entry group;

a second receiving module 1103, configured to receive a downlink data stream end mark;

a release module 1104, configured to release, according to the downlink data stream end mark, the function module corresponding to a service of the UE that is borne by the source node; and a deletion module 1105, configured to delete the first forwarding entry group and a third forwarding entry group required for data stream transmission between a gateway and any node of the source node.

In conclusion, according to the node handover apparatus provided in this embodiment of the present invention, a first receiving module receives a first forwarding entry group sent by a controller. The first forwarding entry group is determined by the controller according to a function module configured for a target node and a network topology. A first sending module can send data temporarily stored in a source node to the target node according to the first forwarding entry group. Further, a target access node of the target node sends the data temporarily stored in the source node to UE. In this way, the target access node serves the UE, handover between nodes in an SDP network system is implemented, and functions of the SDP network system are enriched.

As shown in FIG. 11-2, an embodiment of the present invention provides still another node handover apparatus 110, applied to a source access node. The source access node may be a node, of the multiple nodes in the node handover system shown in FIG. 1 or FIG. 2, that is accessed by UE before node handover. The node handover apparatus 110 may include:

a first receiving module 1101, configured to receive a first forwarding entry group sent by a controller. The first forwarding entry group is determined by the controller according to a function module configured for a target node and a network topology. The target node is a node that bears the function module corresponding to a service of the UE after node handover;

a first sending module 1102, configured to send data temporarily stored in a source node to the target node according to the first forwarding entry group;

a second receiving module 1103, configured to receive a downlink data stream end mark;

a release module 1104, configured to release, according to the downlink data stream end mark, the function module corresponding to a service of the UE that is borne by the source node;

a deletion module 1105, configured to delete the first forwarding entry group and a third forwarding entry group required for data stream transmission between a gateway and any node of the source node; and a second sending module 1106, configured to send a handover request message to a target access node, where the target access node is a node accessed by the UE after node handover, and the handover request message includes a quality of service parameter, so that the target access node determines, according to the handover request message, whether the UE is able to access the target access node; and when the UE is able to access the target access node, sends a protocol configuration request message to the controller.

In conclusion, according to the node handover apparatus provided in this embodiment of the present invention, a first receiving module receives a first forwarding entry group sent by a controller. The first forwarding entry group is determined by the controller according to a function module configured for a target node and a network topology. A first sending module can send information in a source node to the target node according to the first forwarding entry group. Further, a target access node of the target node sends data temporarily stored in the source node to UE. In this way, the target access node serves the UE, handover between nodes in an SDP network system is implemented, and functions of the SDP network system are enriched.

An embodiment of the present invention provides still another node handover system. The node handover system may include a controller and a source node. The controller is the node handover apparatus 100 shown in FIG. 10. The source node is the node handover apparatus 110 shown in FIG. 11-1 or FIG. 11-2.

In conclusion, according to the node handover system provided in this embodiment of the present invention, after receiving a protocol configuration request message sent by a target access node, a controller determines, according to a quality of service parameter, a function module corresponding to a service of UE, configures, according to the function module corresponding to a service of the UE and a network topology, a function module for a target node, and determines a first forwarding entry group and a second forwarding entry group, so that a source node can send data temporarily stored in the source node to the target node according to the first forwarding entry group, and the target node performs data stream transmission with a gateway according to the second forwarding entry group. In this way, the target access node serves the UE, handover between nodes in an SDP network system is implemented, and functions of the SDP network system are enriched.

Figure 12:
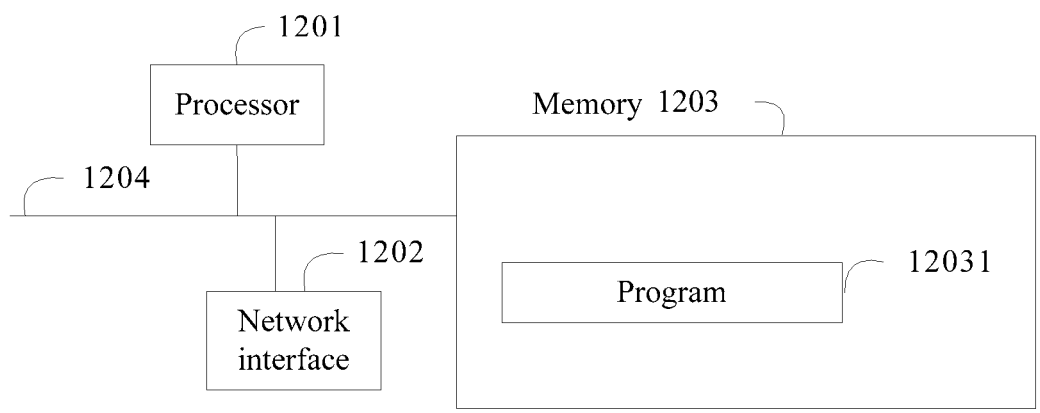
FIG. 12 is a schematic structural diagram of yet another node handover apparatus according to an embodiment of the present invention.

As shown in FIG. 12, an embodiment of the present invention provides yet another node handover apparatus. The node handover apparatus may include at least one processor 1201 (for example, a CPU), at least one network interface 1202 or another communications interface, a memory 1203, and at least one communications bus 1204 configured to implement connection communication between these apparatuses. The processor 1201 is configured to execute an executable module, for example, a computer program, stored in the memory 1203. The memory 1203 may include a random access memory (RAM: Random Access Memory), or may include a non-volatile memory (non-volatile memory), for example, at least one magnetic disk storage. The node handover apparatus is communicatively connected to at least one other network element by using the at least one network interface 1202 (which may be wired or wireless). The Internet, a wide area network, a local area network, a metropolitan area network, or the like may be used.

In some implementations, a program 12031 is stored in the memory 1203. The program 12031 may be executed by the processor 1201. The program 12031 may include:

receiving a protocol configuration request message sent by a target access node, where the protocol configuration request message includes a quality of service parameter of user equipment (UE), the protocol configuration request message is generated by the target access node according to a handover request message sent by a source access node, the source access node is a node accessed by the UE before node handover, and the target access node is a node accessed by the UE after node handover;

determining, according to the quality of service parameter, a function module corresponding to a service of the UE;

configuring, according to the function module corresponding to a service of the UE and a network topology, a function module for a target node, where the target node includes the target access node, and the target node is configured to bear the function module corresponding to a service of the UE after node handover;

determining, according to the function module configured for the target node and the network topology, a first forwarding entry group required for data stream transmission between a source node and the target node, where the source node includes the source access node, and the source node is configured to bear the function module corresponding to a service of the UE before node handover; and determining, according to the function module configured for the target node and the network topology, a second forwarding entry group required for data stream transmission between any node of the target node and a gateway.

Optionally, the target node may further include a target forwarding node, and the program 12031 may further include:

determining the target forwarding node according to the function module corresponding to a service of the UE and the network topology, where the target forwarding node is a node between the target access node and the gateway and is able to bear a part of the function module corresponding to a service of the UE after node handover; and determining a function module of the target forwarding node and a function module of the target access node according to the function module corresponding to a service of the UE and the network topology, where the function module of the target forwarding node and the function module of the target access node form the function module corresponding to a service of the UE.

Optionally, the source node further includes a source forwarding node, and the first forwarding entry group includes:

a forwarding entry required for sending a data stream by the source access node to the source forwarding node and a forwarding entry required for transmitting a data stream by the source forwarding node to the target node.

Optionally, the source node further includes a source forwarding node, and the first forwarding entry group includes:

a forwarding entry required for sending a data stream by the source access node to the source forwarding node and a forwarding entry required for transmitting a data stream by the source forwarding node to the target forwarding node.

Optionally, the program 12031 may further include:

determining a forwarding entry of the any node of the target node according to the function module configured for the target node and the network topology;

determining whether a source node nearest to the gateway before handover and a target node nearest to the gateway after handover are a same node; and if the source node nearest to the gateway before handover and the target node nearest to the gateway after handover are not a same node, determining a forwarding entry of the gateway.

In conclusion, according to the node handover apparatus provided in this embodiment of the present invention, a processor determines, according to a quality of service parameter, a function module corresponding to a service of UE, configures, according to the function module corresponding to a service of the UE and a network topology, a function module for a target node, and determines a first forwarding entry group and a second forwarding entry group, so that a source node can send data temporarily stored in the source node to the target node according to the first forwarding entry group, and the target node performs data stream transmission with a gateway according to the second forwarding entry group. In this way, a target access node serves the UE, handover between nodes in an SDP network system is implemented, and functions of the SDP network system are enriched.

Figure 13:
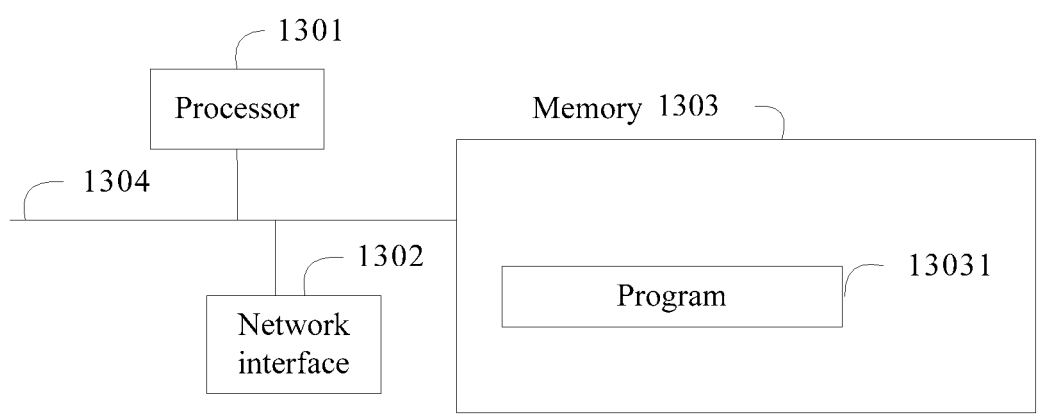
FIG. 13 is a schematic structural diagram of a node handover apparatus according to another embodiment of the present invention.

As shown in FIG. 13, another embodiment of the present invention provides a node handover apparatus. The node handover apparatus may include at least one processor 1301 (for example, a CPU), at least one network interface 1302 or another communications interface, a memory 1303, and at least one communications bus 1304 configured to implement connection communication between these apparatuses. The processor 1301 is configured to execute an executable module, for example, a computer program, stored in the memory 1303. The memory 1303 may include a random access memory (RAM: Random Access Memory), or may include a non-volatile memory (non-volatile memory), for example, at least one magnetic disk storage. The node handover apparatus is communicatively connected to at least one other network element by using the at least one network interface 1302 (which may be wired or wireless). The Internet, a wide area network, a local area network, a metropolitan area network, or the like may be used.

In some implementations, a program 13031 is stored in the memory 1303. The program 13031 may be executed by the processor 1301. The program 13031 may include:

receiving a first forwarding entry group sent by a controller, where the first forwarding entry group is determined by the controller according to a function module configured for a target node and a network topology, and the target node is a node that bears the function module corresponding to a service of user equipment (UE) after node handover;

sending data temporarily stored in a source node to the target node according to the first forwarding entry group, where the source node is a node that bears the function module corresponding to a service of the UE before node handover;

receiving a downlink data stream end mark;

releasing, according to the downlink data stream end mark, the function module corresponding to a service of the UE that is borne by the source node; and deleting the first forwarding entry group and a third forwarding entry group required for data stream transmission between a gateway and any node of the source node.

Optionally, the source node may be a source access node, the source access node is a node accessed by the UE before node handover, and the program 13031 may further include:

sending a handover request message to a target access node, where the target access node is a node accessed by the UE after node handover, and the handover request message includes a quality of service parameter, so that the target access node determines, according to the handover request message, whether the UE is able to access the target access node, and when the UE is able to access the target access node, sends a protocol configuration request message to the controller.

In conclusion, according to the node handover apparatus provided in this embodiment of the present invention, a processor sends information in a source node to a target node according to a first forwarding entry group. Further, a target access node of the target node sends data temporarily stored in the source node to UE. In this way, the target access node serves the UE, handover between nodes in an SDP network system is implemented, and functions of the SDP network system are enriched.

An embodiment of the present invention provides yet another node handover system. The node handover system may include a controller and a source node. The controller may be the node handover apparatus 120 shown in FIG. 12. The source node may be the node handover apparatus 130 shown in FIG. 13.

In conclusion, according to the node handover system provided in this embodiment of the present invention, after receiving a protocol configuration request message sent by a target access node, a controller determines, according to a quality of service parameter, a function module corresponding to a service of UE, configures, according to the function module corresponding to a service of the UE and a network topology, a function module for a target node, and determines a first forwarding entry group and a second forwarding entry group, so that a source node can send data temporarily stored in the source node to the target node according to the first forwarding entry group, and the target node performs data stream transmission with a gateway according to the second forwarding entry group. In this way, the target access node serves the UE, handover between nodes in an SDP network system is implemented, and functions of the SDP network system are enriched.

All the foregoing optional technical solutions may be used jointly in any combination to form optional embodiments of the present invention, and details are not described herein.

It may be clearly understood by a person skilled in the art that, for the purpose of convenient and brief description, for a detailed working process of the foregoing described node handover system, the node handover apparatus, and each module of the node handover apparatus, reference may be made to a corresponding process in the foregoing node handover method embodiments, and details are not described herein again.

Functional modules in the embodiments of the present invention may be integrated into one processing module, or each of the modules may exist alone physically, or two or more modules are integrated into one module. The integrated module may be implemented in a form of hardware, or may be implemented in a form of hardware in addition to a software functional unit.

The foregoing descriptions are merely examples of embodiments of the present invention, but are not intended to limit the present invention. Any modification, equivalent replacement, or improvement made without departing from the spirit and principle of the present invention shall fall within the protection scope of the present invention.

What is claimed is:

1. A node handover method in a software defined protocol (SDP) network, the method comprising:
   receiving, by a controller, a protocol configuration request message sent by a target access node in response to a handover request message from a source access node accessed by user equipment (UE) before a node handover,
      wherein the protocol configuration request message comprises a quality of service parameters of the UE,
      wherein the target access node is a node accessed by the UE after the node handover, and
      wherein both the source and target access nodes are in indirect communication with a gateway;
   configuring, by the controller and according to the quality of service parameters, a first function module for providing a service of the UE, wherein the first function module is configured at one or more protocol layers of the UE;
   determining, by the controller and according to the service provided by the first function module and a topology of the SDP network, a target node that bears the service of the first function module after the node handover,
      wherein the target node is determined by the topology of the SDP network to include the target access node having indirect access to the gateway and a node having direct access to the gateway;
   configuring, by the controller and according to the first function module and the topology of the SDP network, a second function module for the target node to implement a data stream exchange between the UE and the gateway through a data stream transmission between the gateway and the target node,
      wherein the second function module is configured at one or more protocol layers of the UE;
   determining, by the controller and according to the second function module, a first forwarding entry group required for a data stream transmission between a source node and the target node,
      wherein the source node is determined by the topology of the SDP network to include the source access node having indirect access to the gateway and a node having direct access to the gateway, and
      wherein the source node is configured by the controller to bear the first function module associated with the service of the UE before the node handover to implement the data stream exchange between the UE and the gateway, thereby enabling the source access node to (i) send data temporarily stored thereon to the target node according to the first forwarding entry group, and (ii) receive a downlink data stream from the gateway for forwarding the downlink data stream to the UE; and
   determining, by the controller and according to the second function module, a second forwarding entry group required for the data stream transmission between the gateway and the target node, thereby enabling the gateway to (i) generate a downlink data stream end mark and (ii) send the downlink data stream end mark to the source access node according to the second forwarding entry group, and thereby enabling the UE to perform the data stream exchange with the gateway through the target node.

2. The node handover method according to claim 1, wherein the target node further comprises a target forwarding node, and wherein the method comprises:
   determining the target forwarding node according to the first function module,
      wherein the target forwarding node is a node between the target access node and the gateway, and is able to bear a part of the first function module after the node handover; and
   determining a third function module of the target forwarding node and a fourth function module of the target access node according to the first function module,
      wherein the third function module and the fourth function module form the first function module.

3. The node handover method according to claim 2, wherein the source node further comprises a source forwarding node, and the first forwarding entry group comprises:
   a first forwarding entry required for sending a data stream by the source access node to the source forwarding node and a second forwarding entry required for transmitting a data stream by the source forwarding node to the target forwarding node.

4. The node handover method according to claim 1, wherein the source node further comprises a source forwarding node, and the first forwarding entry group comprises:
   a first forwarding entry required for sending a data stream by the source access node to the source forwarding node and a second forwarding entry required for transmitting a data stream by the source forwarding node to the target node.

5. The node handover method according to claim 1, wherein determining the second forwarding entry group required for the data stream transmission between the gateway and the target node comprises:
   determining a forwarding entry of the target node according to the second function module;
   determining whether a source node nearest to the gateway before a handover and a target node nearest to the gateway after the handover are a same node; and
   based on that the source node nearest to the gateway before the handover and the target node nearest to the gateway after the handover are not a same node, determining a forwarding entry of the gateway.

6. A node handover apparatus in a software defined protocol (SDP) network, the apparatus comprising:
   a receiver, a processor and a memory storing instructions for execution by the processor;
   the receiver configured to cooperate with the processor to receive a protocol configuration request message sent by a target access node in response to a handover request message from a source access node accessed by user equipment (UE) before a node handover,
      wherein the protocol configuration request message comprises a quality of service parameters of the UE,
      wherein the target access node is a node accessed by the UE after the node handover, and
   wherein both the source and target access node are in indirect communication with a gateway;
   the processor, when executing the instructions stored in the memory, is configured to provide at least the following operations:
      configure, according to the quality of service parameters, a first function module for providing a service of the UE,
         wherein the first function module is configured at one or more protocol layers of the UE;
      determine, according to the service provided by the first function module and a topology of the SDP network, a target node that bears the service of the first function module after the node handover,
         wherein the target node is determined by the topology of the SDP network to include the target access node having indirect access to the gateway and a node having direct access to the gateway;
      configure, according to the first function module and the network topology of the SDP network, a second function module for the target node to implement a data stream exchange between the UE and the gateway through a data stream transmission between the gateway and the target node,
         wherein the second function module is configured at one or more protocol layers of the UE;
      determine, according to the second function module, a first forwarding entry group required for a data stream transmission between a source node and the target node,
         wherein the source node is determined by the topology of the SDP network to include the source access node having indirect access to the gateway and a node having direct access to the gateway,
         wherein the source node is configured to bear the first function module associated with the service of the UE before the node handover to implement the data stream exchange between the UE and the gateway by the source access node sending data temporarily stored thereon to the target node according to the first forwarding entry group, and the source access node receiving a downlink data stream from the Internet through the gateway and forwarding the downlink data stream to the UE; and
      determine, according to the second function module, a second forwarding entry group required for the data stream transmission between the gateway and the target node by the gateway generating a downlink data stream end mark and sending the downlink data stream end mark to the source access node according to the second forwarding entry group, and the UE performing the data stream exchange with the gateway through the target node.

7. The node handover apparatus according to claim 6, wherein the target node further comprises a target forwarding node, and the processor is further configured to:
   determine the target forwarding node according to the first function module,
      wherein the target forwarding node is a node between the target access node and the gateway, and is able to bear a part of the first function module after the node handover; and
   determine a third function module of the target forwarding node and a fourth function module of the target access node according to the first function module,
      wherein the third function module and the fourth function module form the first function module.

8. The node handover apparatus according to claim 7, wherein the source node further comprises a source forwarding node, and the first forwarding entry group comprises:
   a first forwarding entry required for sending a data stream by the source access node to the source forwarding node and a second forwarding entry required for transmitting a data stream by the source forwarding node to the target forwarding node.

9. The node handover apparatus according to claim 6, wherein the source node further comprises a source forwarding node, and the first forwarding entry group comprises:
   a first forwarding entry required for sending a data stream by the source access node to the source forwarding node and a second forwarding entry required for transmitting a data stream by the source forwarding node to the target node.

10. The node handover apparatus according to claim 6, wherein the processor is configured to:
    determine a forwarding entry of the target node according to the second function module;
    determine whether a source node nearest to the gateway before a handover and a target node nearest to the gateway after the handover are a same node; and
    based on that the source node nearest to the gateway before the handover and the target node nearest to the gateway after the handover are not a same node, determine a forwarding entry of the gateway.

11. A node handover apparatus in a software defined protocol (SDP) network, the apparatus comprising:
    at least one processor, at least one network interface, a memory, and at least one communications bus connecting the at least one processor, the at least one network interface and the memory, wherein the processor is configured to execute a program stored in the memory, and the program comprises instructions for at least the following operations:

receiving a protocol configuration request message sent by a target access node in response to a handover request message from a source access node accessed by user equipment (UE) before a node handover,
- wherein the protocol configuration request message comprises a quality of service parameters of the UE,
- wherein the target access node is a node accessed by the UE after the node handover, and
- wherein both the source and target access nodes are in indirect communication with a gateway;

configuring, according to the quality of service parameters, a first function module for providing a service of the UE,
- wherein the first function module is configured at one or more protocol layers of the UE;

determining, according to the service provided by the first function module and a topology of the SDP network, a target node that bears the service of the first function module after the node handover,
- wherein the target node is determined by the topology of the SDP network to include the target access node having indirect access to the gateway and a node having direct access to the gateway;

configuring, according to the function module and the topology of the SDP network, a second function module for the target node to implement a data stream exchange between the UE and the gateway through a data stream transmission between the gateway and the target node,
- wherein the second function module is configured at one or more protocol layers of the UE;

determining, according to the second function module, a first forwarding entry group required for a data stream transmission between a source node and the target node,
- wherein the source node is determined by the topology of the SDP network to include the source access node having indirect access to the gateway and a node having direct access to the gateway, and
- wherein the source node is configured to bear the first function module associated with the service of the UE before the node handover to implement the data stream exchange between the UE and the gateway by the source access node sending data temporarily stored thereon to the target node according to the first forwarding entry group, and the source access node receiving a downlink data stream from the Internet through the gateway and forwarding the downlink data stream to the UE; and determining, according to the second function module, a second forwarding entry group required for the data stream transmission between the gateway and the target node by the gateway generating a downlink data stream end mark and sending the downlink data stream end mark to the source access node according to the second forwarding entry group, and the UE performing the data stream exchange with the gateway through the target node.

12. The node handover apparatus according to claim 11, wherein the target node further comprises a target forwarding node, and the program further comprises instructions for at least the following further operations:
- determining the target forwarding node according to the first function module,
  - wherein the target forwarding node is a node between the target access node and the gateway, and is able to bear a part of the first function module after the node handover; and
- determining a third function module of the target forwarding node and a fourth function module of the target access node according to the first function module,
  - wherein the third function module and the fourth function module form the first function module.

13. The node handover apparatus according to claim 12, wherein the source node further comprises a source forwarding node, and the first forwarding entry group comprises:
- a first forwarding entry required for sending a data stream by the source access node to the source forwarding node and a second forwarding entry required for transmitting a data stream by the source forwarding node to the target forwarding node.

14. The node handover apparatus according to claim 11, wherein the source node further comprises a source forwarding node, and the first forwarding entry group comprises:
- a first forwarding entry required for sending a data stream by the source access node to the source forwarding node and a second forwarding entry required for transmitting a data stream by the source forwarding node to the target node.

15. The node handover apparatus according to claim 11, wherein the program further comprises:
- determining a forwarding entry of the target node according to the second function module;
- determining whether a source node nearest to the gateway before a handover and a target node nearest to the gateway after the handover are a same node; and
- based on that the source node nearest to the gateway before the handover and the target node nearest to the gateway after the handover are not a same node, determining a forwarding entry of the gateway.

* * * * *